(12) United States Patent
Wei et al.

(10) Patent No.: US 11,915,871 B2
(45) Date of Patent: Feb. 27, 2024

(54) SEPARATOR-FREE ENERGY STORAGE DEVICES AND METHODS

(71) Applicant: The University of North Carolina at Greensboro, Greensboro, NC (US)

(72) Inventors: Jianjun Wei, Oak Ridge, NC (US); Yiyang Liu, Greensboro, NC (US); Zheng Zeng, Greensboro, NC (US)

(73) Assignee: THE UNIVERSITY OF NORTH CAROLINA AT GREENSBORO, Greensboro, NC (US)

( * ) Notice: Subject to any disclaimer, the term of this patent is extended or adjusted under 35 U.S.C. 154(b) by 623 days.

(21) Appl. No.: 16/497,683

(22) PCT Filed: Mar. 29, 2018

(86) PCT No.: PCT/US2018/025083
§ 371 (c)(1),
(2) Date: Sep. 25, 2019

(87) PCT Pub. No.: WO2018/183638
PCT Pub. Date: Oct. 4, 2018

(65) Prior Publication Data
US 2022/0262578 A1 Aug. 18, 2022

Related U.S. Application Data

(60) Provisional application No. 62/478,773, filed on Mar. 30, 2017.

(51) Int. Cl.
*H01G 11/36* (2013.01)
*H01G 11/26* (2013.01)
(Continued)

(52) U.S. Cl.
CPC ............. *H01G 11/36* (2013.01); *H01G 11/26* (2013.01); *H01G 11/86* (2013.01); *B82Y 40/00* (2013.01)

(58) Field of Classification Search
None
See application file for complete search history.

(56) References Cited

U.S. PATENT DOCUMENTS 8,254,086 B2 * 8/2012 Mastro .................... H01G 11/02
361/519
8,503,161 B1 * 8/2013 Chang .................... B82Y 40/00
361/519
(Continued)

FOREIGN PATENT DOCUMENTS

WO  WO-2018162580 A2 * 9/2018 ............. H01G 11/26

OTHER PUBLICATIONS

International Search Report and Written Opinion corresponding to PCT/US2018/025083, dated May 25, 2018, 9 pages.
(Continued)

*Primary Examiner* — Dion R. Ferguson
(74) *Attorney, Agent, or Firm* — J. Clinton Wimbish; Maynard Nexsen PC

(57) ABSTRACT

In one aspect, separator-free energy storage devices are disclosed. Such devices comprise a first electrode and a second electrode. In some embodiments, the first electrode is opposite the second electrode. The first and/or second electrodes are formed from a nanocomposite material. The nanocomposite material includes plurality of carbon nanostructures, each of which is at least partially coated with a layer of material comprising a transition metal oxide. In some embodiments, the coating layer is uniform or substantially uniform in one or more properties.

21 Claims, 43 Drawing Sheets

(51) Int. Cl.
*H01G 11/86* (2013.01)
*B82Y 40/00* (2011.01)

(56) References Cited

U.S. PATENT DOCUMENTS

| | | | | |
|---|---|---|---|---|
| 8,778,800 | B1* | 7/2014 | Chang | H01G 11/36 |
| | | | | 438/685 |
| 9,190,222 | B1* | 11/2015 | Zhang | D01D 5/003 |
| 10,147,557 | B2* | 12/2018 | Hudak | C09D 179/00 |
| 2001/0038519 | A1* | 11/2001 | Takasu | H01G 11/46 |
| | | | | 29/25.03 |
| 2008/0248192 | A1* | 10/2008 | Long | B82Y 30/00 |
| | | | | 427/80 |
| 2009/0042028 | A1* | 2/2009 | Kim | H01G 11/22 |
| | | | | 427/79 |
| 2011/0281157 | A1* | 11/2011 | Seymour | H01M 4/48 |
| | | | | 977/734 |
| 2011/0281174 | A1* | 11/2011 | Seymour | H01M 4/366 |
| | | | | 429/207 |
| 2011/0281176 | A1* | 11/2011 | Seymour | H01M 4/0416 |
| | | | | 427/126.6 |
| 2012/0014037 | A1* | 1/2012 | Mastro | H01G 11/02 |
| | | | | 977/734 |
| 2013/0027844 | A1* | 1/2013 | Yang | H01G 11/24 |
| | | | | 428/367 |
| 2013/0126794 | A1* | 5/2013 | Lee | C22C 13/00 |
| | | | | 264/105 |
| 2014/0042988 | A1* | 2/2014 | Kuttipillai | H01M 10/052 |
| | | | | 320/167 |
| 2015/0243451 | A1* | 8/2015 | Kim | D01D 5/003 |
| | | | | 428/367 |
| 2015/0332863 | A1* | 11/2015 | Ahopelto | H01G 11/86 |
| | | | | 257/532 |
| 2016/0059151 | A1* | 3/2016 | Olesik | D01D 5/0007 |
| | | | | 210/198.3 |
| 2016/0133395 | A1* | 5/2016 | Yoo | H01G 11/36 |
| | | | | 29/25.03 |
| 2016/0149224 | A1* | 5/2016 | Okuno | H01M 4/13 |
| | | | | 429/188 |
| 2017/0084401 | A1* | 3/2017 | Xing | H01G 11/28 |
| 2021/0134537 | A1* | 5/2021 | Jelinek | H01G 11/28 |
| 2022/0262578 | A1* | 8/2022 | Wei | H01G 11/32 |

OTHER PUBLICATIONS

Saito et al., Manganese dioxide nanowires on carbon nanofiber frameworks for efficient electrochemical device electrodes, RSC Advances, vol. 7, Feb. 21, 2017 [retrieved on May 4, 2018]. Retrieved from the Internet: <URL: http://pubs.rsc.org/en/content/articlepdf/2017/RA/C6RA28789A>, pp. 12351-12358.

Ou et al., Synthesis and Characterization of Sodium-Doped MnO2 for the Aqueous Asymmetric Supercapacitor Application, Journal of the Electrochemical Society, vol. 162, Iss. 5, 2015, [retrieved on May 4, 2018]. Retrieved from the Internet: <URL:http://jes.ecsdl.org/content/162/5/A5124.abstract>. Abstract.

Liu, Metal (Manganese) Oxide Based Nano-Architectures and Supercapacitor Materials in Energy Storage Applications, The University of North Carolina at Greensboro, 2017 [retrieved on May 4, 2018). Retrieved from the Internet: <URL:https://libres.uncg.edu/ir/uncg/f/Liu_uncg_0154D_12384.pdf>. Abstract.

* cited by examiner

| Deposition time (hr) | MnO2 thickness (um) |
|---:|---:|
| 0.5 | 0.6 |
| 1 | 1.072 |
| 1.5 | 1.4 |
| 2 | 1.7 |
| 2.5 | 1.9 |
| 3 | 2.189 |
| 3.5 | 3.1 |
| 4 | 4.008 |

SEPARATOR-FREE ENERGY STORAGE DEVICES AND METHODS

RELATED APPLICATION DATA

This application is a U.S. National Phase of PCT/US2018/025083, filed Mar. 29, 2018, which claims priority to U.S. Provisional Patent Application Ser. No. 62/478,773 filed Mar. 30, 2017, each of which is incorporated herein by reference in its entirety.

FIELD

The subject matter herein generally relates to energy storage devices and more particularly to separator-free supercapacitor devices having one or more nanocomposite electrodes and methods of making and using the same.

BACKGROUND

Fossil fuels continue to be used for generation of electrical power, however these resources are finite and their use results in by-products that are harmful to humans and the environment. Alternative energy resources are desired, which are nontoxic, safe, "renewable", and/or sustainable.

Energy storage devices and/or systems including, but not limited to fuel cells, batteries, and supercapacitors (also referred to as "pseudocapacitors") are developing as alternatives to fossil fuels, as such devices and/or systems have proven successful in powering large machinery and equipment, such as automobiles. Among these, fuel cells have the highest energy density, but their power density is low. Batteries have limited lifetimes and contain toxic materials. Supercapacitors have a higher energy density than conventional capacitors and a higher power density than batteries; however, many existing supercapacitor designs require a physical membrane or separator to be positioned between the anode and cathode. Such separators or membranes inherently increase the size of the resultant supercapacitor, which may be undesirable for applications requiring thin and/or small components. Moreover, existing processes for fabricating supercapacitors have proven difficult for large-scale applications.

Accordingly, a separator-free configuration of supercapacitor devices and methods of making and using the same may be beneficial. Such devices can include one or more nanocomposite electrodes having an improved manufacturability, ultrahigh capacitance, and extended lifetime.

DETAILED DESCRIPTION

Figure 1:
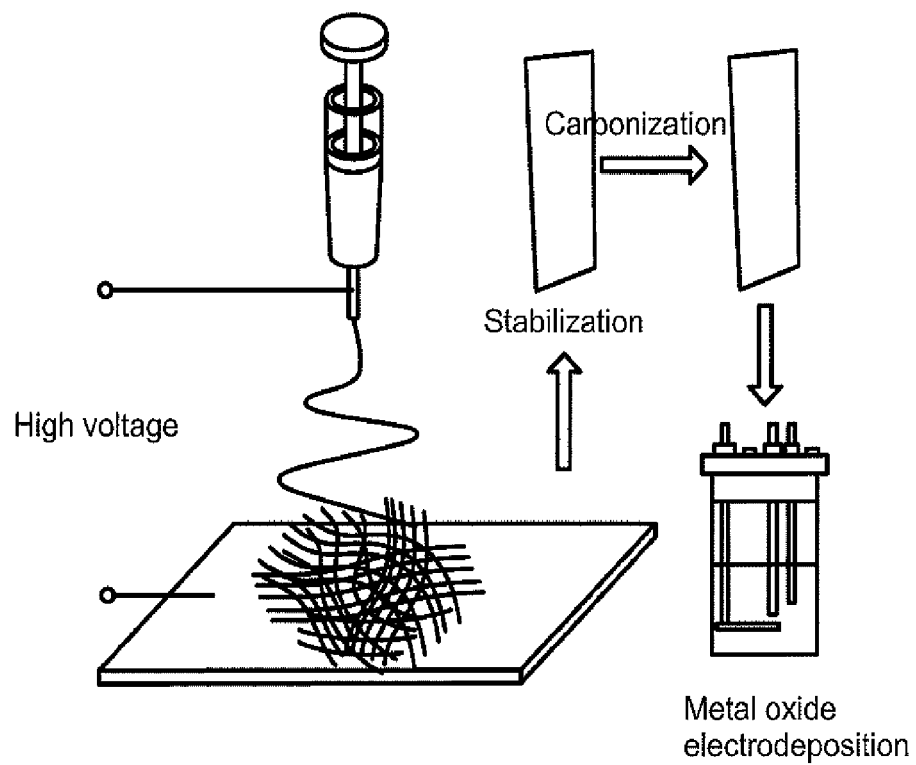
FIG. 1 is a schematic illustration of a method of fabricating a nanocomposite electrode for a separator-free energy storage device according to some embodiments.

Separator-free energy storage devices, such as ultrahigh capacitance supercapacitors or "pseudocapacitors," and methods of making and using the same are set forth herein. Such devices include one or more nanocomposite electrodes, which are advantageously fabricated using methods and/or materials that are readily scalable for high volume applications. The separator-free energy storage devices described herein, and components thereof, also exhibit longer cycling lifetimes than previously demonstrated.

Implementations described herein can be understood more readily by reference to the following detailed description, examples, and drawings. The devices and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the scope of the disclosure.

Further, all ranges disclosed herein are to be understood to encompass any and all subranges subsumed therein. For example, a stated range of "1.0 to 10.0" should be considered to include any and all subranges beginning with a minimum of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" should generally be considered to include the end points of 5 and 10.

Further, when the phrase "up to" is used in connection with an amount or quantity; it is to be understood that the amount is at least a detectable amount or quantity. For example, a material present in an amount "up to" a specified amount can be present from a detectable amount and up to and including the specified amount.

I. Separator-Free Energy Storage Device

In one aspect, separator-free energy storage devices are disclosed. Such devices comprise a first electrode and a second electrode. In some embodiments, the first electrode is opposite the second electrode. The first and/or second electrodes are formed from a nanocomposite material. The nanocomposite material includes plurality of carbon nanostructures, each of which is at least partially coated with a layer of material comprising a transition metal oxide. In some embodiments, the coating layer is uniform or substantially uniform in one or more properties. Notably, the energy storage devices described herein are devoid of a separate and discrete physical membrane or separator disposed between the first and second electrodes. Rather, the transition metal oxide of the nanocomposite material forming each electrode functions and/or serves as both the pseudo-active material and the separator.

Referring now to specific components of the nanocomposite materials that form one or more electrodes of the energy storage devices described herein, such nanocomposites comprise a plurality of carbon nanostructures. The carbon nanostructures may include, without limitation, a plurality of carbon nanotubes, carbon nanofibers, graphene, carbon nanospheres, a graphene nanofoam (GF), a reduced graphene oxide (rGO), or carbon nanodots. The plurality of carbon nanostructures can be interconnected to form an electrode structure (e.g., a film, platform, trace, etc.), which advantageously results in an electrode having a greater surface area for storing electrical energy. In certain embodiments, the facial (i.e., outer, exterior) surfaces of each carbon nanostructure can be at least partially coated with a uniform, or substantially uniform layer of material comprising a transition metal oxide. More than one layer may be provided over the carbon nanostructure. For example, at least two layers may be disposed over each carbon nanostructure, at least three layers may be disposed over each carbon nanostructure, five layers may be disposed over each carbon nanostructure or between 1-1000 layers may be disposed over each layer, including subranges therebetween (e.g., 1-10 layers; 1-20 layers; 1-50 layers; 5-100 layers; 2-200 layers; etc.). The transition metal oxide may include, without limitation, a metal oxide selected from the group of $Al_2O_3$, $Bi_2O_3$, $Bi_2O_5$, $MoO_2$, $RuO_2$, $Sb_2O_3$, NbO, $NbO_2$, SnO, $SnO_2$, CrO, $CrO_2$, $Cr_2O_3$, $ZrO_2$, $B_2O_3$, $V_2O_5$, $TiO_2$, NiO, $Ni_2O_3$, $MnO_2$, $Mn_2O_3$, CoO, $Co_2O_3$, FeO, $Fe_2O_3$, $ZrO_2$, $Ta_2O_5$, $HfO_2$, $Y_2O_3$, and/or any combination thereof.

In some embodiments, the transition metal oxide can be doped with one or more ionic species. Suitable ionic species can include, but are not limited to, alkali metal ions, alkaline earth ions or mixtures thereof. In some embodiments, for example, the transition metal oxide is doped with $Li^+$, $Na^+$, $K^+$, or various mixtures thereof.

Further, the carbon nanostructures forming the nanocomposite materials described herein include a nanoscale diameter. Exemplary diameter measurements are provided in Table 1 below.

TABLE 1

Carbon Nanostructure Diameters

| |
|---|
| <1000 nm |
| 1-800 nm |
| 5-800 nm |
| 20-800 nm |
| 50-500 nm |
| 100-800 nm |
| 200-600 nm |
| 200-500 nm |
| 250-550 nm |
| 250-450 nm |
| 300-500 nm |
| 300-400 nm |
| 400-600 nm |
| 400-500 nm |

The carbon nanostructures forming the nanocomposite materials described herein are coated with a layer of material that includes a transition metal oxide. Each carbon nanostructure may be partially coated or substantially fully coated. For example, the layer of transition metal oxide may cover about 10-100% of the facial surface of each carbon nanostructure in the nanocomposite structure, or any subrange thereof (e.g., 20-80%, 50-90%, 50-100%, etc.). Notably, the layer of transition metal oxide is thick enough to simultaneously function or serve as the active material for storing electrical energy and the separator in supercapacitor devices. Thus, the need for a separate and discrete separator is obviated.

Obviating the separator allows the devices herein to have a higher specific capacitance by virtue of the increased electrode surface area and decreased electrode spacing. Obviating the separator further allows devices herein to have a thinner, more compact size and/or footprint for incorporation and/or integration in smaller devices, such as smaller electronic devices (e.g., mobile devices, wearable electronics) and/or the circuits of such devices. Exemplary data regarding the thickness of the layer of transition metal oxide that contacts and coats the carbon nanostructures is in Table 2 below.

TABLE 2

Nanocomposite Characteristics

| Thickness of Metal Oxide Coating/Layer | Total/Overall Thickness of Coated Carbon Nanostructures (NS) (i.e., Carbon NS Thickness/Diam. + Metal Oxide Layer) | Thickness Ratio (i.e., Thickness/ Diam. of Individual Carbon NS: Coated Carbon NS) |
|---|---|---|
| 0.5-6.0 μm | 0.6-6.5 μm | 1:20 |
| 1.0-4.0 μm | 2.0-6.0 μm | 1:10 |
| 2.0-6.0 μm | 2.0-5.0 μm | 1:8 |

TABLE 2-continued

Nanocomposite Characteristics

| Thickness of Metal Oxide Coating/Layer | Total/Overall Thickness of Coated Carbon Nanostructures (NS) (i.e., Carbon NS Thickness/Diam. + Metal Oxide Layer) | Thickness Ratio (i.e., Thickness/ Diam. of Individual Carbon NS: Coated Carbon NS) |
|---|---|---|
| 3.0-5.0 μm | 3.0-5.0 μm | 1:6 |
| 3.0-4.0 μm | 3.0-4.0 μm | 1:4 |

(NOTE:
Data in each column is independent from data in each of the remaining columns.)

The nanocomposite materials that comprise carbon nanostructures coated with a transition metal oxide are formed into one or more electrodes and disposed in a device for storing electrical energy. The energy that is stored using the devices described herein can subsequently be released for electrically powering one or more other devices (e.g., mobile devices, computers, vehicles, wearable computers, etc.). Each electrode can be formed as a sheet, film, plate, coating or any other structure that is not inconsistent with the instant disclosure. Each electrode can also be flexible and capable of withstanding being folded, stretched, and//or physically manipulated.

The devices and/or electrodes formed from the nanocomposite materials described herein comprise an overall thickness; which may be less than the thickness of existing supercapacitor electrodes and/or devices by virtue of obviating the need for a separate, physically discrete membrane or separator. Exemplary thickness data is in Table 3 below.

TABLE 3

Individual Electrode Thickness

| |
|---|
| <1000 μm |
| 1-1000 μm |
| 10-1000 μm |
| 20-800 μm |
| 500-1000 μm |
| 100-500 μm |
| 100-200 μm |
| 50-200 μm |
| 40-100 μm |
| 40-50 μm |
| 10-25 μm |
| 10-15 μm |
| 2-25 μm |
| 1-10 μm |

As noted above, the energy storage devices described herein include at least one pair of electrodes for storing electrical energy. Each pair of electrodes includes a first electrode provided or disposed opposite a second electrode. As the materials forming the electrodes described herein obviate the need for a membrane or separator in the space between opposing electrodes, such devices can utilize electrodes that are spaced more closely together, which in turn reduces the thickness of the resultant energy storage device. Opposing electrodes may be spaced apart a distance that is <500 μm, <250 μm, <100 μm, <50 μm, <10 μm, <2 μm, etc., or distances falling in any of the ranges noted below. Exemplary measurements for the space, distance, and/or gap disposed between opposing electrodes in each pair of electrodes is in Table 4 below.

TABLE 4

| Electrode Spacing |
| --- |
| <500 µm |
| 0.5-500 µm |
| 0.5-250 µm |
| 0.5-100 µm |
| 0.5-50 µm |
| 0.5-10 µm |
| 1-8 µm |
| 1-5 nm |
| 1-2 µm |
| 1-1.5 µm |

The electrodes described herein have a surface area (e.g., a substantially planar surface area) of about 0.1-9 cm² g⁻¹, 1-20 cm² g¹, 1-100 cm² g¹, 1-1000 cm² g⁻¹, etc. Any surface area not inconsistent with the instant disclosure may be provided.

Energy storage devices that incorporate nanocomposite electrodes can further comprise an electrolyte disposed between the first and second electrodes. The electrolyte can comprise a solid phase material or a liquid phase material. Solid phase materials may include, without limitation, semi-solid materials such as gels or "sol-gels", foams, or creams. Liquid phase materials may include, without limitation, an ionic liquid, or electrolyte solution, which comprises both an anionic compound and a cationic compound.

II. Method of Making Separator-Free Energy Storage Device

According to further aspects, methods of making separator-free energy storage devices are provided. Such methods include, providing a plurality of carbon nanostructures, depositing a layer of material on each of the plurality of carbon nanostructures to form a nanocomposite film, where the layer of material comprises a transition metal oxide, and forming the nanocomposite film into a first electrode. The first electrode may be formed into a sheet, film, plate or other structure. The electrode may also be adhered or printed on or over a substrate. In certain embodiments, the electrode is flexible. Such methods further include disposing the first electrode opposite a second electrode in an electrochemical cell. Moreover, the layer comprising a transition metal oxide may be uniform or substantially uniform in one or more properties.

Methods of making a separator-free energy storage device may further include fabricating the plurality of interconnected carbon nanofibers via electrospinning. In some embodiments, electrospinning includes spinning a polyacrylonitrile (PAN) on a collector to form a fiber fabric and then pressing and carbonizing the fabric. Other electrospinning techniques may also be used and/or provided.

Electrospun carbon nanofibers have reasonably electrical conductive cores (e.g., having a conductivity: 1~10 S/cm) that support and utilize electro-active metal oxides, e.g., MnO₂, coatings. Moreover, electrospun carbon nanofibers provide an excellent mechanical scaffold with porosity and interconnectivity for superior hybrid structure.

Electrospun carbon nanostructures are but one embodiment of the carbon nanostructures that may be used to form electrodes for energy storage devices described herein. However, electrospinning is not required. Other carbon nanostructures may be fabricated according to different fabrication techniques and used as electrode scaffolds for transition metal oxides. Such nanostructures may include carbon nanotubes, carbon nanofibers, graphene, nanospheres, nanodots, graphene nanofoam (GF), or a reduced graphene oxide (rGO) scaffold. Any other type of carbon nanostructure not inconsistent with the instant disclosure may be fabricated and used as a scaffold for transition metal oxides.

Further, a uniform layer of the transition metal oxide may be deposited on each of the plurality of carbon nanostructures. The transition metal oxide may include MnO₂ that is electrodeposited on each of the plurality of carbon nanostructures. Any other transition metal oxide set forth in section I may also be used. In some embodiments, low current electrodeposition techniques are used to grow a fine and firm layer of the metal oxide (e.g., MnO₂). The aforementioned fabrication processes (i.e., electrospinning and electrodeposition) are facile and scalable. A high specific capacitance of 579 F/g is attained for the whole electrodes, which is higher than existing devices. A capacitance of 1247 F/g based on pristine MnO₂ is achieved. Full cell tests based on ECNFs/MnO2 were done to demonstrate the good cycle lives of this nanostructure, the results of which are set forth in the examples below.

In further embodiments, an electrolyte is provided between the first and second electrodes. The electrolyte can comprise a solid phase material (including semi-solid phases such as gels or foams) or a liquid phase material. The energy storage device may store energy via electrically charging and discharging the electrodes in the presence of an external magnetic field. The external magnetic field is optional.

III. Method of Storing Energy Using a Separator-Free Energy Storage Device

According to further aspects, methods of storing energy using separator-free energy storage devices are provided. Such methods include, providing a supercapacitor comprising at least one electrode formed from a plurality of carbon nanostructures coated with a uniform layer of material comprising a transition metal oxide. Such methods further comprise electrically charging and discharging the supercapacitor in the presence of a magnetic field. The magnetic field is optional and, where applied, may be low (e.g., milli-T (mT)). The magnetic field may advantageously enhance the energy storage capabilities. In certain embodiments, the magnetic field provided while charging the supercapacitor is 0.1-0.5 mT, 0.1-1 mT, 0.1-2 mT, 0.1-5 mT, 1-2 mT, or 1-5 mT.

Methods of storing energy can further comprise electrically charging and discharging the supercapacitor for more than 1,000 cycles, more than 2,000 cycles, more than 10,000 cycles, or a subrange of 1,000-100,000 cycles. The supercapacitors described herein are operable to include a capacitance of 100-2000 F/g, 200-2000 F/g, or any subrange therebetween (e.g., 500-1500 F/g, 500-2000 F/g, 1000-2000 F/g, 100-1000 F/g, 200-1000 F/g etc.).

Some embodiments described herein are further illustrated in the following non-limiting examples.

EXAMPLE 1

Fabrication of ECNF/MnO₂ Nanocomposites

The nanostructures forming the nanocomposite electrodes as described above can include electrospun carbon nanofibers (ECNFs) coated with Manganese dioxide (MnO₂). Polyacrylonitrile(PAN) induced ECNFs/MnO₂ nanocomposites were fabricated as ultra-thin freestanding electrodes using electrospinning and electrochemical deposition. As the data indicates below, ECNFs/MnO₂ hybrid electrodes demonstrate an ideal energy storage behavior due to the high electrochemical capacitance of MnO₂ and the good interconnect properties of ECNFs.

The morphology and energy storage performance of the MnO$_2$ coating were investigated using a Scanning Electron Microscope (SEM), cyclic voltammetry (CV), electrochemical impedance spectroscopy (EIS) and a galvanostatic charging/discharging technique. The maximum specific capacitance attained to 579 F/g for the whole electrodes and 1247 F/g based on the pristine MnO$_2$. The freestanding electrode also exhibited good rate capability (i.e., a power density of 26.5 kW/kg and an energy density of 121.3 Wh/kg at 10 A/g) and long-term cycling stability (i.e., retaining 92.4% of its initial capacitance after 2000 cycles). These characteristics and other observations suggested that such freestanding ECNFs/MnO$_2$ nanocomposites are promising for high-performance pseudocapacitors.

FIG. 1 is a schematic illustration of the equipment and processes used to fabricate ECNFs/MnO$_2$ nanocomposites. Polyacrylonitrile (PAN, Mw=150,000, Aldrich) was purchased from Aldrich and used without further purification. As a facile and efficient technique for producing ultrathin fibers in diversified texture, electrospinning was used to produce carbon nanofibers. During the procedure, a 10 wt. % PAN solution in dimethylformamide (DMF) was electrospun onto a collector to form a fiber fabric. The applied positive voltage was 18 kV and the distance between the needle tip and the collector was 15 cm. The dense fiber fabric was collected from the steel collector covered with aluminum foil and pressed by two heated metal plates into a compact sheet at 100° C. under 5 MPa pressure for 5 min. The obtained sheet was then put into a furnace for stabilization. The heating rate was 3° C./min from room temperature to 280° C. and kept for 2 h. The as-stabilized nanofibers were carbonized at 1000° C. for 2 hours at a heating rate of 5° C./min under N$_2$ atmosphere.

After the ECNFs were prepared, MnO$_2$ was electrodeposited onto the ECNFs by a galvanostatic method with a three-electrode setup (lower right of FIG. 1), where ECNFs, platinum, and Ag/AgCl were used as the respective working electrode, counter electrode, and reference electrode. The sheet of ECNFs was firstly cut into 1.5 cm$^2$ piece for electrodeposition then cut into 1 cm$^2$ for CV, EIS and galvanic charge/discharge tests.

An aqueous precursor solution with 10 mM MnSO$_4$ and 100 mM Na$_2$SO$_4$ was used as the electrolyte. The deposition was performed at constant charge flow but varies current and time to optimize the condition. After the optimization, deposition with constant current of 13.34 µA/cm$^2$ was performed. The MnO$_2$ mass loading was controlled by varying the deposition time from 0 to 10 h. To ensure that the deposition of MnO$_2$ took place uniformly and firmly on the ECNFs surface, the sheet of ECNFs was treated with 5% HNO$_3$ solution for 30 min at 80° C. before the deposition. The apparent area of the working electrode was 1 cm$^2$. After the deposition, the working electrodes were washed with distilled water and then dried at 80° C. for 5 h.

Materials characterization and electrochemical evaluation Raman spectroscopy (Horiba XploRA One Raman Confocal Microscope System) and X-ray powder diffraction (Agilent Technologies Oxford Gemini X-Ray Diffractometer) were employed to study the elemental components of ECNFs/MnO$_2$. The morphological observation was performed on Carl Zeiss Auriga-BU FIB FESEM Microscope (SEM).

Electrochemical performance of the as-prepared nanocomposite electrodes was performed on a bio-logic VMP3 electrochemical workstation using a three-electrode testing system with a platinum wire as the counter-electrode and Ag/AgCl as the reference electrode in 6 M of a potassium hydroxide (KOH) electrolyte solution. Cyclic voltammetry (CV) was carried out at different scan rates with a potential window from −0.3 to 0.5 V. Further, galvanostatic charging/discharging tests were measured with an industrial coin assembling at various current densities. The EIS were conducted in the frequency range between 0.1 Hz and 100 kHz. The average specific capacitance (C, F/g) from the CV curves is calculated according to the following integral equation (1) below.

$$C = \frac{1}{m \cdot v \cdot \Delta V} \int I_{(V)} dV \qquad (1)$$

The average specific capacitance (C, F/g), power density (P, kW/kg), and energy density (E, Wh/kg), from the charge/discharge curves can be calculated based on Eqs. (2)-(4) below:

$$C = \frac{I \cdot \Delta t}{m \cdot \Delta V} \qquad (2)$$

$$P = \frac{E}{t} = \frac{1}{2} \cdot I \cdot \Delta V \qquad (3)$$

$$E = \frac{1}{2} \cdot C \cdot (\Delta V)^2 \qquad (4)$$

In the above equations, m is the mass of active material (in grams, g), v (i.e., in Eq. (1)), is the potential scan rate in (mV/s), Δ(V) is the sweep potential window, I(V)(dV) are the voltammetric current on CV curves, I is the applied current, and t is the discharge time (in seconds).

Figures 2A, 2B:
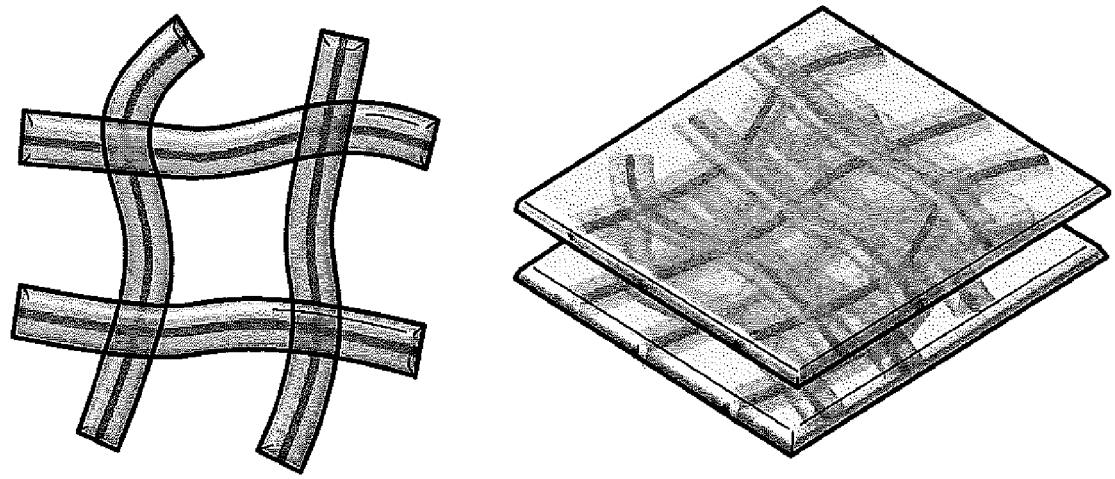
FIG. 2A is a schematic illustration of a nanocomposite material comprising a carbon nanostructure having a conformal metal oxide coating.
FIG. 2B is a schematic illustration of a supercapacitor or "pseudocapacitor" device incorporating a nanocomposite of FIG. 2A.

FIG. 2A is a schematic illustration of a nanocomposite material described herein. A conformal coating of MnO$_2$ is formed on and/or over ECNFs. The ECNFs are illustrated in black and have a long, fibrous appearance. The ECNFs can overlap, interconnect, and include pores therebetween. The MnO$_2$ coating is shown in a lighter gray color.

FIG. 2B is a schematic illustration of a pseudocapacitor incorporating electrodes formed from the ECNFs/MnO$_2$ nanocomposite material. The electrolyte between electrodes is 6M KOH in water.

Figure 3A:
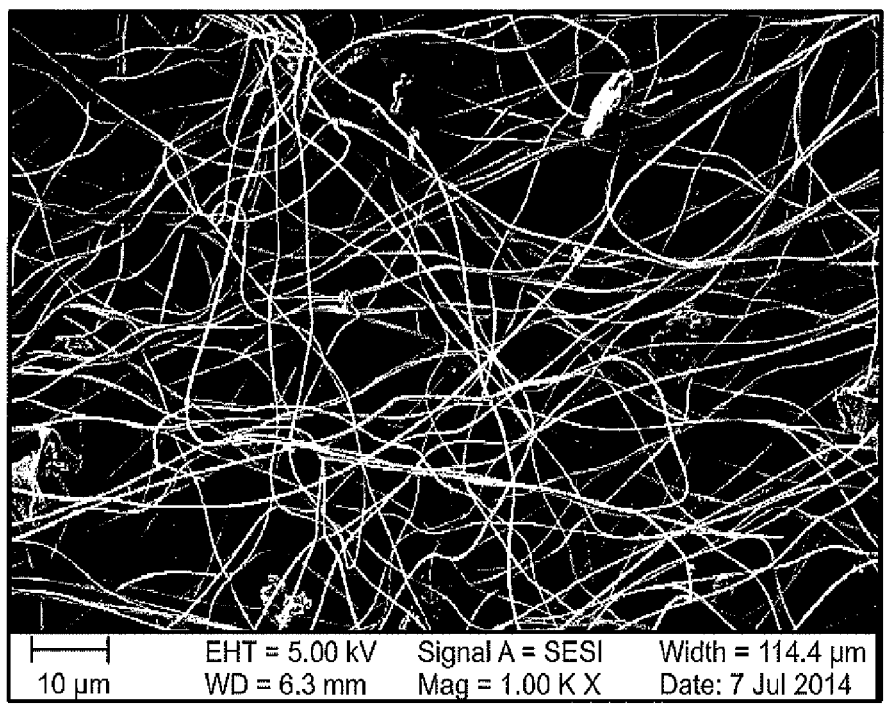
FIGS. 3A-3D are Scanning Electron Microscopy (SEM) images of nanocomposite materials for an energy storage device according to some embodiments.
Figure 3B:
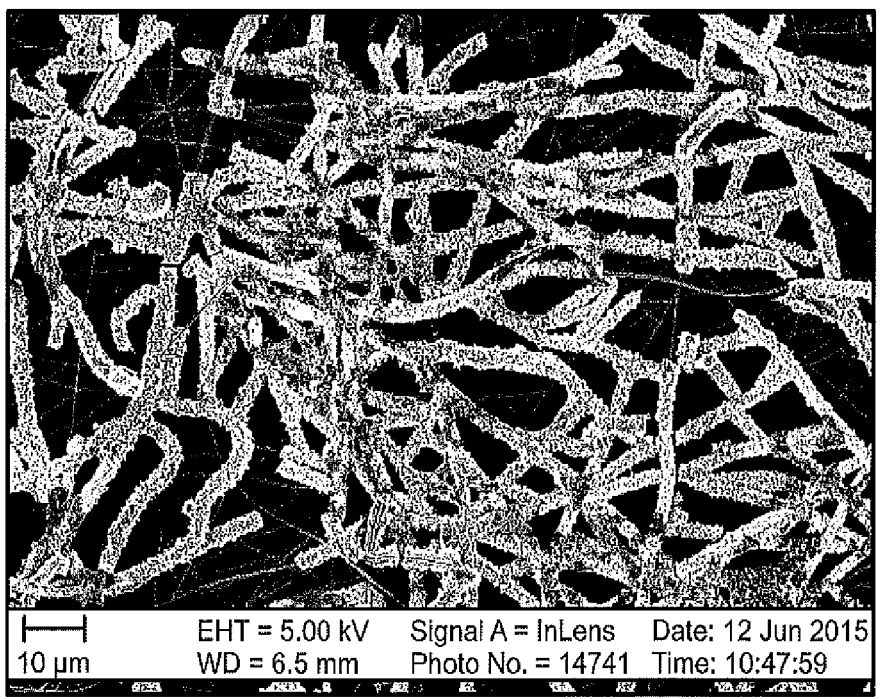
Figure 3C:
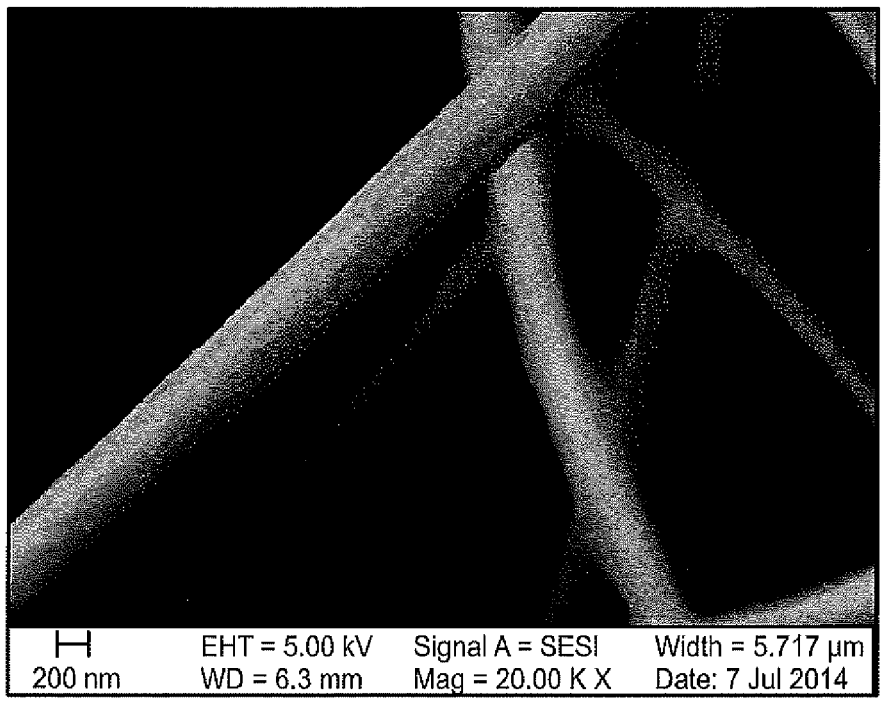
Figure 3D:
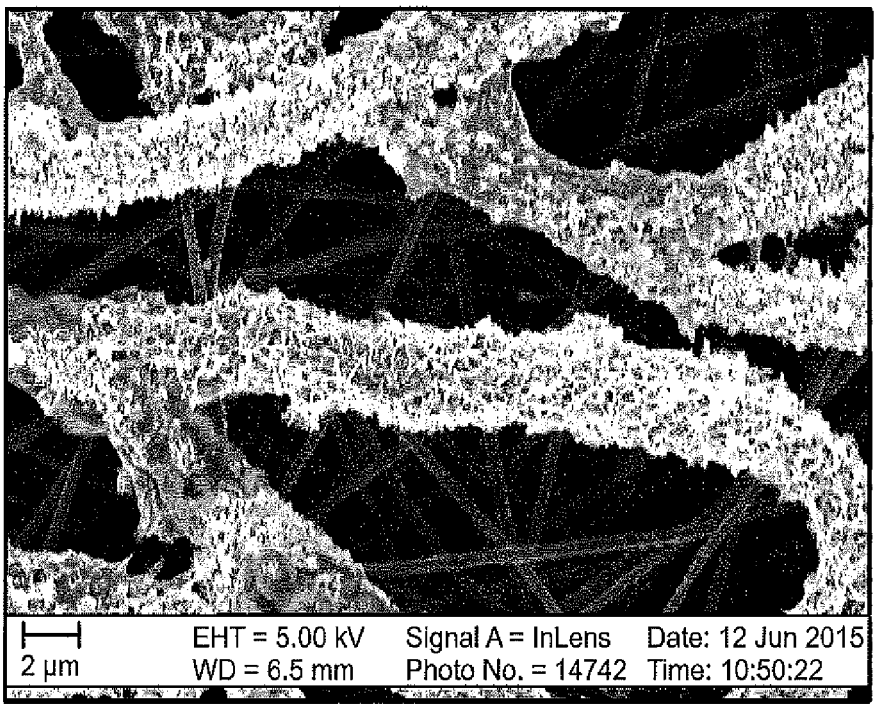

FIGS. 3A-3B are SEM images of ECNFs and FIGS. 3C-3D are SEM images of ECNFs/MnO$_2$ nanocomposite materials when viewed using different magnifications.

Figure 4:
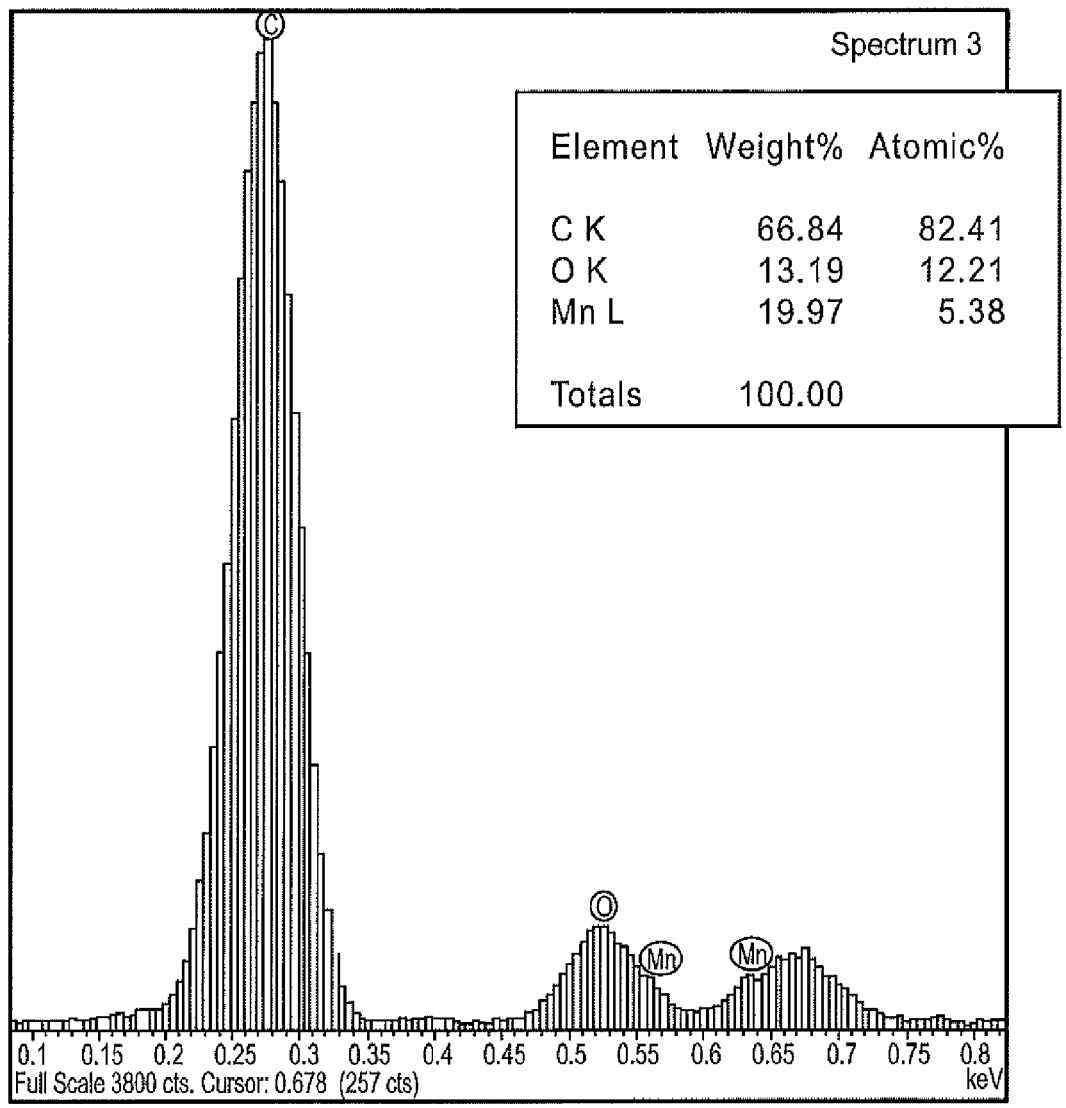
FIG. 4 is the energy-dispersive x-ray spectroscopy (EDX) spectrum of a nanocomposite after 8 hours of deposition, the inset is the weight and atomic element ratio of C, O, and Mn in the pseudocapacitor electrode.

FIG. 4 is the EDX spectrum of ECNFs/MnO$_2$ after 8 h deposition. The inset of FIG. 4 is the weight and atomic element ratio of C, O, and Mn in the pseudocapacitor electrode fabricated from carbon nanostructures coated with MnO$_2$. EDX showed that the surface composition of the electrochemically deposited electrodes was composed of the elements C, O, and Mn, which confirmed that the deposited layers were manganese oxides. The atomic percentage of O and Mn is 12.21%, 5.38%, respectively. The ratio of O vs. Mn is larger than 2 as some O$_2$ is absorbed in the ECNFs. As an electrochemical capacitor, the high length to diameter ratio of both carbon fibers and deposited MnO$_2$ layers can facilitate the electron transfer in the continuous interconnected microstructure.

In this example, ECNFs were fabricated with a facile method using carbonized PAN via electrospinning. Then, MnO$_2$ was deposited onto the ECNFs via an electrochemical method. This approach of fabricating pseudocapacitor electrodes has some advantages. For example, ECNFs serve as an improved current collector that is much lighter than metal foil, which can reduce the total weight of the pseudocapacitor cell. Further, ECNFs provide a macroporous surface which allows for a large mass loading of $MnO_2$. Additionally, small current electrodeposition forms strong binding between ECNFs and $MnO_2$, which results in more stable performance. The low cost of raw materials (i.e., PAN, $MnO_2$) and the fabrication methods provide low-cost pseudocapacitors. A uniform coating of $MnO_2$ on the ECNFs is a result of the small current electrodeposition and the $HNO_3$ treatment. The $HNO_3$ surface treatment will introduce —COOH groups onto the ECNFs surface and facilitate the crystallization of $MnO_2$. Electrodes are formed from a sheet of interconnected ECNFs coated with $MnO_2$. The ECNFs have smooth surfaces with diameters ranging from 300 nm to 500 nm, in certain embodiments, and lengths greater than hundreds of microns. The microstructural morphology of the nanocomposites includes ECNFs having a layer of $MnO_2$, the $MnO_2$ can have a thickness of is around 3-5 µm.

Figure 5:
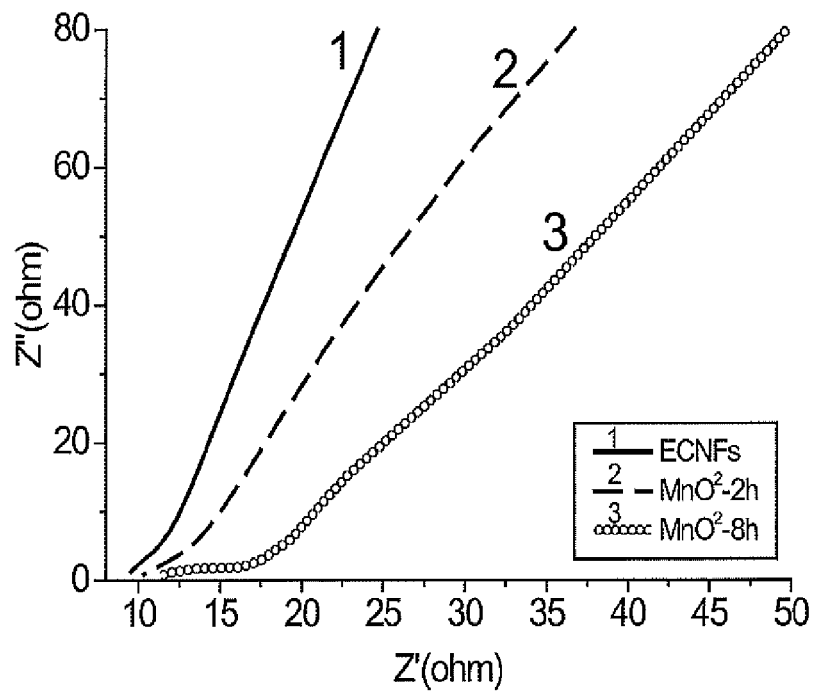
FIG. 5 is the Electrochemical Impedance Spectroscopy (EIS) of a nanocomposite material for an energy storage device according to some embodiments.

FIG. 5 is an EIS plot of pure ECNFs (line 1), ECNFs/$MnO_2$ at 2 h deposition (line 2), and ECNFs/$MnO_2$ with 8h deposition (line 3). The EIS impedance of pure ECNFs, 2 h-deposited $MnO_2$, and 8 h-deposited $MnO_2$ were tested to obtain the information on the dynamic ion diffusion in electrodes fabricated from these three materials. The ECNFs spectrum shows approximately 8Ω impedance contributed by electrolyte between the working electrode and counter electrode. The impedance spectrum for ECNFs-$MnO_2$ reflects the combination of ECNFs to $MnO_2$ interfaces resistance and electrolyte resistance. For example, the total resistance of ECNFs/$MnO_2$ textile with an 8 h deposition at 100 kHz is 17Ω, and 9Ω is contributed by the textile electrode and 8Ω by the electrolyte.

Figure 6:
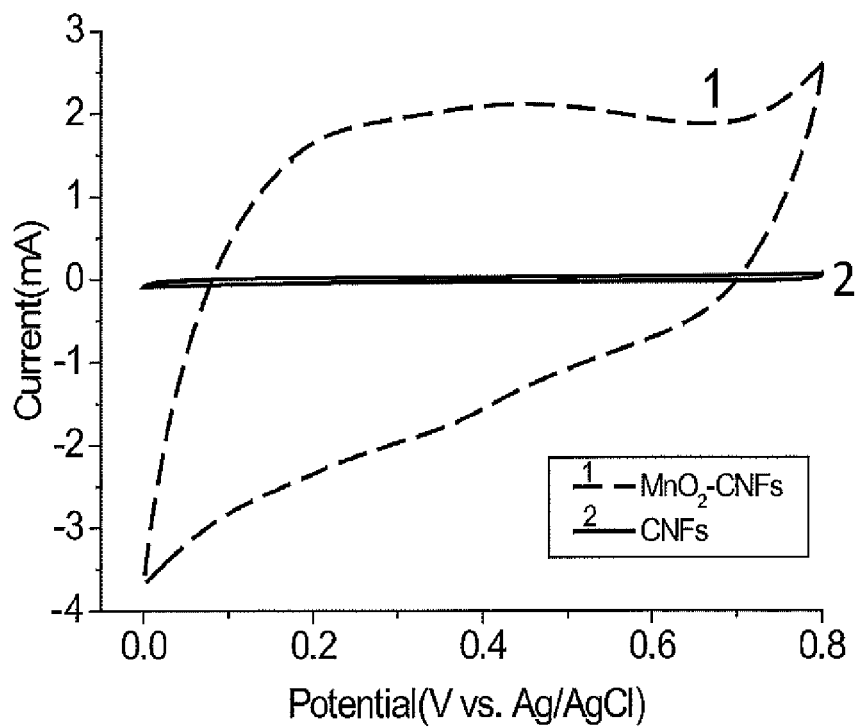
FIG. 6 is a cyclic voltammetry (CV) comparison for nanocomposite materials according to some embodiments.

FIG. 6 is a CV scan comparison of ECNFs and ECNFs/$MnO_2$ at scan rates of 20 mV/s. The electrochemical charge storage capacities of the prepared samples can be investigated using CV. The CV of ECNFs and 8 h-deposited ECNFs/$MnO_2$ were taken at a scan rate of 20 mV/s to show the advantage of the electrodeposited ECNFs/$MnO_2$ structure.

Figure 7A:
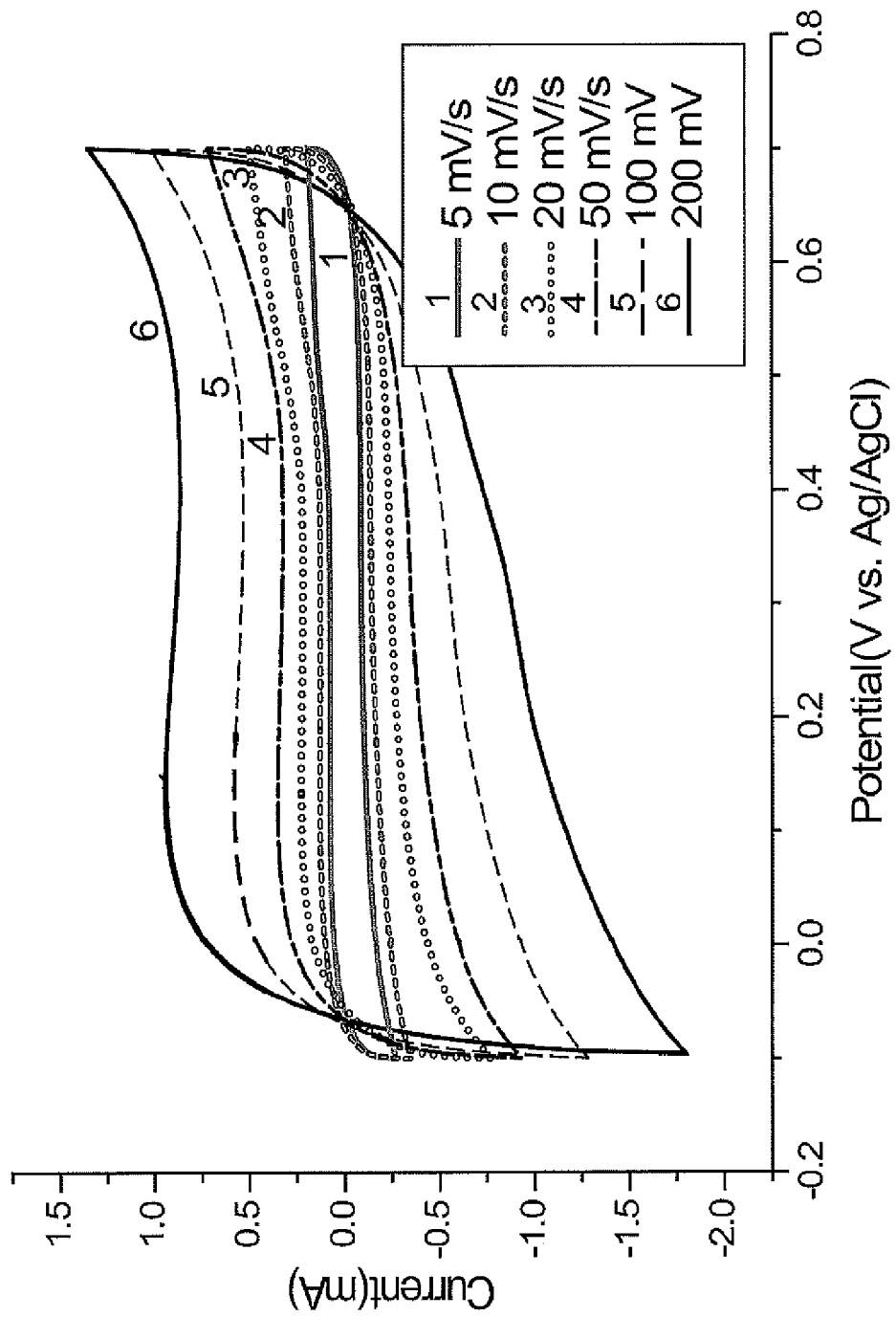
FIGS. 7A-7B are CV scans for nanocomposite materials at various scan rates according to some embodiments.
Figure 7B:
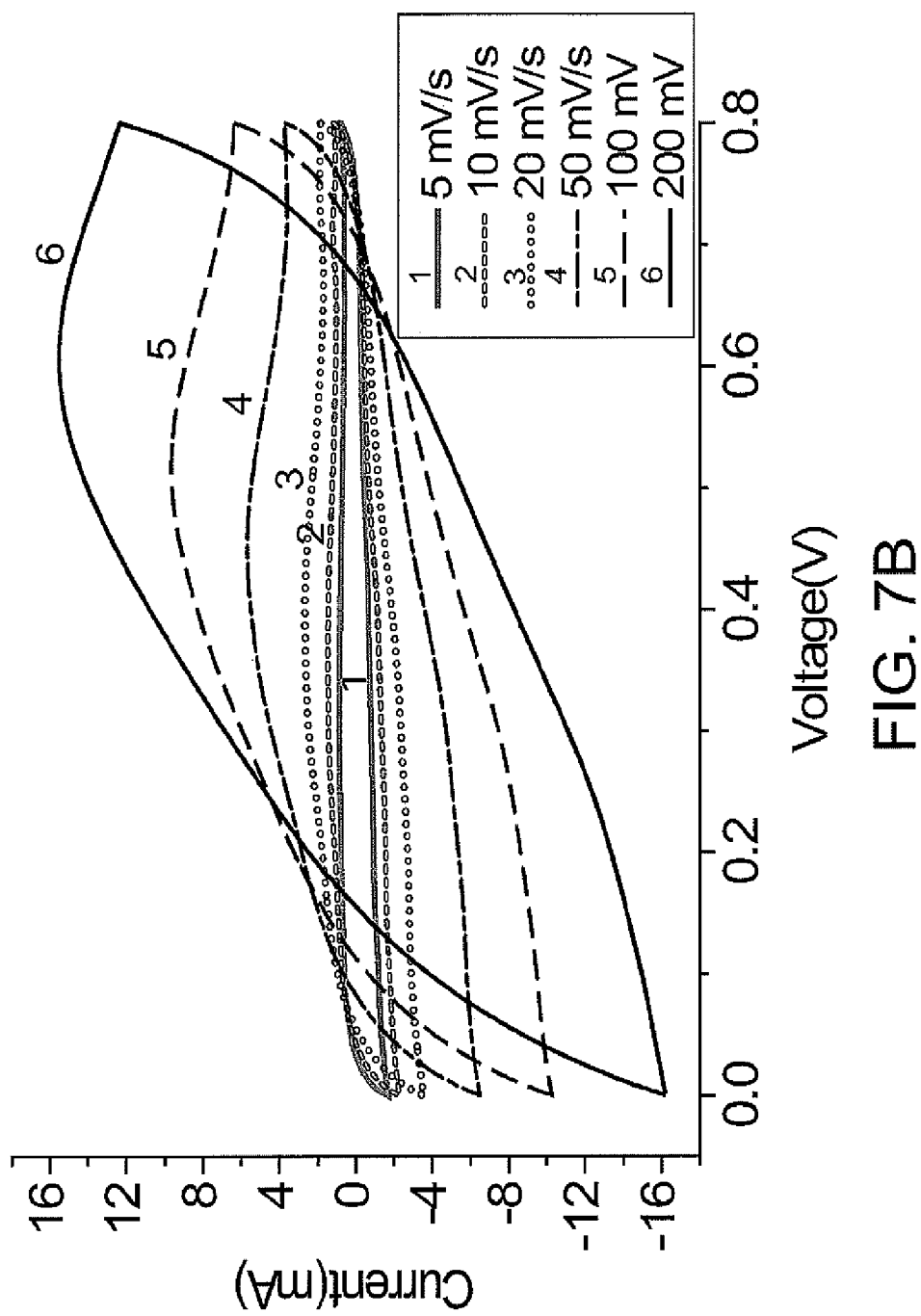

FIGS. 7A-7B are CV scans of ECNFs/$MnO_2$ after 2 h (FIG. 7A) and 8 h (FIG. 7B) deposition at different scan rates. The 2 h-ECNF/$MnO_2$ nanocomposite has an increased capacitance behavior and still maintains a good rectangular shape. The 8 h-ECNF/$MnO_2$ nanocomposite has the highest capacitive performance at 5 mV/s with a disordered rectangular shape. The shapes of the CV curves are stretched along the y-axis when the scan rate increased from 5 m V/s to 200 mV/s.

Figure 8:
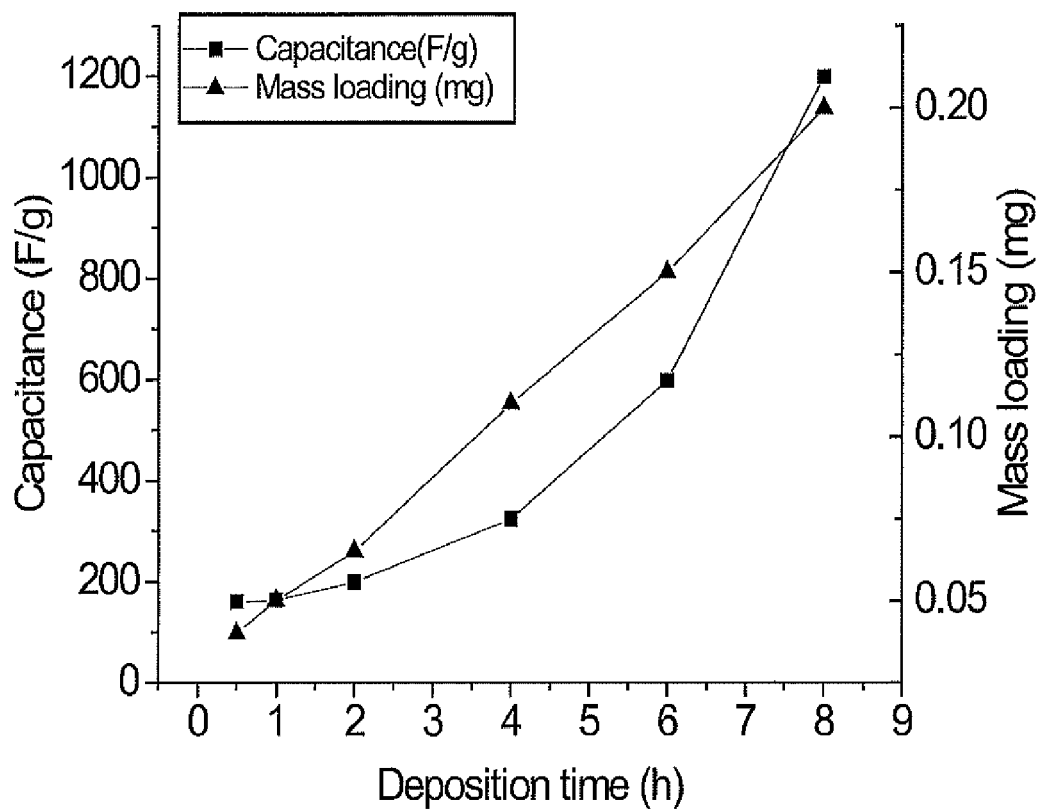
FIG. 8 is the specific capacitance and metal oxide weight versus deposition time according to some embodiments.

FIG. 8 is a graphical illustration of capacitance and mass loading. There is a huge capacitance increase of ECNFs after 8 h electrochemical deposition. The highest specific capacitance reached 1247 F/g. A specific capacitance of 339 F/g is achieved for ECNFs/$MnO_2$, while only 13 F/g for the pure ECNFs. This 25-fold difference in specific capacitance with respect to the redox reaction of $MnO_2$, formula can be written as follows:

$$4MnO_4^- + 3C + 2H^+ \rightarrow 4MnO_2 + 3CO_2 + 2H_2O$$

In order to investigate the relation between $MnO_2$ mass loading and the energy storage performance of the flexible supercapacitor, CV of samples with deposition time range from 0.5 h to 8h was done according to FIG. 8. The capacitance performance of the ECNFs/$MnO_2$ is linear to the mass loading of $MnO_2$. Furthermore, the capacitance largely increased when the mass loading was above 0.12 mg/$cm^2$ when the $MnO_2$ starts to form a firm layer on the ECNFs. The capacitance based on $MnO_2$ mass reached 1247 F/g at a mass loading of 0.2 mg/$cm^2$. When the $MnO_2$ mass loading increased to more than 0.2 mg/$cm^2$, the capacitance based on pristine $MnO_2$ is reduced and the CV shape was further disordered. The reason is that too thick of a $MnO_2$ layer will cause part of materials being electrochemically inactive and lower the conductivity of the charge transport circuit.

Overall an ideal capacitive character can be well maintained up to the scan rate of 200 mV/s for 2 h-ECNFs/$MnO_2$ whereas moderate disordered CV curves were observed for 8 h-ECNFs/$MnO_2$.

Figure 9A:
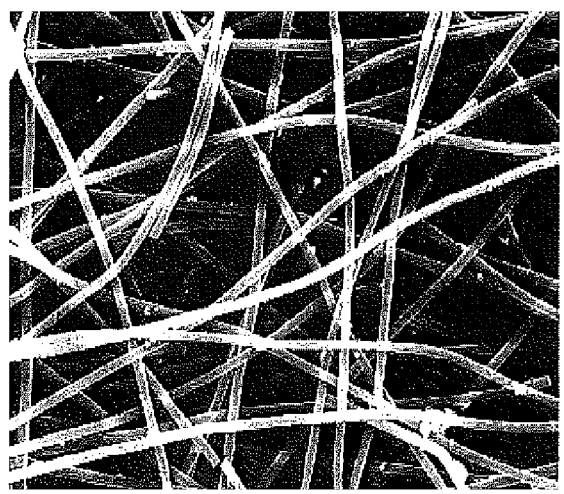
FIGS. 9A-9C are SEM images of various nanocomposite materials for separator-free energy storage devices according to some embodiments.
Figure 9B:
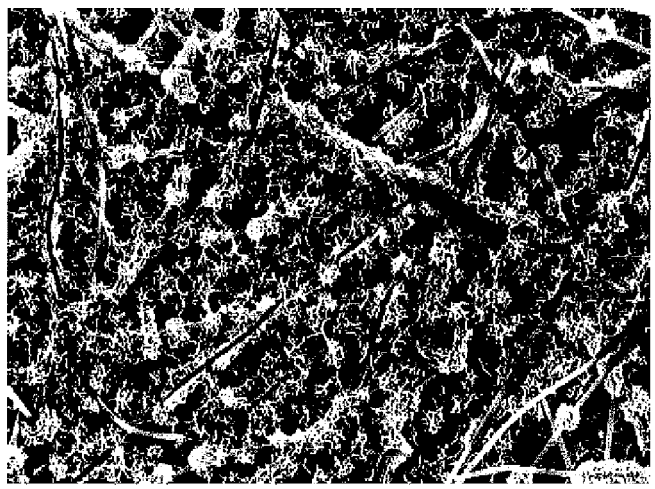
Figure 9C:
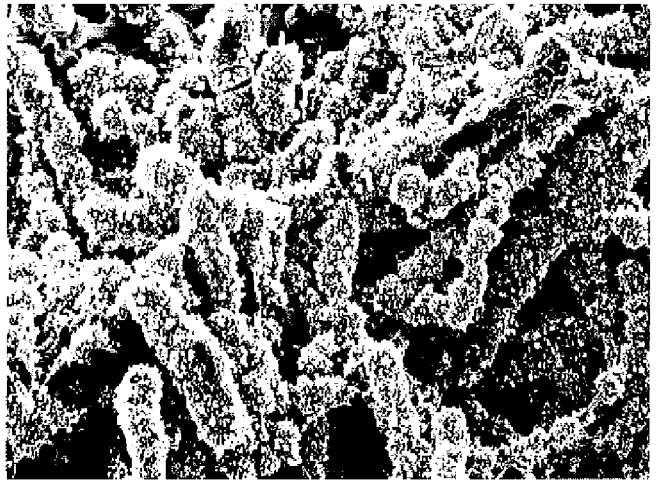

FIGS. 9A-9C are SEM images of various samples of ECNFs/$MnO_2$. The various samples are described in Table 5 below. Further, data for each sample is in FIGS. 10A-10B.

FIG. 9A is sample 1 ECNFs/$MnO_2$, 5 µA and 32h deposition. FIG. 9B is sample 3, 15 µA and 10.67 h deposition, and FIG. 9C is Sample 4 with 20 µA and 8 h deposition.

TABLE 5

| Sample# | 1 | 2 | 3 | 4 | 5 |
|---|---|---|---|---|---|
| Current (µA) | 5 | 10 | 15 | 20 | 40 |
| Deposition time (h) | 32 | 16 | 10.67 | 8 | 4 |

Figure 10A:
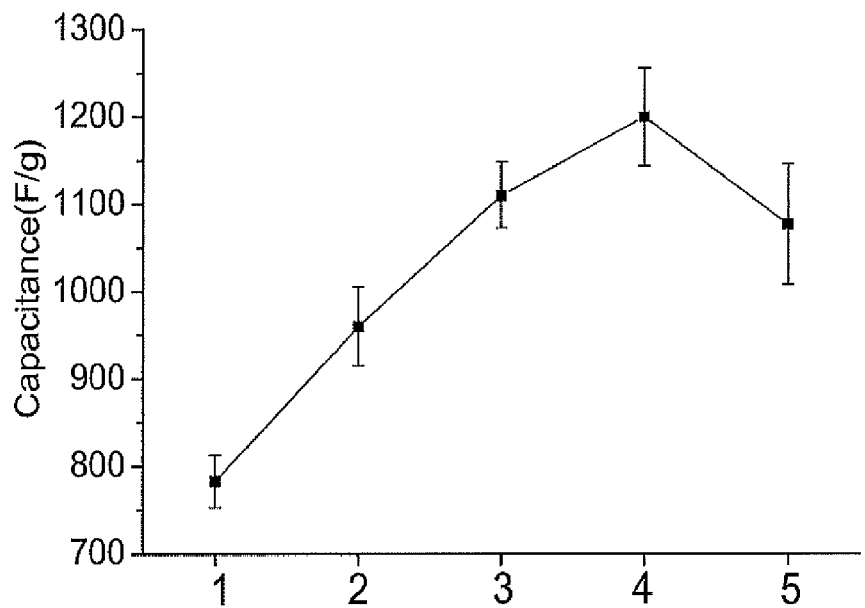
FIGS. 10A-10B is specific capacitance and energy density data according to some embodiments.
Figure 10B:
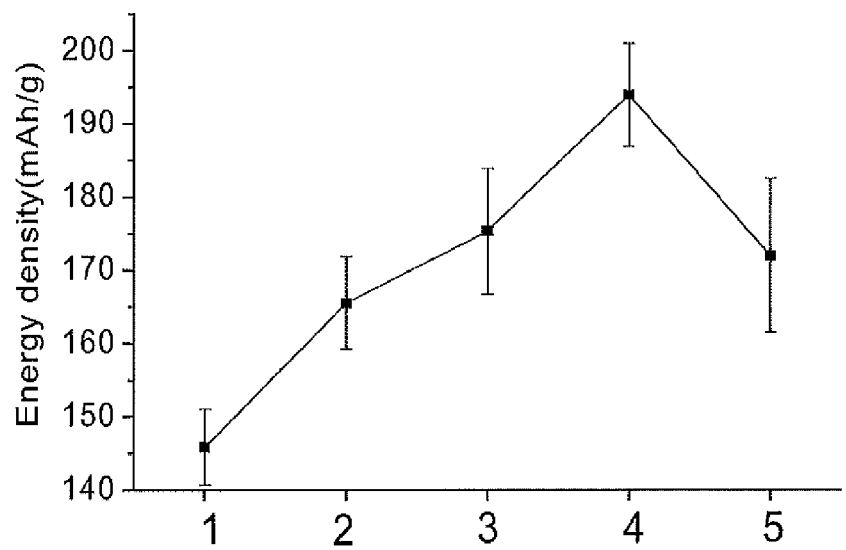

FIG. 10A is a graphical illustration of the specific capacitance for the various samples in the table above and FIG. 10B is a graphical illustration of the energy density for the above samples. To optimize the electrochemical deposition condition, batch CV tests were performed along with full cell charge/discharge tests after the electrochemical depositions. All samples have the same charge density (106.67 µAh/$cm^2$) but with various current and deposition times as noted in the table above. For example, the current ranged from 5 µA-40 µA while the deposition time is ranged from 4 h-32 h.

In FIG. 10A, the specific capacitance increases as the current increases until it reaches 40 µA. In FIG. 10B, the same trend shows in full cell charge/discharge tests. The energy density increases from 5-20 µA while decreasing above 20 µA. The main factors of such results are current and time. Insufficient $MnO_2$ mass loading occurs when the current is too small, as the circuit impedance will consume the charge flow. In contrast, when the current is too high (e.g., in this case above 20 µA), the $MnO_2$ crystal structure is rapidly formed which can leads to infirmly deposited layer.

Figure 11A:
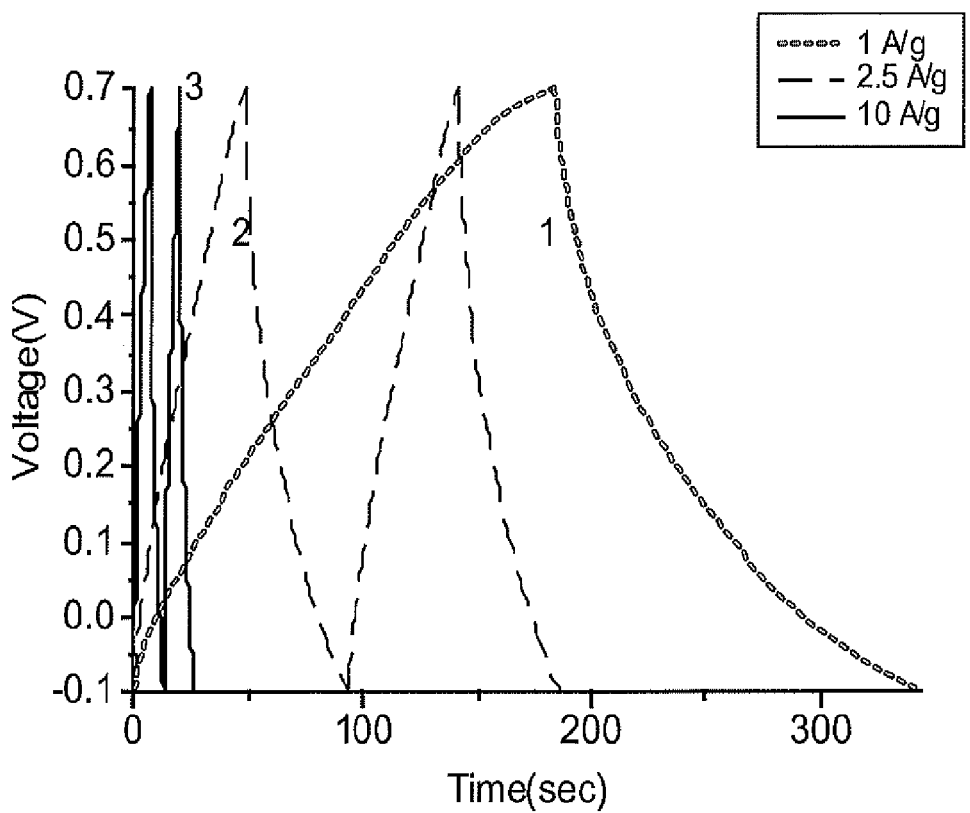
FIGS. 11A-11B is galvanostatic charge/discharge cycling at different rates for nanocomposite materials according to some embodiments.
Figure 11B:
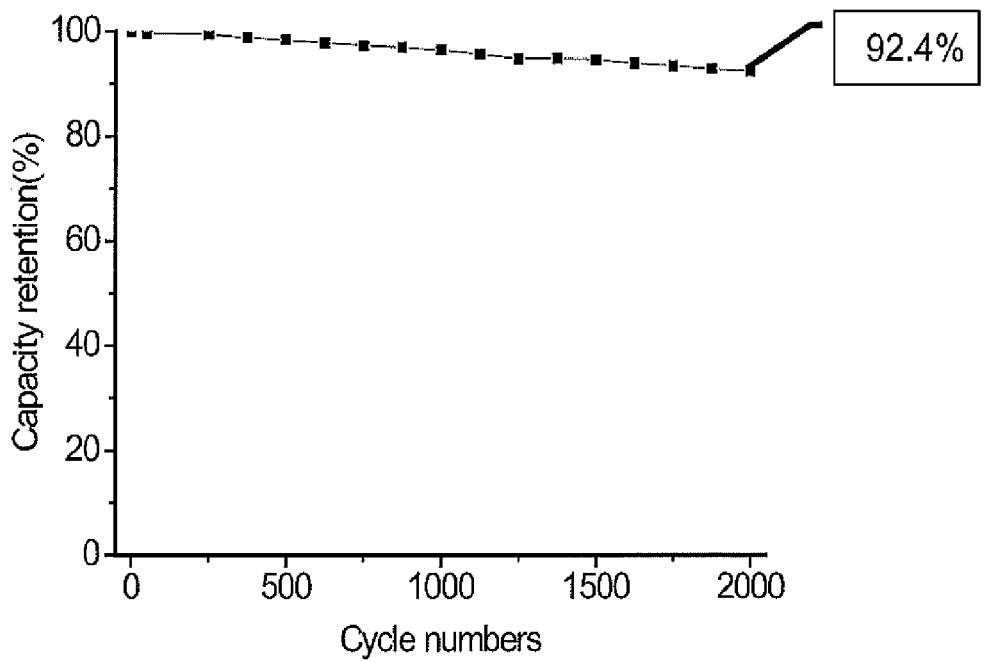

FIG. 11A is a galvanostatic charge/discharge cycling at different rates. FIG. 11B is the capacity retention of a full cell. Long cycling life is an important requirement for supercapacitor electrodes. The cycling life test over 2000 cycles for the flexible electrodes was carried out. FIG. 11A demonstrates the stable charge-discharge cycles at current 1 A/g, 2.5 A/g, 10 A/g, respectively. FIG. 11B illustrates that the ECNFs/$MnO_2$ electrodes showed only less than 8% decay in available specific capacity after 2000 cycles at charge/discharge current of 10 A/g.

In this example, the nanostructured ECNFs/$MnO_2$ composite was fabricated and characterized pseudocapacitor applications. An ultra-high specific capacitance of 1247 F/g based on mass of pristine $MnO_2$ and a high capacitance of 579 F/g based on whole electrode was achieved. Different electrochemical deposition methods were studied to find the optimal crystallization and formation of $MnO_2$ for pseudocapacitor application. Such pseudocapacitors can be achieved via low-cost materials and scalable processing promising for large-scale wearable energy storage.

EXAMPLE 2

Separator-Free Supercapacitor Designs and Characteristics

Separator free or "membraneless" supercapacitors can be formed from nanocomposite electrodes comprising carbon nanostructures coated with a transition metal oxide. The transition metal oxide coating functions as both an active layer for the pseudocapacitor and the separator. The transition metal oxide coating can be at least 1 μm thick, at least 2 μm thick, at least 3 μm thick, at least 4 μm thick, or from 1-10 μm thick. A ratio between the diameter of a respective carbon nanostructure and the thickness of the transition metal oxide coating the nanostructure (i.e., ECNF diameter: $MnO_2$ coating thickness) can be 1:2; 1:4; 1:8; 1:10; 1:20; or 1:50.

Figure 12:
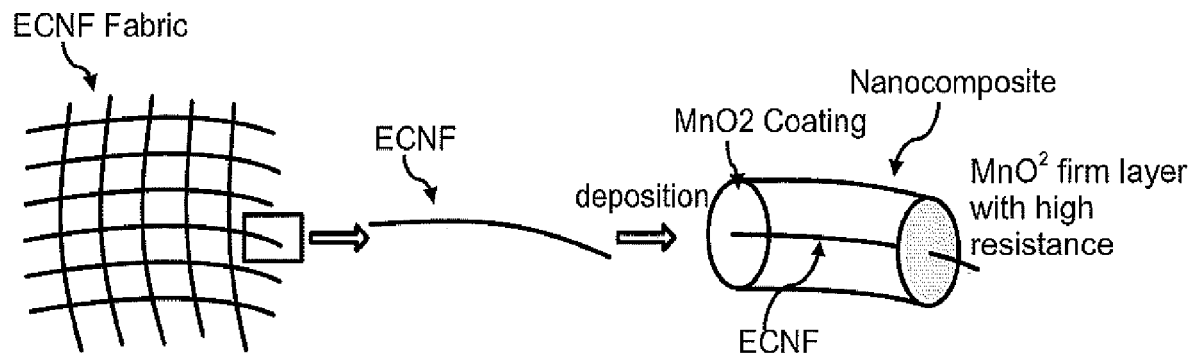
FIG. 12 is a schematic diagram of a nanocomposite material forming an electrode of a separator-free energy storage device according to some embodiments.

FIG. 12 is a schematic diagram of a nanocomposite material that forms electrodes of a separator-free energy storage device according to some embodiments. As FIG. 12 illustrates, initially an ECNF fabric is fabricated via electrospinning. Portions of each individual fiber in the fabric is deposited or coated with a transition metal oxide, such as $MnO_2$. The layer of $MnO_2$ can have a uniform, or substantially uniform thickness. In some embodiments, the $MnO_2$ is electrochemically deposited on or over the nanofibers (i.e., ECNFs). The resultant combination of ECNFs and $MnO_2$ form a nanocomposite material used as electrodes (e.g., an electrode sheet, plate, or film) in energy storage devices.

Figure 13:
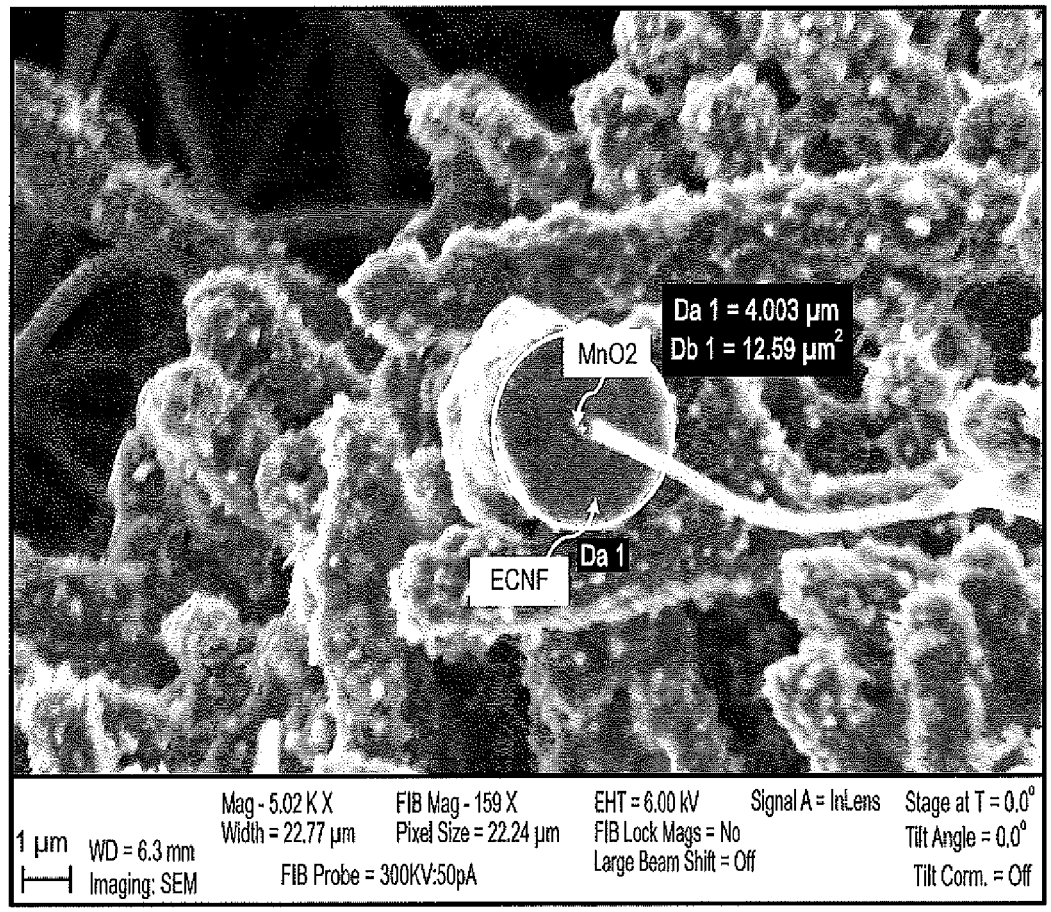
FIG. 13 is an SEM image of a nanocomposite material forming an electrode of a separator-free energy storage device according to some embodiments.

FIG. 13 is an SEM image of a nanocomposite material used to form electrodes of a separator-free energy storage device according to some embodiments. The carbon nanostructure (i.e., ECNF) has a nm scale diameter (e.g., 100-800 nm, 300-500 nm, 350-450 nm, etc.) and the $MnO_2$ coating is provided over, on and/or around the nanostructure. The coating can form a layer over the nanostructure that has an overall diameter of about 4 μm in some embodiments. Specifically, the SEM (i.e., at 5 k magnification) shows the diameter of the ECNF being around 470-500 nm, the diameter of the ECNF/$MnO_2$ nanocomposite being around 4 μm, and the thickness of $MnO_2$ layer being around 3.5 μm.

Figure 14A:
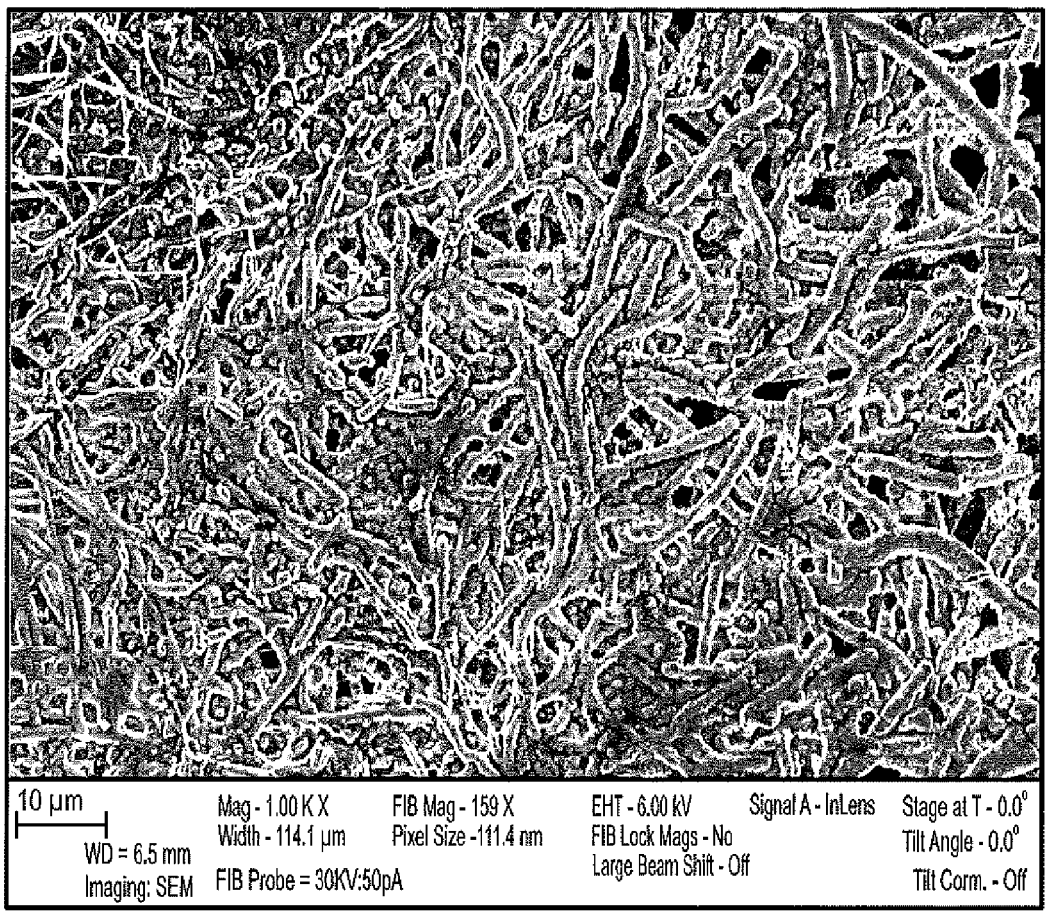
FIGS. 14A-14B are SEM images of nanocomposite materials forming an electrode of a separator-free energy storage device according to some embodiments.
Figure 14B:
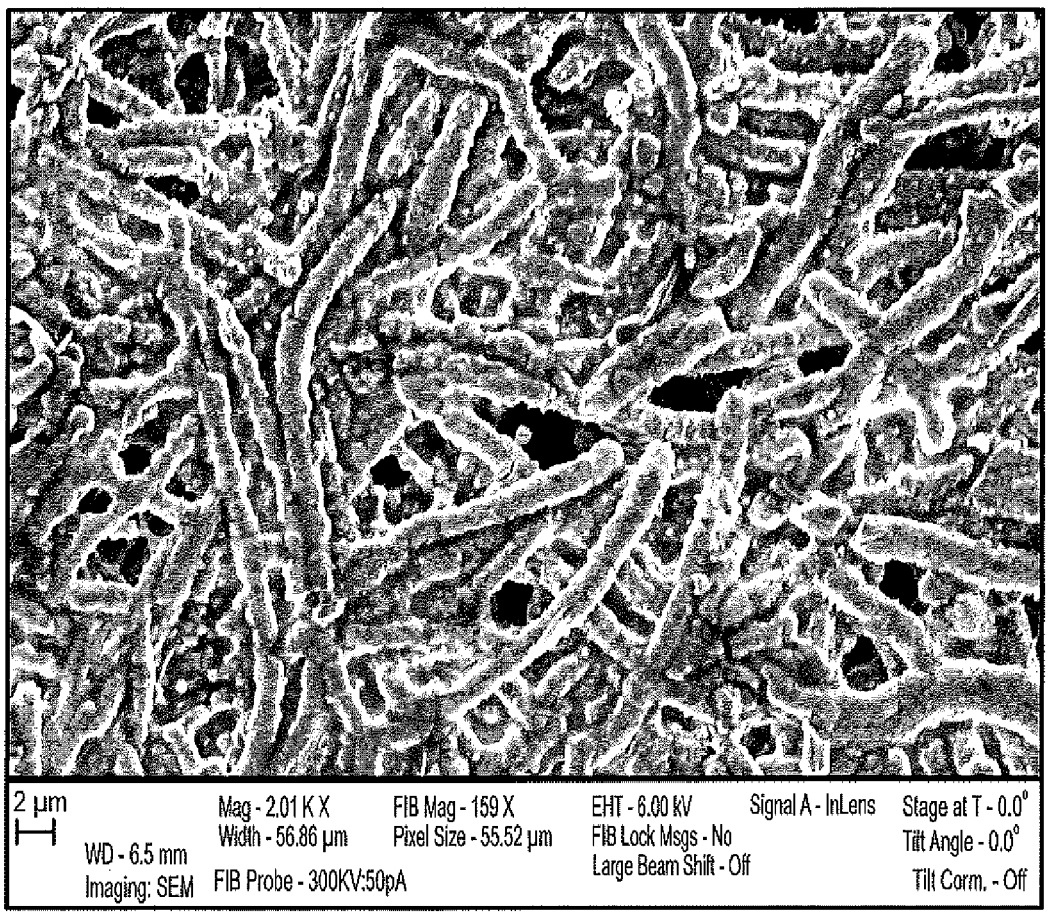

FIGS. 14A-14B are SEM images of nanocomposite materials forming an electrode of a separator-free energy storage device according to some embodiments. The image in FIG. 14A was obtained at a magnification of 1 k and the image in FIG. 14B was obtained at a magnification of 2 k. Each micrograph image depicts a nanocomposite sheet or structure formed from a plurality of interconnected and coated carbon nanostructures.

Figure 15:
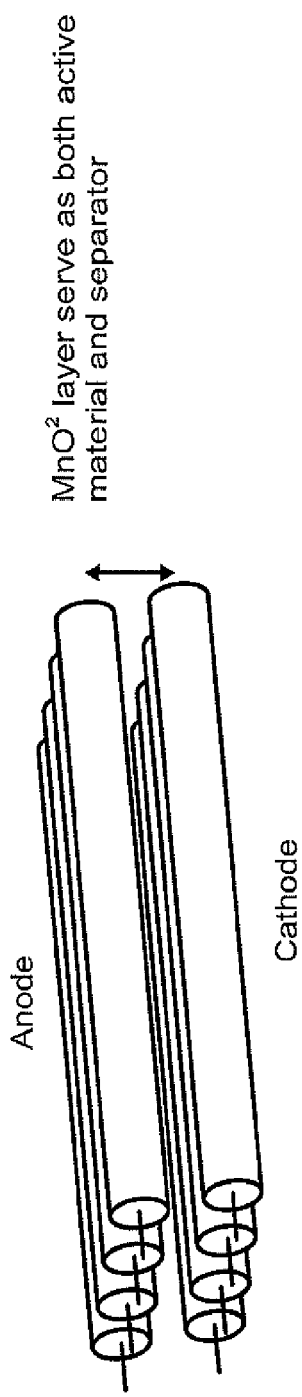
FIG. 15 is a schematic diagram of a separator-free energy storage device according to some embodiments.

FIG. 15 is a schematic diagram of one embodiment of a separator-free energy storage device according to some embodiments. The energy storage device can comprise an anode and a cathode spaced apart from the anode. The anode and cathode are opposite each other. The anode and cathode comprise carbon nanostructures (e.g., ECNFs) coated with a layer of material comprising a transition metal oxide (e.g., $MnO_2$).

Figure 16:
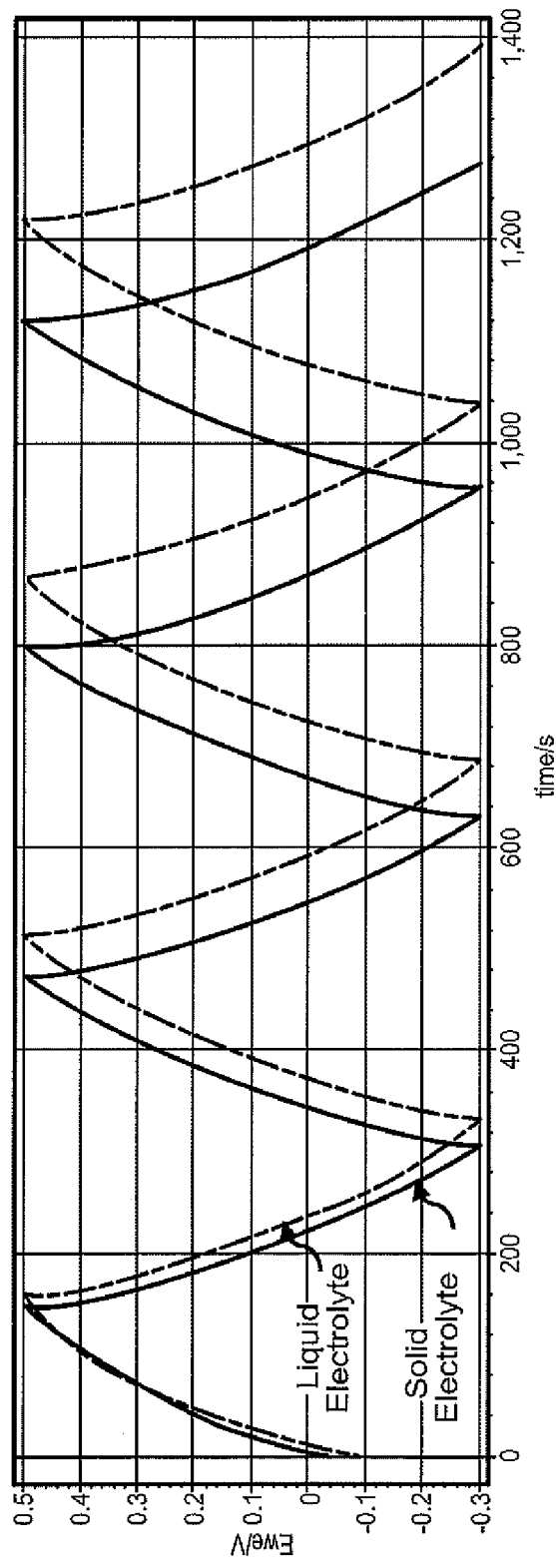
FIG. 16 is the galvanic charge/discharge of nanocomposite electrodes according to some embodiments.

FIG. 16 is the galvanic charge/discharge of nanocomposite electrodes according to some embodiments. The galvanic charge/discharge of symmetric ECNF/$MnO_2$ electrodes in solid electrolyte (rear curve) and liquid electrolyte (i.e., KOH, front curve) was obtained. The electrodes were used without a separator at a current of 200 mA for three full cycles. The solid electrolyte comprised PVA+KOH+DI water, 20%/30%/50%; and the liquid is 6M KOH. The IR drop is 0.05V. The capacitance was 662.3 F/g based on the mass of the active material, the energy density was calculated as 211.3 Wh/g, and the power density was 14.81 W/g.

The results in this example indicate that the electrochemical deposition process provides a simple, effective way for metal oxide film morphology control and demonstrate the feasibility for supercapacitance energy storage (e.g., of at least a 300 F/g capacitance, or in some aspects a 300-1200 F/g capacitance).

EXAMPLE 3

Bi-Functional Self-Sustaining Electrodes

The formation of a metal-oxide layer on or over the ECNF is bi-functional, as it functions as the pseudo-redox-active material for energy storage enhancement and a self-sustaining "separator". The energy storage devices may include a solid, liquid, or sol gel electrolyte for membraneless manufacturing, and a membrane-free supercapacitor prototype targeting Li-battery comparable energy storage capability.

The nanocomposite electrodes set forth herein increase the energy density and optimize electrode architecture via maximizing the surface area and minimizing charge separation distances to achieve high capacitance. The need for a separator is obviated by virtue of the transition metal oxide layers disposed on or over the carbon nanostructures. Conventional devices utilize a polymeric membrane or a nonwoven fabric mat separator to prevent two electrodes from physical contact while allow free ion flow. Such membranes and separators take up limited space inside the cells, which adversely affects their performance. The instant subject matter is a break-through in supercapacitor technology and uses a dielectric metal oxide as both pseudo-active materials and separator. The electrodes are flexible, and formed from a flexible carbon material (e.g., nanofibers or nanotubes) or film that is deposited with a pseudo-redox-active metal oxide as both energy storage and electrode separator for a supercapacitor device.

Figure 17:
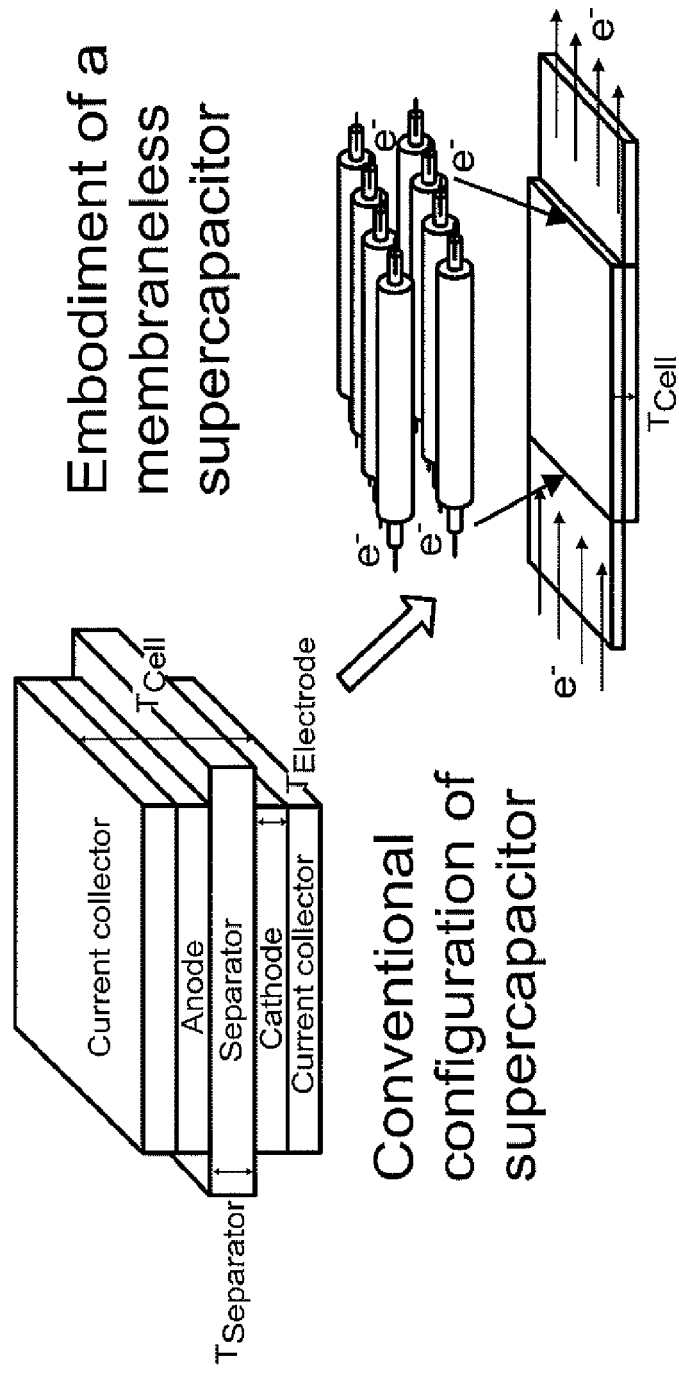
FIG. 17 is a schematic illustration of a conventional supercapacitor compared to a separator-free supercapacitor according to some embodiments.

FIG. 17 is a schematic illustration of a membraneless (i.e., "separator free") supercapacitor compared to a conventional supercapacitor with a membrane or separator. The separator-free design utilizes a high dielectric metal oxide as a redox active layer to not only function as high energy density storage but also serve as the "separator" between the anode and cathode electrodes. Solid, liquid, or sol gel electrolyte is applied in the space between the two electrodes for providing a membraneless, flexible, all-solid-state supercapacitor with high volumetric capacitance and high energy density.

Figure 18A:
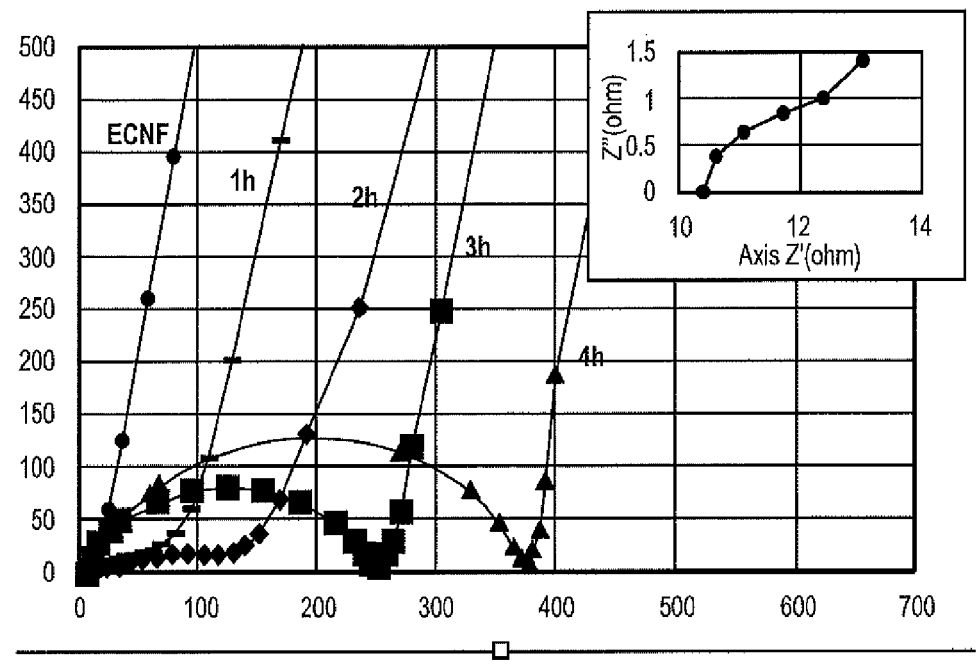
FIGS. 18A-18B are graphical illustrations of data for a separator-free supercapacitor according to some embodiments.
Figure 18B:
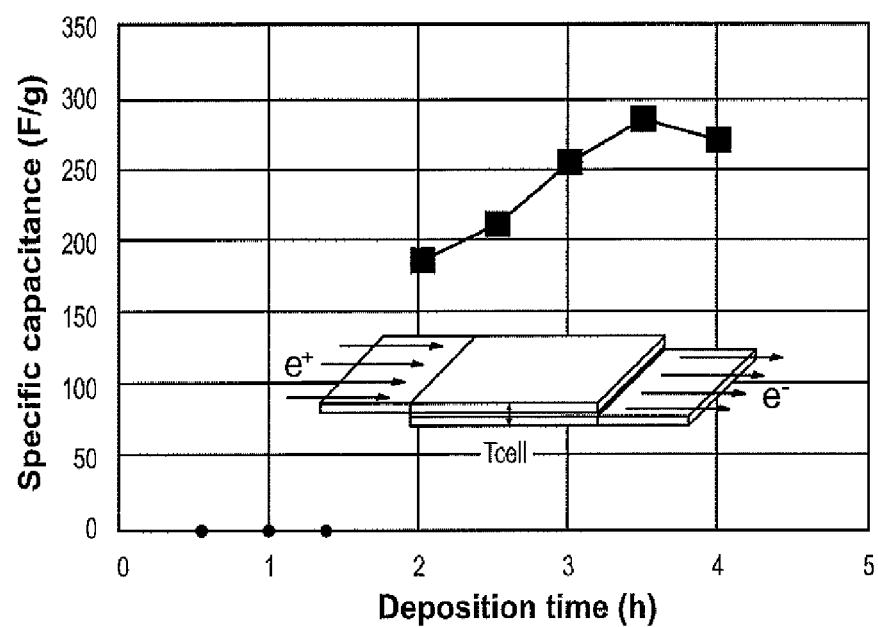

ECNF films can be used as the electrode substrate and current collector. The ECNFs films include fibers synthesized using an electrospun method followed with stabilization and carbonization. Then, a transition metal oxide (e.g., $MnO_2$, NiO, CoO, ZrO, etc.) is deposited onto the ECNFs to form a metal oxide layer of thickness around 4 μm functioning as both the pseudo-redox-active materials and separator. FIG. 18A is EIS data of the nanocomposites at different time deposition and FIG. 18B is the charge/discharge testing results of the nanocomposite at different time deposition. These FIGS. indicate that the $MnO_2$ is bi-functional when the deposition time is greater than 2 hours at 40 μA/cm².

The bi-functional design can largely increase the density of active materials in the cell, the volume capacitance and energy density with significantly reduced logistics and weight/volume, and deliver deployable sustainable energy storage systems having a charge/discharge cycle lifetime of more than 1000 cycles, more than 2000 cycles, more than 5000 cycles, more than 10,000 cycles, from 1000-20,000 cycles, or a subrange thereof (e.g., 1000-5000 cycles, 5000-8000, 5000-15,000 cycles, etc.). The energy storage devices incorporating nanocomposite electrodes fabricated according to the methods and materials herein can be used to electrically power automobiles, vehicles, hybrid vehicles, regenerative braking applications, and peak power delivery as well as engine start/stop cycling, electric power steering pumps and air conditioning compressors, electric power windows, doors, and locks, and active seat-belt restraint systems, but also the renewable energy industrial including off-peak energy storage for renewable energy sources (wind/solar), fast acting UPS systems, power transient buffering, and regenerative systems on cranes and forklifts.

EXAMPLE 4

Electrolyte Considerations and Supercapacitor Characteristics

Figure 19:
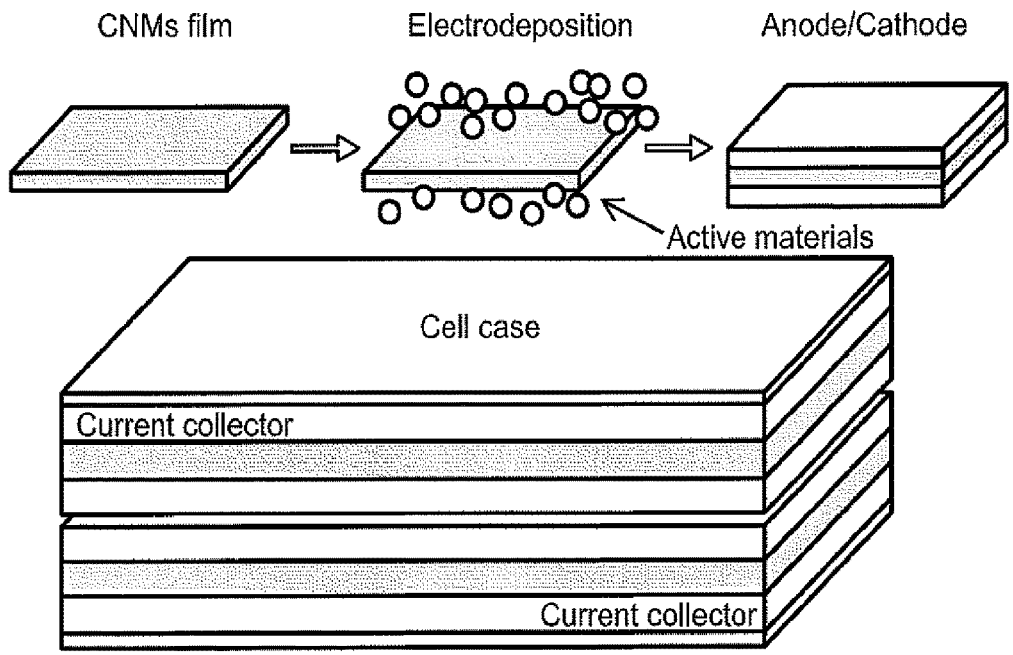
FIG. 19 is a schematic illustration of a self-sustainable separator-free supercapacitor configuration according to some embodiments.

FIG. 19 is a further exemplary embodiment of a supercapacitor or "pseudocapacitor" that maximizes both the geometric term and dielectric factors. Carbon nanomaterials (CNMs) or carbon nanostructures (e.g., including carbon nanotubes, graphene, carbon nanospheres, carbon nanodots, etc.) were formed by vacuum filtration then deposited with metal oxide active materials on both sides then partially attached onto metal foil to collect the electrons flow through anode and cathode. This design has a reduced spacing between electrodes by virtue of the metal oxide layer functioning as a separator with relative higher resistance (e.g., about 185Ω from $MnO_2$ layer) and introducing high pesudocapacitance of around 400 F/g.

Figure 20:
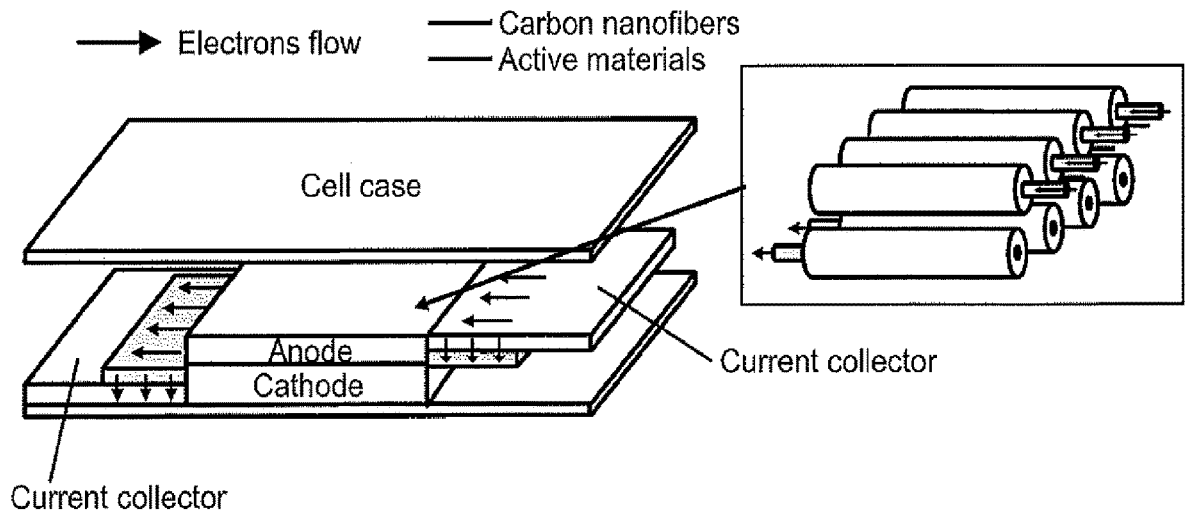
FIG. 20 is a schematic illustration of a self-sustainable separator-free supercapacitor configuration according to some embodiments.

FIG. 20 is a schematic illustration of a self-sustainable, separator-free supercapacitor consisting of an anode, cathode, current collectors, and cell case. The inset is a magnified view of active materials-ECNFs nanocomposite. ECNFs are known for its high conductivity, cheap and freestanding nature as electrode materials for energy storage applications. Moreover, ECNFs can also be served as scaffolds to uniformly support nanostructured metal oxides because of their reliable interconnected structure. This design can largely increase the mass loading of active materials as well as the energy density of the cell since the ECNFs are providing pathways for electrons flow directly through the carbon network and free of polymer binder which is lowering the ion conductivity between individual CNMs particles.

Figure 21:
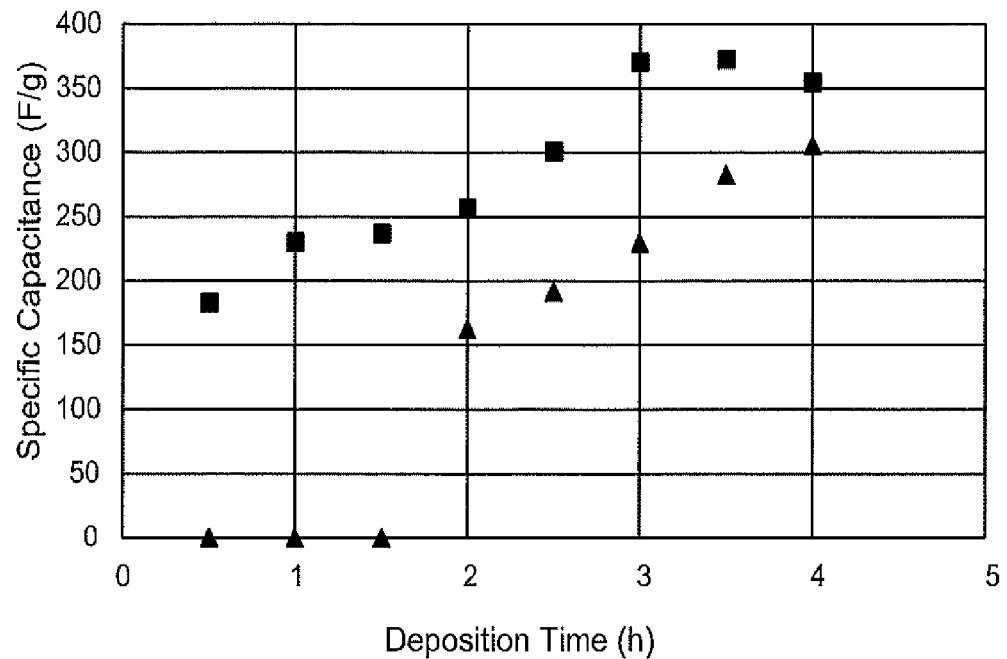
FIG. 21 is a graphical illustration of specific capacitance versus deposition time at 40 µA deposited for 0.5 h, 1.5 h, 2 h, 2.5 h, 3 h, 3.5 h and 4 h, respectively

FIG. 21 is a plot of specific capacitance vs. deposition time at 40 μA deposited for 0.5 h, 1.5 h, 2 h, 2.5 h, 3 h, 3.5 h and 4 h, respectively. Galvanic charge-discharge tests of symmetrical assembly of ECNF-$MnO_2$ electrodes were done to show the difference between normal configuration and separator-free configuration. The rectangles in FIG. 21 show specific capacitance when a cellulous membrane was used as separator (in 6M KOH aqueous electrolyte). The specific capacitance of cell is increasing with the prolong of the deposition time until reach the optimal mass loading around 3.5 hours. The triangles in FIG. 21 show results when polyvinyl alcohol/KOH was used as solid electrolyte without any separator. There was an electrical shortcut between the anode and cathode when the deposition time is less than 2 h due to the insufficient thickness of $MnO_2$ layer. A relatively small specific capacitance was acquired around 2h deposition and it keep increasing when more $MnO_2$ was deposited, which indicates that a higher specific capacitance may be acquired when a thicker layer of MO was deposited.

Solid electrolyte is a substance that produces an electrically conducting media in a solid or gel state instead of a solution or liquid state. Solid electrolytes offer good stability, reproducibility, and mechanical strength, especially in the design of a flexible all-solid-supercapacitor, which requires the device to be able to survive thousands of times folding or stretching. Currently, the most widely used solid electrolytes for supercapacitors are acid/polymer, base/polymer, and/or salt/polymer blends due to their ease of preparation, high conductivity, and good stability. For example, $H_2SO_4$/PVA has been widely used to achieve flexible and solid-state structures. Other candidates include, but are not limited to: Acids—e.g., $H_2SO_4$, $H_3PO_4$, $HClO_4$, silicotungstic acid (SiWA, $H_4SiW_{12}O_{40}$), phosphotungstic acid (PWA, $H_3PW_{12}O_{40}$); Bases—e.g., KOH, NaOH; Salt-LiCl, $LiClO_4$, KI; Polymers—e.g., polyvinyl alcohol (PVA), polyacrylamide (PAAM), polyethylene oxide (PEO), poly(vinylpyrrolidone) (PVP), poly(2-vinylpyridine) (P2VP), and poly(4-vinylpyridine) (P4VP). Solid electrolytes may be prepared by dissolving acid/base/salt in a polymer gel, which still form in unstable aqueous media. However, the emergence of ionic liquids (ILs) may supplement and/or replace the current solid electrolyte technologies by combining ILs with polymers.

ILs are low melting point salts composed of ions only. ILs can comprise of organic cation compound (e.g. imidazolium, pyrrolidinium, tetraalkyl ammonium, etc.) and an inorganic or organic anion compound (e.g. tetrafluoroborate, hexalluorophosphate, bromide), A wide range of salts can be used to design specific ILs having the desired properties for different applications, such as electrodeposition, bioscience, biomechanics, energy storage, etc. Among these applications, energy storage may be used in portable electronics (such as cellphone, laptop) and/or large scale devices (such as electric vehicles, hybrid vehicles, electric wheel chairs, etc.). Moreover, the current energy storage technologies (lithium ion batteries, supercapacitors) have drawn global safety concerns since cathode materials and the liquid electrolyte may have undesired reactions after a short circuit or local overheating, which can lead to violent fire or explosions. Therefore, the implementation of current energy storage systems (especially lithium ion batteries) in portable electronics and electric vehicles has been slowed.

Figure 22:
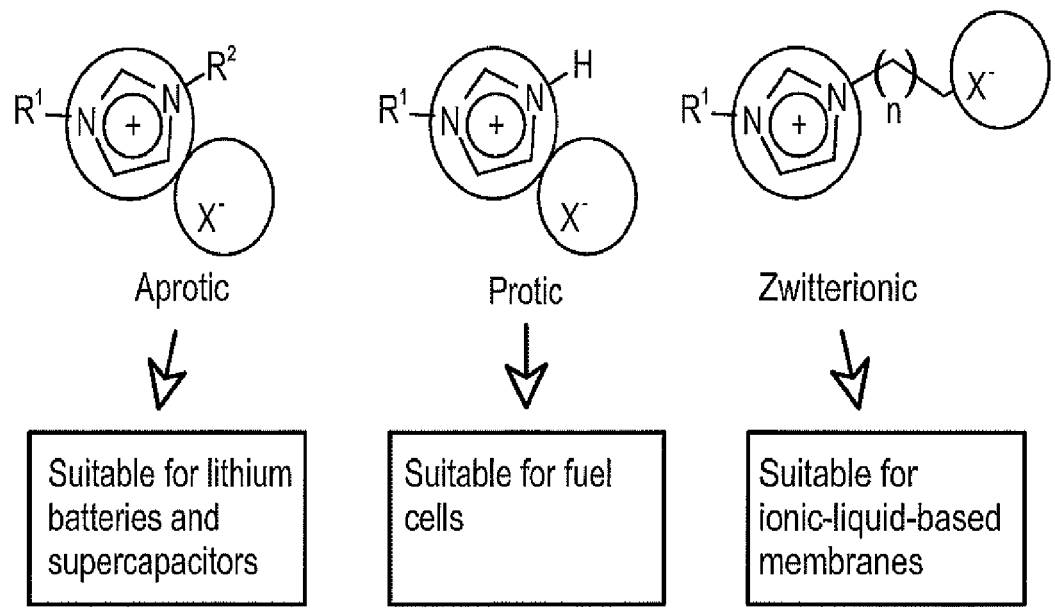
FIG. 22 is a schematic illustration of the composition of various ionic liquids (ILs) used for an electrolyte in a separator-free supercapacitor according to some embodiments.

FIG. 22 schematically illustrates various ILs that may be used as the electrolyte in energy storage devices described herein. ILs can come in different classes including aprotic, protic, and zwitterionic types, and each one may be suited for different applications. ILs are ideal for electrochemical energy systems because they have wide electrochemical stability window, some of them even practically non-flammable while having high ion conductivities. For example, the combination of 1-ethyl-3-methylimidazolium (EMI) cation and N,N-bis(trilluoromethane)sulphonamide (TFSI) anion can form ILs with ion conductivities that comparable to many organic electrolyte and ultra-high decomposition temperatures (or vapor pressures) up to 300-400° C.

Further, cations (also referred to as "cationic compounds") for ILs may include, for example, Ammonium-based ionic liquids (e.g., Tetrabutylammonium [TBA], Butyltrimethylammonium, Dimethylammonium, Ethylammonium, 2-Hydroxyethylammonium, Methylammonium, Methyltrioctylammonium, Propylammonium, Tributylmethylammonium, Diethylmethylammonium, Hexadecyltrimethylammonium, Octyltriethylammonium, Butyltriethylammonium, N,N-Diethyl-N-methyl-N-(2-methoxyethyl) ammonium), Imidazolium-based ILs (e.g., 1-Allyl-3-methylimidazolium, 1-Benzyl-3-methylimidazolium, 1-Butyl-1-methylpiperidinium, 1-Butyl-2,3-dimethylimidazolium, 1-Butyl-3-methylimidazolium [BMI], 1-Decyl-3-methylimidazolium, 1,3-Didecyl-2-methylimidazolium, 1,2-Dimethylimidazolium, 1,3-Dimethylimidazolium, 1,2-Dimethyl-3-propylimidazolium, 1-Dodecyl-3-methylimidazolium, 1-Ethylimidazolium, 1-Ethyl-2,3-dimethylimidazolium, 1-Ethyl-3-methylimidazolium [EMI], 1-Hexadecyl-3-methylimidazolium, 1-Hexyl-3-methylimidazolium, 1-(2-Hydroxyethyl)-3-methylimidazolium, 1-Methyl-1-propylpiperidinium, 1-Methyl-3-octadecylimidazolium, 1-Methyl-3-octylimidazolium, 1-Methyl-3-propylimidazolium, 1-Methylimidazolium), Pyridinium-based ILs (e.g., 1-Alkyl-2-methylpyridinium, 1-Alkyl-3-methylpyridinium, 1-Alkyl-4-methylpyridinium, 1-Butylpyridinium, 1-Propylpyridinium, 1-Ethylpyridinium, 1-Hexylpyridinium), Pyrrolidinium-based ILs (N-butyl-N-methylpyrrolidinium [$PYR_{14}$], 1-Ethyl-1-methylpyrrolidinium, 1-Methyl-1-propylpyrrolidinium, 1-Hexyl-1-methylpyrrolidinium), Phosphonium-based ILs, Ethyltributylphosphonium, Tetrabutylphosphonium, Tributylmethylphosphonium, Tributyltetradecylphosphonium, Trihexyltetradecylphosphonium, Sulfonium-based ILs, Diethylmethylsulfonium, Triethylsulfonium. Other cations include N-methyl-N-propylpiperidinium [$PIP_{13}$] and Choline.

Moreover, anions (also referred to as "anionic compounds") for ILs may include, for example, tetrafluoroborate [$BF_4$], bis(trifluoromethylsulfonyl)imide [$NTf_2$], bis(trifluoromethanesulfonyl)imide [TFSI], bis(fluorosulfonyl)imide [FSI], hexafluorophosphate [PF6], bis(2,4,4-Trimethylpentyl)phosphinate, bis(2-ethylhexyl)phosphate, diethyl phosphate, trifluoromethanesulfonate, dodecylbenzenesulfonate, nitrate, formate, triflate, acetate, phosphate, bromide, chloride, methylsulfate, decanoate, dicyanamide, tricyanomethanide. Other ILs include IoliLyte C1EG, IoliLyte T2EG, IoliLyte 221PG.

Figure 23:
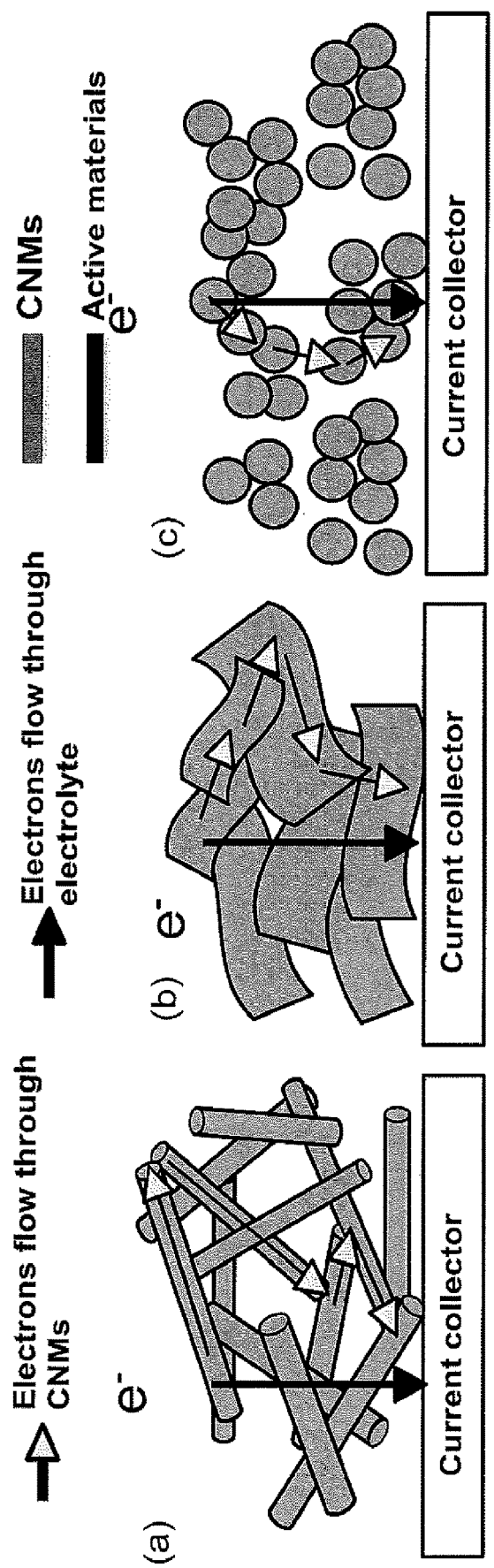
FIG. 23 is a schematic illustration of stacked nanostructures forming an electrode in a separator-free supercapacitor according to some embodiments.
Figure 24B:
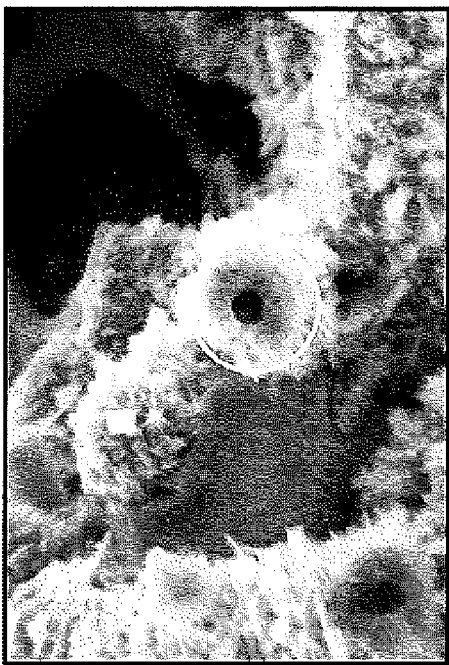
FIGS. 24A-24D are SEM images of nanocomposite materials forming an electrode of a separator-free energy storage device according to some embodiments.
Figure 24D:
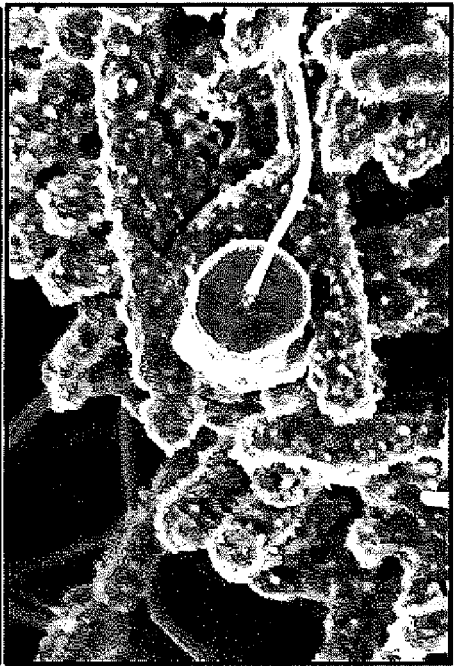
Figure 24A:
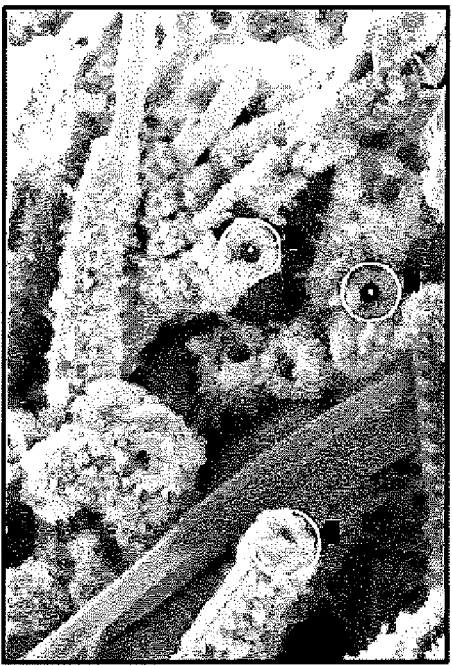
Figure 24C:
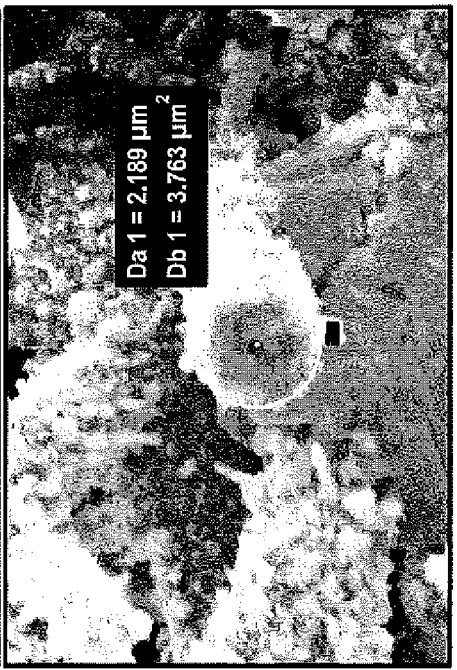

FIG. 23 is a schematic illustration of stacked carbon nanostructures that form electrodes of energy storage devices. Electrons can flow through the carbon nanomaterials (CNMs) and through the electrolyte to the current collector for storing electrical energy. Part (a) of FIG. 23 depicts carbon nanotubes (CNTs) as the scaffold upon which active materials (i.e., transition metal oxides) are deposited. Parts (b) and (c) of FIG. 23 illustrate different carbon nanostructures as the scaffold for the active material, for example, reduced graphene oxide (rGO) is the scaffold depicted in part (b) and carbon nanospheres are the scaffold as depicted in part (c). Any size, shape, and/or structure of carbon nanomaterials (CNMs, also referred to as "carbon nanostructures) may be provided and used in the energy storage devices herein without departing from the scope of the instant disclosure. FIGS. 24A-D are SEM images of ECNF/$MnO_2$ nanocomposites at 1 h, 2 h, 3 h, and 4 h deposition time, respectively.

EXAMPLE 5

Magnetic Field Effect on Energy Storage Capabilities

Supercapacitors that incorporate nanocomposite electrodes having $MnO_2$ deposited on electrospun carbon nanofibers (ECNFs) exhibit a significantly enhanced electrochemical energy storage capability under a milli-T magnetic field. The findings, as summarized and described below, from electrode characterization and electrochemical testing suggest that the enhanced magneto-supercapacitive performance is, at least in part, attributed to the magnetic susceptibility of $MnO_2$ in the electrode due to the improvement of the pseudocapacitive behavior at the electrode and the electrode/electrolyte interfaces.

Electroactive metal oxides (e.g., $MnO_x$, $RuO_2$, $Co_3O_4$, $SnO_2$, ZnO, $V_2O_5$, etc.) used in electrodes offer fast and reversible redox reactions, contributing to a higher energy density capacity. Carbon nanostructures are used as the scaffold for the electroactive metal oxides, which advantageously increase the surface area of the electrodes, have a large porosity, high conductivity, low cost in production by freestanding nature, and provide uniform support for nanostructured metal oxides. In this example, the magnetic field effect on energy storage of nanocomposite electrodes was characterized.

It was determined that electrodes fabricated by electrochemical deposition of $MnO_2$ on ECNFs exhibit increased energy storage via a magnetization-induced capacitance enhancement. The $MnO_2$/ECNFs electrode was characterized by scanning electron microscopy (SEM), x-ray powder diffraction (XRD), energy-dispersive x-ray spectroscopy (EDX), Raman spectroscopy, Fourier transform infrared spectroscopy (FTIR), thermogravimetric analysis (TGA), and superconducting quantum interference device vibrating sample magnetometer (SQUID VSM).

The electrochemical performance of the $MnO_2$/ECNFs electrodes for capacitive energy storage was studied by cyclic voltammetry (CV), galvanostatic charge/discharge, electrochemical impedance spectroscopy (EIS), and life cycle stability tests in the presence/absence of milli-Tesla (mT) magnetic fields derived by Helmholtz coils.

Figure 25:
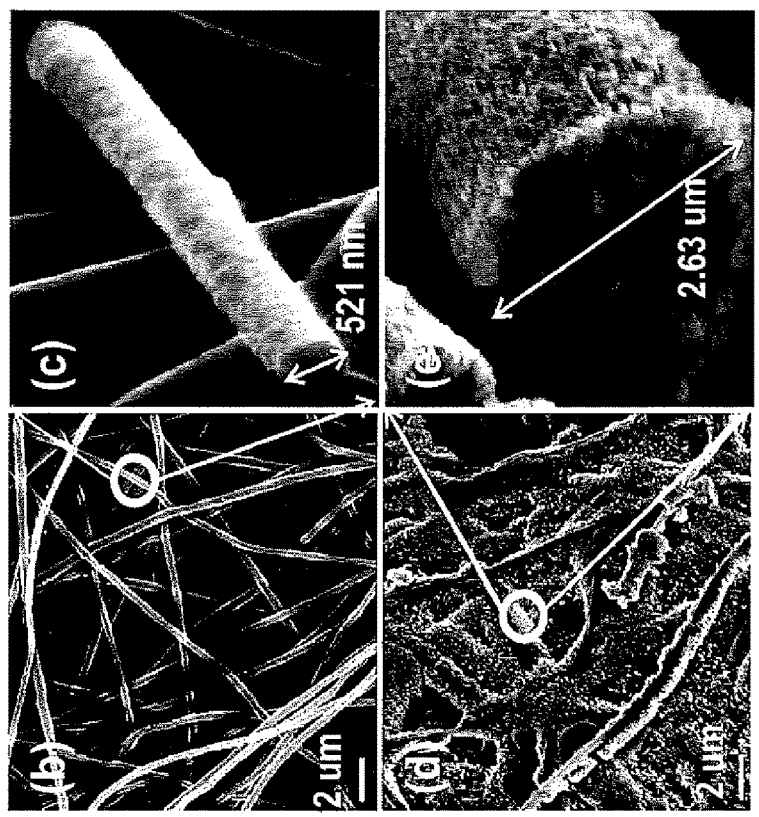
FIG. 25 is a schematic illustration of an electrochemical cell in the presence of an external magnetic field according to some embodiments.
Figure 25:
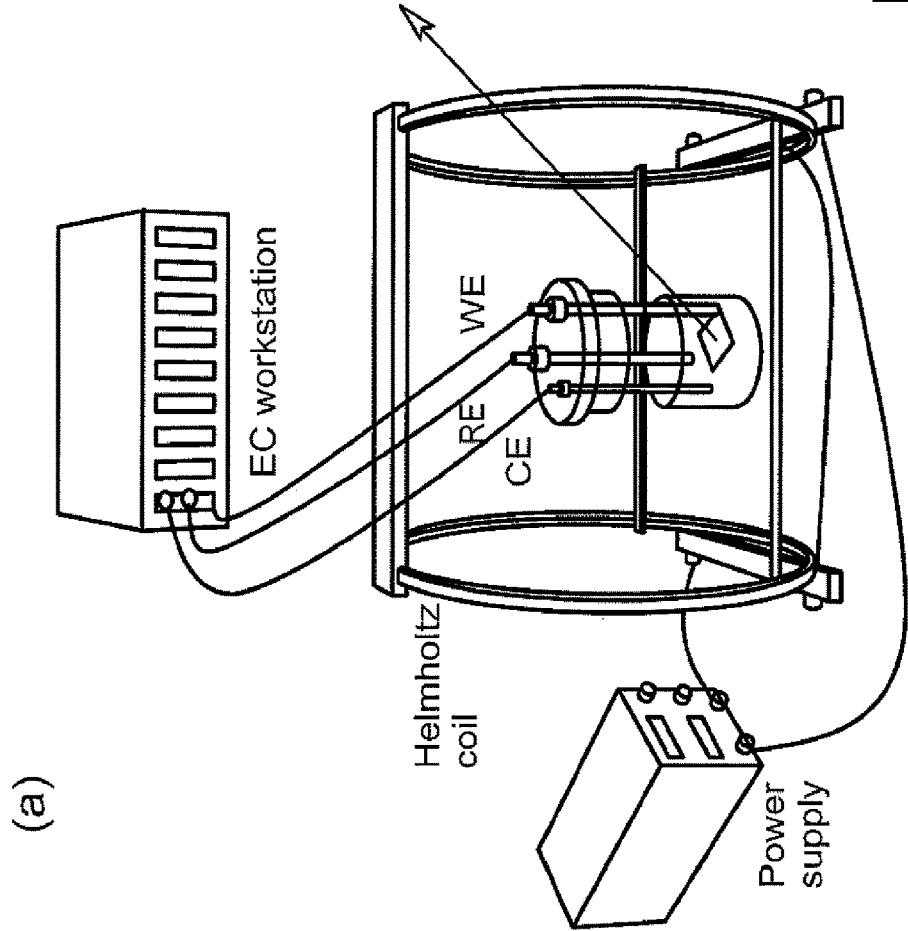

FIG. 25 schematically illustrates the electrochemical cell in the presence of an external magnetic field. SEM images on the right are of (b) ECNFs, (c) enlarged ECNFs, (d) $MnO_2$/ECNFs, and (e) enlarged $MnO_2$. The magnetic field of each individual coil is non-uniform, thus, an arrangement of two narrow coils with a large radius r was built parallel to one another and on the same axis with a distance of the same as radius size r, so that the magnetic field is uniform in a typical region based on the superimposition of the two fields. A magnetic field of 0.45 mT, 0.89 mT, and 1.34 mT was achieved by setting the power supply current for the Helmholtz coils as shown in FIG. 25.

The morphologies of ECNFs and $MnO_2$/ECNFs (also referred to as ECNFs/$MnO_2$) were characterized by SEM as seen in FIG. 25. In this example, ECNFs have a nanofiber diameter of about 521 nm and are covered by $MnO_2$ having a thickness of about 2.1 μm making a total diameter of the fiber about 2.63 μm. The charge current of 40 μA, the charge time of 3 hours in an aqueous precursor solution with 10 mM $MnSO_4$ and 100 mM $Na_2SO_4$ were applied to achieve the electrochemical deposition of the $MnO_2$ at the 1 $cm^2$ ECNFs film. The success of $MnO_2$ deposition was confirmed with Raman spectra (having a Raman shift of 627 $cm^{-1}$), XRD pattern (having a resolved peak at 37.1° attributed to $MnO_2$), and FTIR spectra (Mn-O at the wavenumber of 648 $cm^{-1}$ and 731 $cm^{-1}$). TGA showed that the weight ratio of $MnO_2$ on the $MnO_2$/ECNFs is about 53%, which was further verified using EDX analysis by averaging different spectrum zones.

As a pseudocapacitive electrode, the $MnO_2$/ECNFs electrode possesses combined contribution of spacers and redox reaction, i.e., the electrochemical double layer capacitance and the pseudocapacitance from $MnO_2$, for energy storage. The former stores charge electrostatically due to the adsorption of ions at electrode surfaces, and is mainly determined by the electrode surface area. While, for the latter, charge is stored in virtue of highly reversible redox reactions (e.g.

electron transfer reactions) between Mn(IV)/Mn(III) species and cation intercalation/de-intercalation at the $MnO_2$-electrolyte interfaces.

Figure 26A:
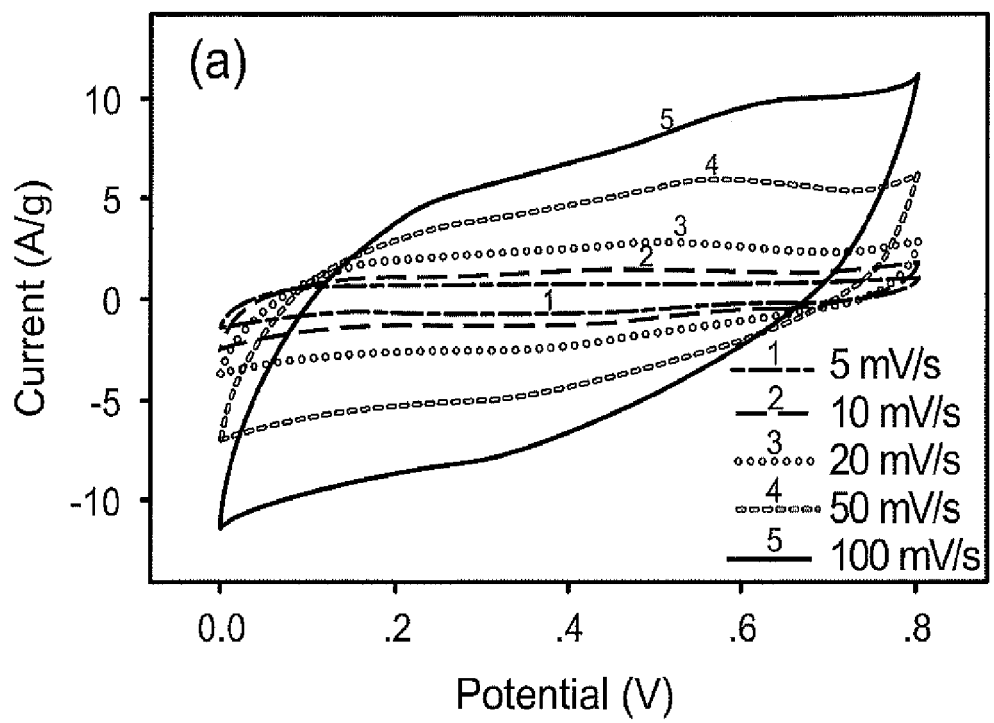
FIGS. 26A-26D are CV loops for electrodes of an energy storage device with or without an external magnetic field according to some embodiments.
Figure 26B:
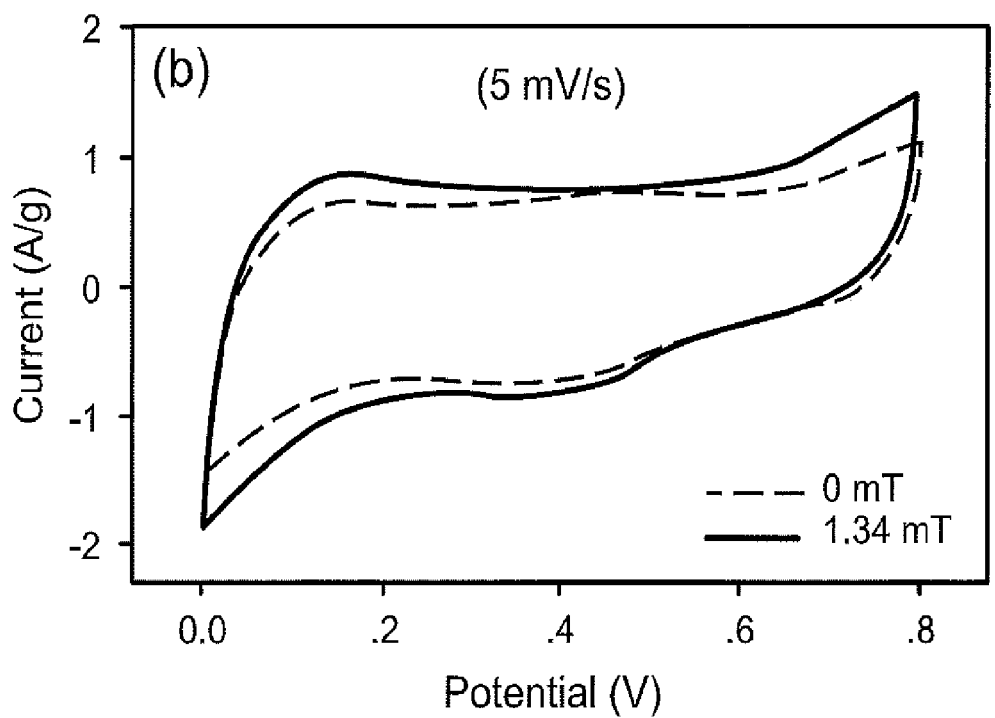
Figure 26C:
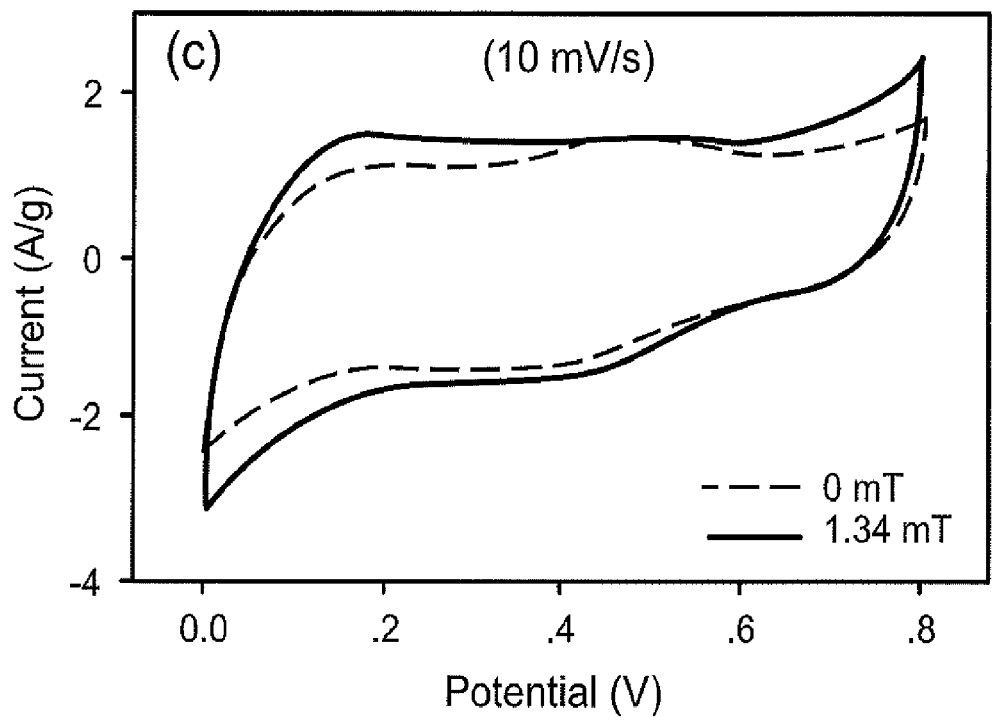
Figure 26D:
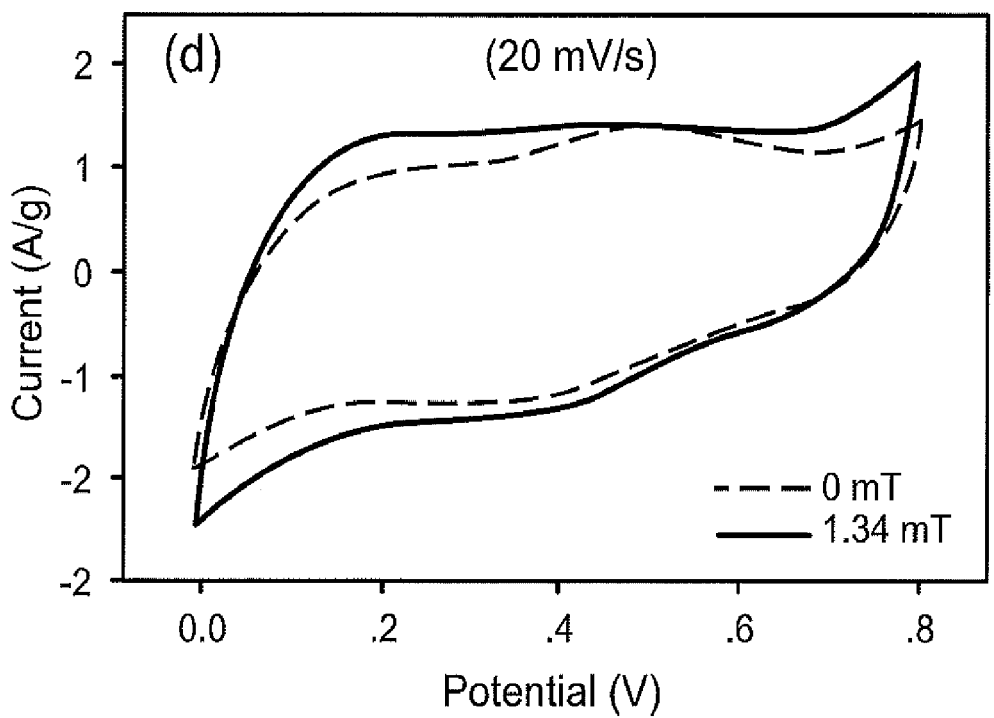

FIG. 26A depicts the CV loops of the $MnO_2$/ECNFs electrodes tested in the absence of magnetic field (0 mT) at different voltage sweeping rates. CV loops of the $MnO_2$/ECNFs electrodes tested in the presence (1.34 mT)/ absence (0 mT) of magnetic field at different scan rates of 5 mV/s (FIG. 26B), 10 mV/s (FIG. 26C), and 20 mV/s (FIG. 26D).

FIGS. 26A-D show the representative, stable CV loops with or without external magnetic field, which present a combination of both double layer and pseudocapacitive behaviors within the scan voltage from 0.0 V to 0.8 V. There is a pair of peaks at the voltage between 0.4-0.5 V vs. Ag/AgCl which may arise from the redox reaction of the Mn(IV)/Mn(III) species in the form of K+ intercalation.

The overall specific capacitance is calculated from the integrated area of the CV loops. In the absence of an external magnetic field, the specific capacitance of a $MnO_2$/ECNFs electrode was calculated to be 119.21, 105.83, 92.79, 71.04, 53.42 F/g at the voltage sweeping rates of 5, 10, 20, 50, and 100 mV/s, respectively. Notably, compared to that of the ECNFs-only electrode, $MnO_2$/ECNFs show a higher capacitance. Without being bound by theory, this result is likely because of the higher relative dielectric constant of $MnO_2$ and its pseudo-activity.

In the presence of 1.34 mT magnetic field, the capacitance of the $MnO_2$/ECNFs magneto-supercapacitor electrode was obtained to be 141.70, 125.87, 110.21, 86.47, 66.96 F/g at the same voltage sweeping rates of 5, 10, 20, 50, and 100 mV/s, respectively, which increased by about average of 19% for all sweeping rates. Since there is no measurable enhancement of capacitance of the ECNFs-only electrodes at the same range of voltage sweeping rates under the magnetic field, one can conclude that the magnetocapacitance enhancement of the $MnO_2$/ECNFs electrode is a result of the magnetic field effect on the $MnO_2$ at the ECNFs substrate.

Figure 27A:
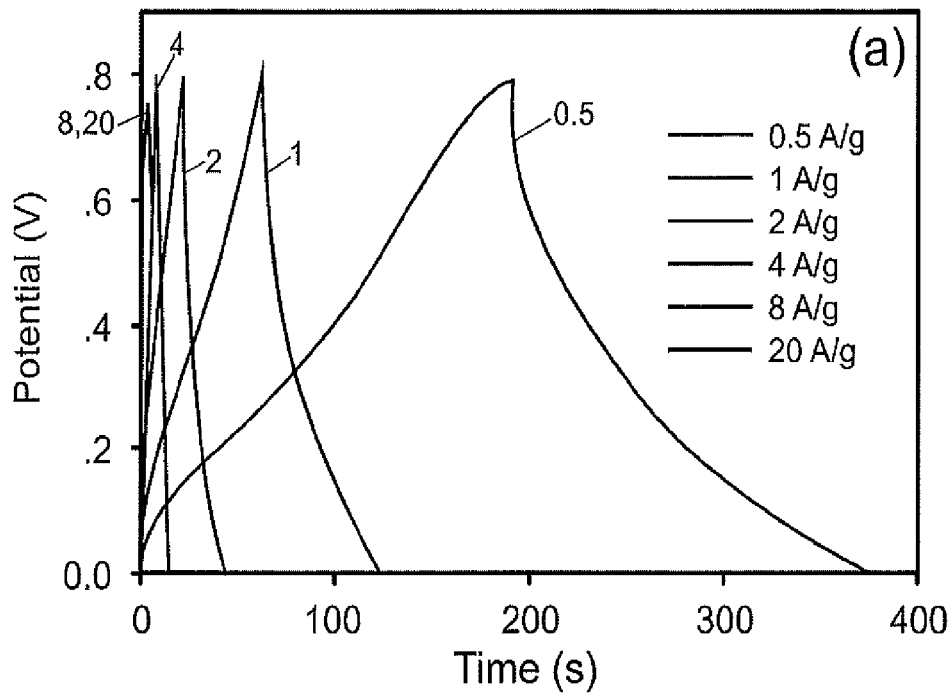
FIGS. 27A-27D are charge/discharge curves for electrodes of an energy storage device with or without an external magnetic field according to some embodiments.
Figure 27B:
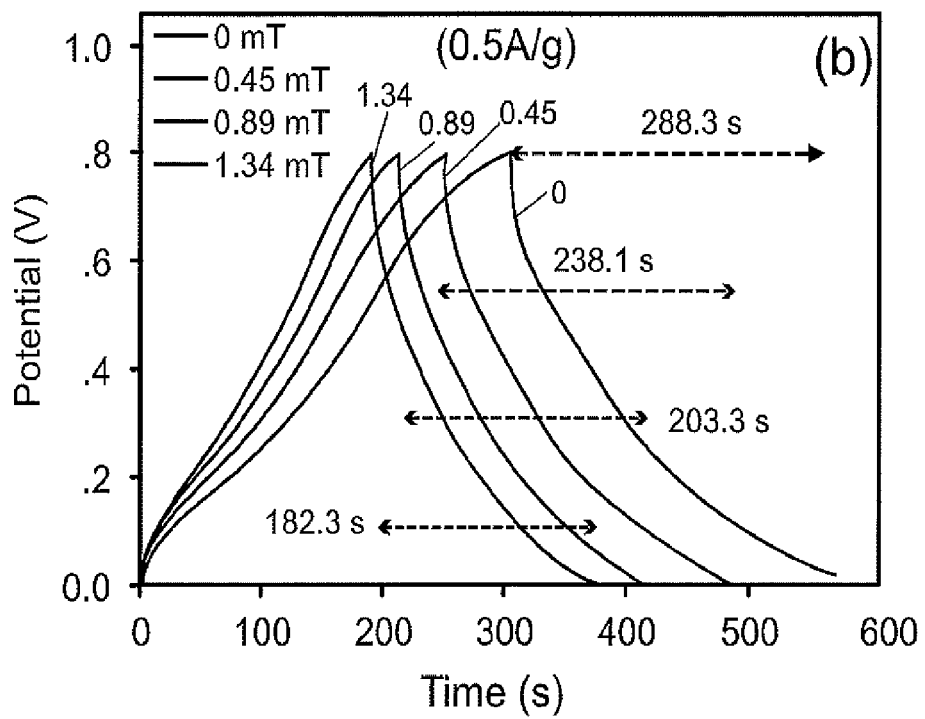
Figure 27C:
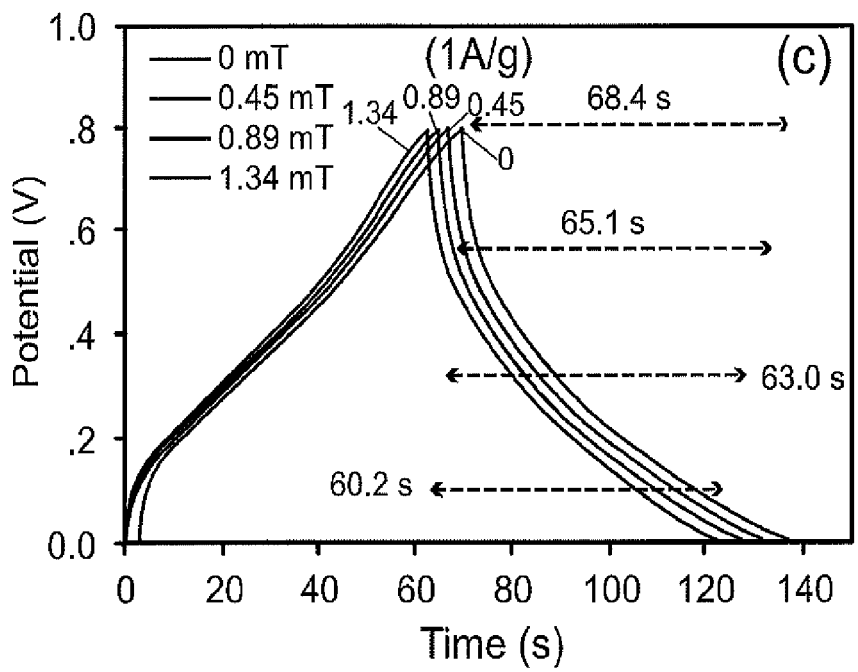
Figure 27D:
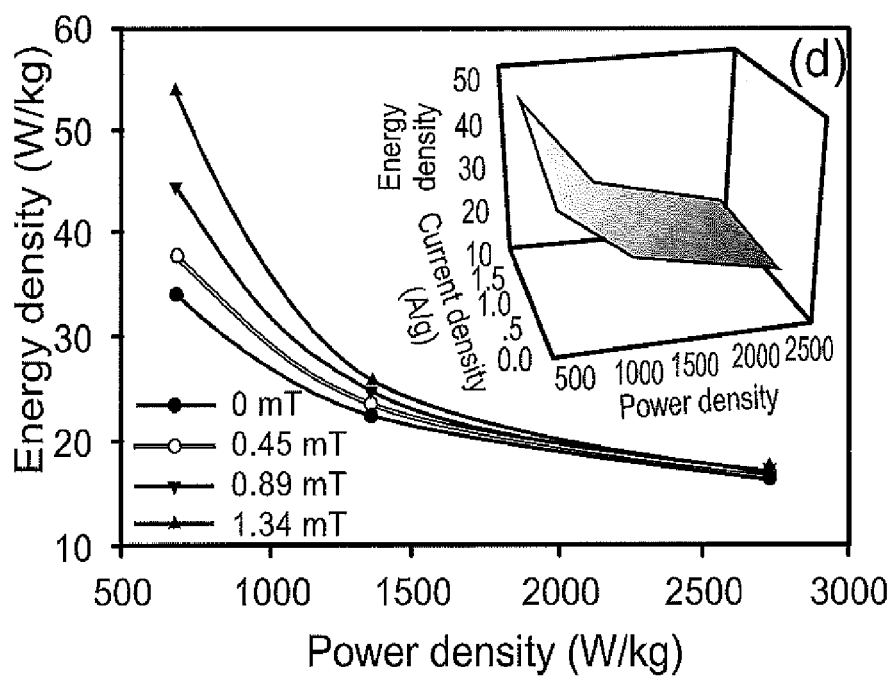

FIG. 27A depicts the galvanostatic charge/discharge curves of the $MnO_2$/ECNFs electrodes tested in the absence of magnetic field under different current densities. Galvanostatic charge/discharge curves of the $MnO_2$/ECNFs tested in the presence of different magnetic fields under different current densities of 0.5 A/g (FIG. 27B), and 1 A/g (FIG. 27C). FIG. 27D depicts the energy density as a function of power density and current density.

The effect of magnetization on the galvanostatic charge/discharge performance of $MnO_2$/ECNFs was studied under different current densities 0.5-20 A/g. The curvature of the charge step between the voltage of 0.0-0.4 and larger growth of the discharge curve between the same range voltages in FIGS. 27A-D suggest a combined contribution from pseudocapacitance and double layer capacitance, which is consistent with the observation from CV studies. With the applied magnetic field from 0.45 mT to 1.34 mT and the same current density, the charge/discharge time increases compared to that of the absence of magnetic field. The charge/discharge time under smaller current density increased more significantly than that of the larger current density (e.g. 58.1% increase at 0.5 A/g vs. 13.6% at 1 A/g with 1.34 mT magnetic field), suggesting the magnetic field effects on both the pseudocapacitive electrolyte-electrode interface and double layer region, resulting in the magneto-capacitance enhancement.

From the charge/discharge curves in FIGS. 27A-D, specific capacitance is calculated from the discharge curves. It was found that, under the magnetic field of 1.34 mT, the electrode of $MnO_2$/ECNFs enhanced the capacitance by 58.1% (FIG. 27B) at the current density of 0.5 A/g, by 13.6% under the current densities of 1 A/g (FIG. 27C) and 6% under 2 A/g. This was further verified by power density (Dp) and energy density (De) calculations of the charge/discharge measurements. The Dp was obtained as 679.25, 1358.49, and 2716.98 W/kg for current density of 0.5 A/g, 1 A/g, and 2 A/g, respectively (FIG. 27D), and the De in the range of 16.38-34.40 Wh/kg without external magnetic field.

With the increase of magnetic field, the De at the same current density/power density increased and the De was obtained as 54.40 Wh/kg at the current density of 0.5 A/g with applied 1.34 mT magnetic field (~58% improvement). Further, to quantitatively analyze the psedocapacitance contribution to the overall capacitance performance, the non-faradaic contribution from double layer capacitance and the faradaic contribution from psedocapacitance were separated in galvanostatic charge/discharge curve. By considering the area corresponding to faradaic contribution in $MnO_2$/ECNFs electrode at a current density of 0.5 A/g, the pseudocapacitance contribution from $MnO_2$ in overall performance was approximately 56.54%, 61.03%, 62.37%, and 67.81% with the applied magnetic field of 0 mT, 0.45 mT, 0.89 mT, and 1.34 mT, respectively.

Figure 28:
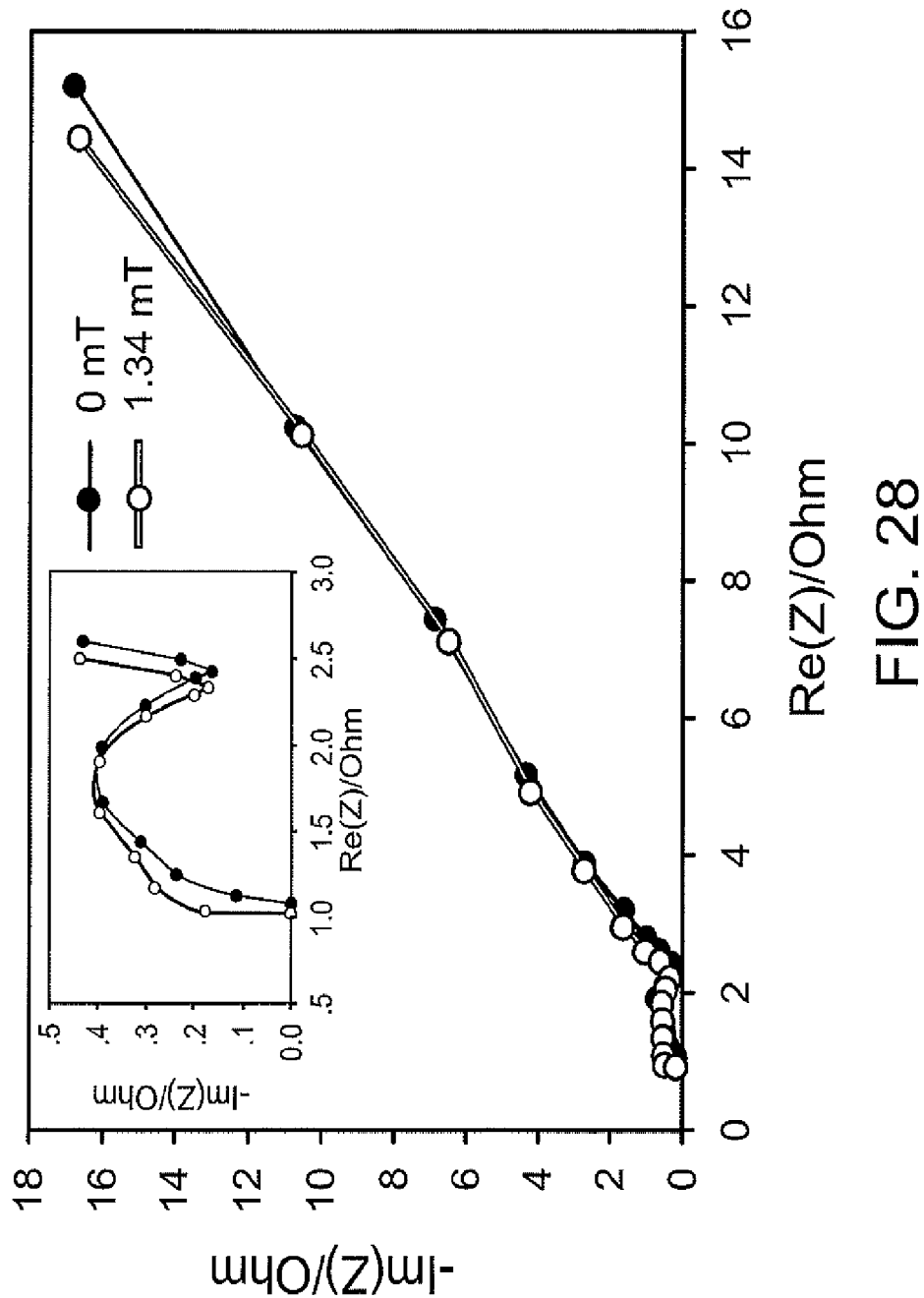
FIG. 28 is a Nyquist plot for electrodes of an energy storage device with or without an external magnetic field according to some embodiments.

Next, in FIG. 28 the effect of magnetic field on the impedance of the $MnO_2$/ECNFs within the electrochemical cell (6 M KOH electrolyte) was investigated using EIS, which may provide understanding of the different electrochemical behaviors in the absence/presence of magnetic field. FIG. 28 shows the performance of EIS for the $MnO_2$/ECNFs electrodes over the frequency range of 10 kHz to 0.01 Hz. Both the Nyquist plots of EIS spectra in the absence/presence of an external magnetic field show a semicircle arc in the high frequency region and a linear line in the low frequency region, indicating a low internal resistance of the $MnO_2$/ECNFs electrodes. In the presence of 1.34 mT magnetic field, the capacitor system superficially seems to be a more ideal double layer supercapacitor, since the semicircle arc is more obvious and straight line is a little more vertical. Additional Lorentz force acting on the moving ions in a perpendicular magnetic field flux density (magnetohydrodynamic) phenomenon, may promote the electrolyte convection in the bulk electrolyte. Hence, it is not surprising that the changes of the solution resistance (Rs~1 Ohms) in bulky electrolyte, the charge transfer resistance (Rct) at the electrode-electrolyte interface, and the leakage resistance (Rleak) of the double layer region at low frequency are observed for $MnO_2$/ECNFs electrodes under magnetic field.

Specifically, the solution resistance (Rs) with 1.34 mT magnetic field decreases about 0.1 Ohms from 1 Ohms. The resistance of charge transfer (Rct) of the electrode reaction obtained from the diameter of the semicircle in the high frequency region (1.26 Ohms) decreased from 1.35 Ohms of the non-magnetized $MnO_2$/ECNFs electrode, indicating a faster contact and charge transfer which may result in an improved rate performance. The low frequency leakage resistance (Rleak) in the double layer region increased for the $MnO_2$/ECNFs electrode with the presence of magnetic field suggests that leakage current flowing across the double layer at the electrode-electrolyte interface was better restricted, which may also improve the $MnO_2$/ECNFs electrode capacitance.

The magnetohydrodynamic phenomenon is the major factor for the electrode internal resistance decrease and the magnetic induced electrolyte convection to reach extra electrode surfaces, which may help to generate more specific capacitance of the electrodes, and build up a complete double layer that restricts the leakage of free electrons, thus improving the capacitance performance. However, the data analysis herein indicates that the increased contribution from the pseudocapacitive behavior is much more than the double layer capacitance contribution in this study. The small magnetic field strength, i.e. 1.34 mT on the $MnO_2$/ECNFs electrode and smaller resistance change, achieved comparable capacitance enhancement of 72 mT magnetic field on metal-oxide (Fe, Ni, Co) nanocomposite electrodes. $MnO_2$ has the paramagnetic property due to multiple unpaired electrons involving in the pseudo-active electron transfer reaction. It may help to better understand the capacitance enhancement by measuring the magnetization of the $MnO_2$/ECNFs electrodes.

Figure 29:
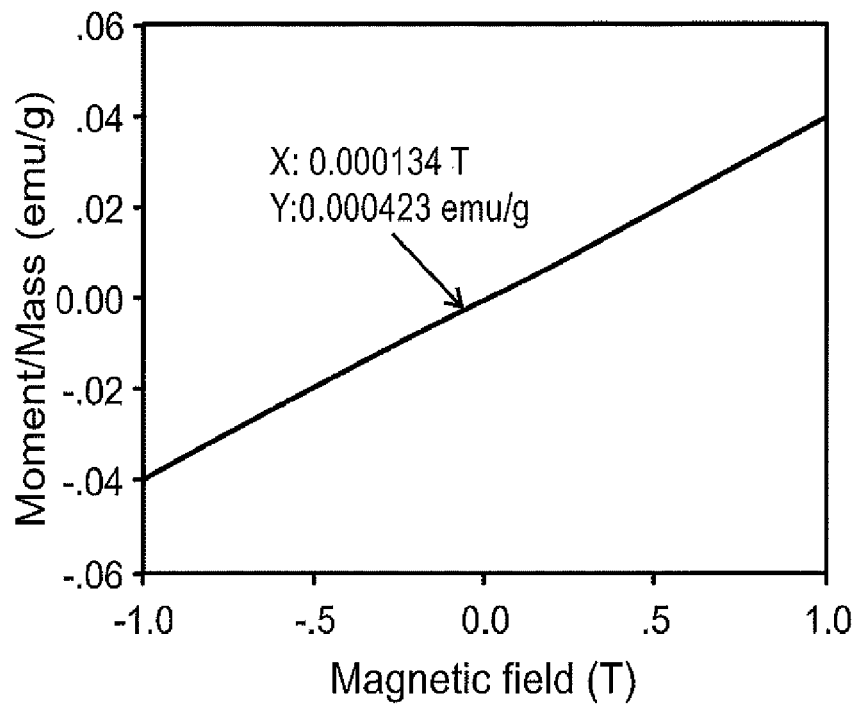
FIG. 29 is a plot of the magnetization for electrodes of an energy storage device according to some embodiments.

The magnetic susceptibility of the $MnO_2$/ECNFs was performed using the SQUID VSM at room temperature and FIG. 29 shows the moment response of the $MnO_2$/ECNFs electrode under different magnetic field strength. The magnetization, measured as the magnetic moment associated with electron's spin state, µe, at 1.34 mT magnetic field is found to be 4.23×10−4 emu/g of the $MnO_2$/ECNFs electrode and ~7.98×10−4 emu/g of the pure $MnO_2$ mass fraction (ca. 53%) in the electrode. The spin-dependent torque the $MnO_2$ experienced, representing the improved energy state of the electron, is 1.07×10−9 J/g (~93.0×10−9 J/mol) obtained by multiplying the magnetic field by the magnetic moment. The magnetic field induced spin-dependent torque on an electron with spin quantum number ms=+½ and −½ causes the degeneracy, namely different energy levels of the "+" and "−" spin states which is expressed as, $hv=g\beta H$ where hv is the quantum of energy corresponding to a characteristic frequency v, g is dimensionless constant called the "electron g-factor", β is the electronic Bohr magneton (9.2740154×10−24 JT-1), and H is the magnetic field strength. The enhanced energy state of the electrons will increase the electron transfer kinetics between the species of Mn(IV)/Mn(III), as well as the electron transportation efficiency at the electrolyte-$MnO_2$/ECNFs interfaces, hence contributes to the capacitance enhancement.

Based on the results and analysis, one can conclude that the mT magnetic field significantly enhances energy storage capacitance of the $MnO_2$/ECNFs electrodes with a comprehensive mechanism due to the combined contribution of both the double layer and pseudo-active capacitance. The changes of the electrode resistance, though small, in electrochemical cell indicate that the changes of dipole moment in the transition and vibrational states of electrolyte at the double layer area can enhance the conductivity and reduce the resistance (impedance effect), thus enhancing the electrochemical adsorption/desorption of cations and anions at the electrode/electrolyte interfaces. Further, and more significantly in this case, the paramagnetic nature of the $MnO_2$ with multiple unpaired electrons and magnetic susceptibility may largely facilitate the Mn(IV)/Mn(III) pseudo-redox reaction and electron transfer to the electrolyte-electrode interfaces, which may result in higher charge density at the electrode interfaces, more efficiency of cation intercalation/de-intercalation, and thicker double layer, therefore the enhanced capacitance. Since both the impedance effect and the electron spin energy degeneracy depend on the strength magnetic field, the dissimilarity of the magneto-capacitance enhancement at different magnetic field during charge and discharge process is expected.

Figure 30:
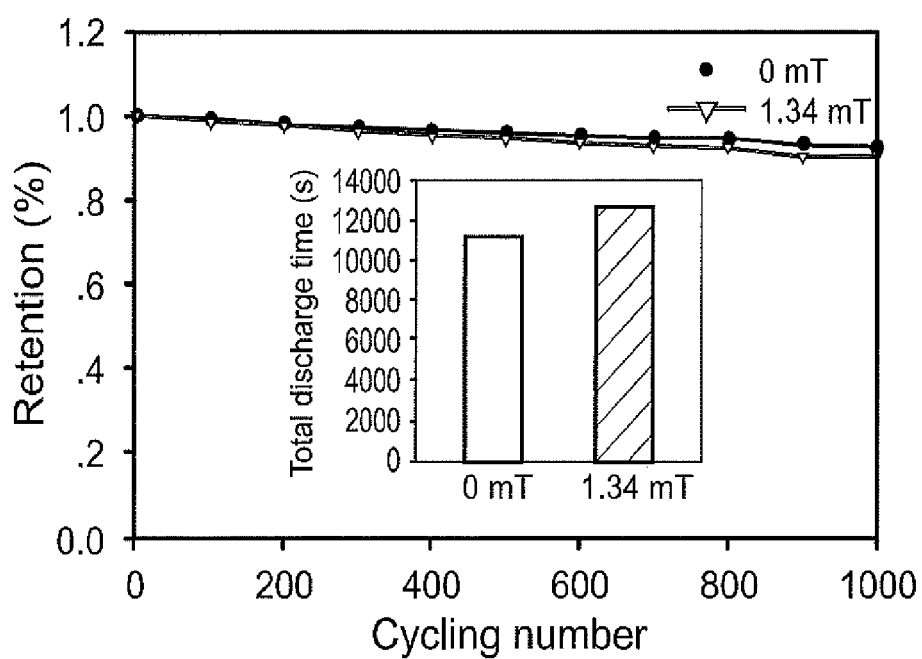
FIG. 30 is a plot of the cycling performance for electrodes of an energy storage device with or without an external magnetic field according to some embodiments.

Finally, for practical purpose, the life cycle performance of the $MnO_2$/ECNFs electrodes was performed by galvanostatic charge/discharge cycling in term of two important parts, i.e., cycling capability or capacitance retention, and total discharge time. As shown in FIG. 30, in the absence of 1.34 mT magnetic field, 92.27% of the initial capacitance was maintained after 1000 cycles. With presence of 1.34 mT magnetic field, 90.57% of the initial capacitance was maintained after 1000 cycles. Note that with the same cycling, the total discharge time increased by 15.1% with presence of magnetic field (FIG. 30 inset) due to magnetic field induced discharge time extension. Longer life cycle performance is expected, where the energy storage device can charge/discharge more than 2000 cycles, more than 10,000 cycles, or more than 50,000 cycles.

In sum, after applying 1.34 mT magnetic field, $MnO_2$/ECNFs showed enhanced magneto-capacitance of 141.70 F/g at the cyclic voltage sweeping rates of 5 mV/s. The capacitance of $MnO_2$/ECNFs was also increased by 58.1% at the current density of 0.5 A/g during the galvanostatic charge/discharge test, which agreed with the energy density enhancement. Meanwhile, in the presence of 1.34 mT magnetic field, the magneto-supercapacitor presented "low resistance shift" for bulk electrolyte and the $MnIO_2$/ECNFs electrode. Longer charge/discharge time of the electrode is observed under magnetic field than that without magnetic field, while did not sacrifice its life cycle stability. Without being bound by theory, the magneto-supercapacitance enhancement may be primarily attributed to the magnetic susceptibility of $MnO_2$ induced electron spin energy degeneracy for facilitated electron transfer reaction, the magnetohydrodynamic impact on electrolyte transportation and improved cation intercalation/de-intercalation under the mT magnetic field, thus resulting in higher charge density at the electrode/electrolyte interfaces, thicker double layer, lower internal resistance. This data suggests that electrodes, and the energy storage devices incorporating such electrodes, will have an improved capacitance when the metal oxide-based electrodes are charged and discharged in the presence of an externally applied low magnetic field.

EXAMPLE 6

Effects of $MnO_2$ Saturation Thickness on Energy Storage Capabilities

The morphology and energy storage performance of variety of uniform crystalline α-$MnO_2$ layers of thickness ranging 200 nm~2000 nm on ECNFs are tested as a function of $MnO_2$ saturation thickness. Component preparation and assembly were performed as previously described herein. Briefly, ultra-thin super aligned-ECNFs ("SA-ECNFs") were cut into 2×1 $cm^2$ SA-ECNFs then half dipped in the electrolyte to electrodeposit $MnO_2$ by a galvanostatic method with a three-electrode setup applying charging currents ranging of 20 µA, 40 µA, 60 µA, and 80 µA at different times ranging from 0.5 h to 12 h to reach self-cessation growth. The self-cessation growth is considered to be equal to the maximum fill thickness at each applied current. In one case, a gold electrode attached with SA-ECNFs, platinum electrode, and Ag/AgCl were used as working electrode, counter electrode, and reference electrode, respectively. To assure that the deposition of $MnO_2$ took place uniformly and firmly at the SA-ECNFs' surfaces, the SA-ECNFs electrode was treated with 4 M $HNO_3$ solution at 70° C. for 2 h to introduce —OH and —COOH groups to facilitate the deposition. The depositions were protected in an inert $N_2$ atmosphere with an aqueous solution containing 50 mM $MnSO_4$ and 100 mM $Na_2SO_4$ as supporting electrolyte. After the deposition, the working electrodes were washed with deionized water and then dried at 80° C. for 2 h.

Figure 40A:
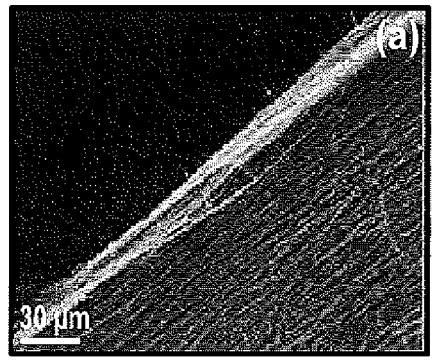
FIGS. 40A-40F show SEM images of $MnO_2$ deposition at different currents and times on nanocomposite materials according to some embodiments.
Figure 40B:
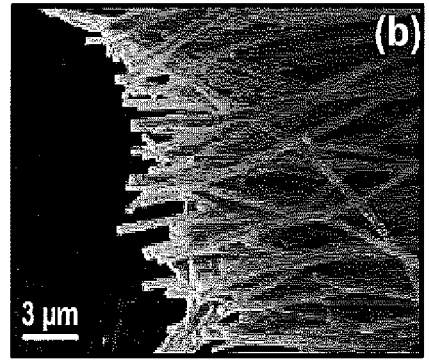
Figure 40C:
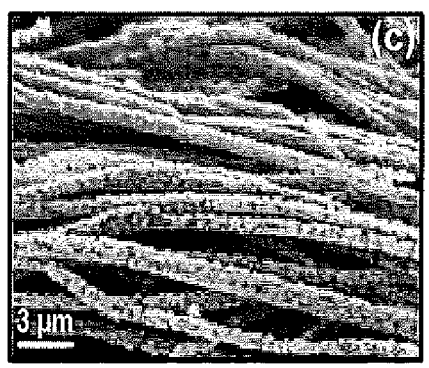
Figure 40D:
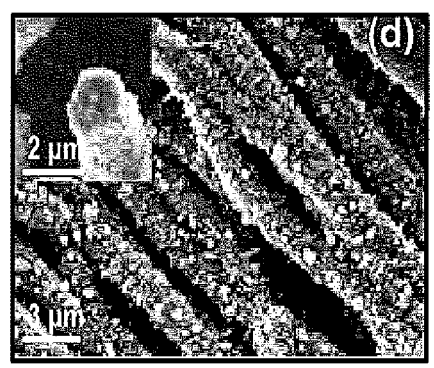
Figure 40E:
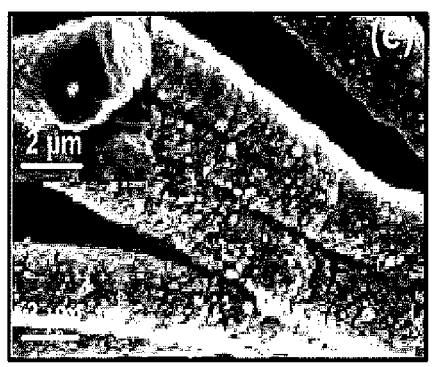
Figure 40F:
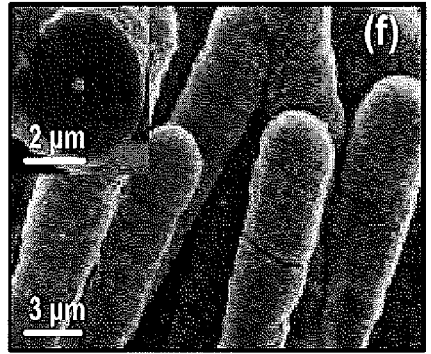
Figure 40G:
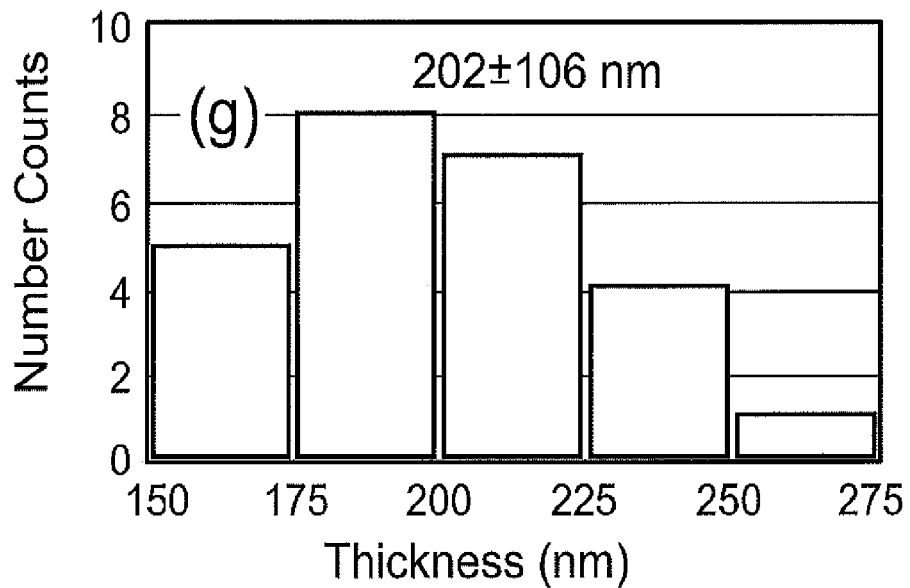
FIGS. 40G-40J show histograms of $MnO_2$ saturation thickness distributions on nanocomposite materials according to some embodiments.
Figure 40H:
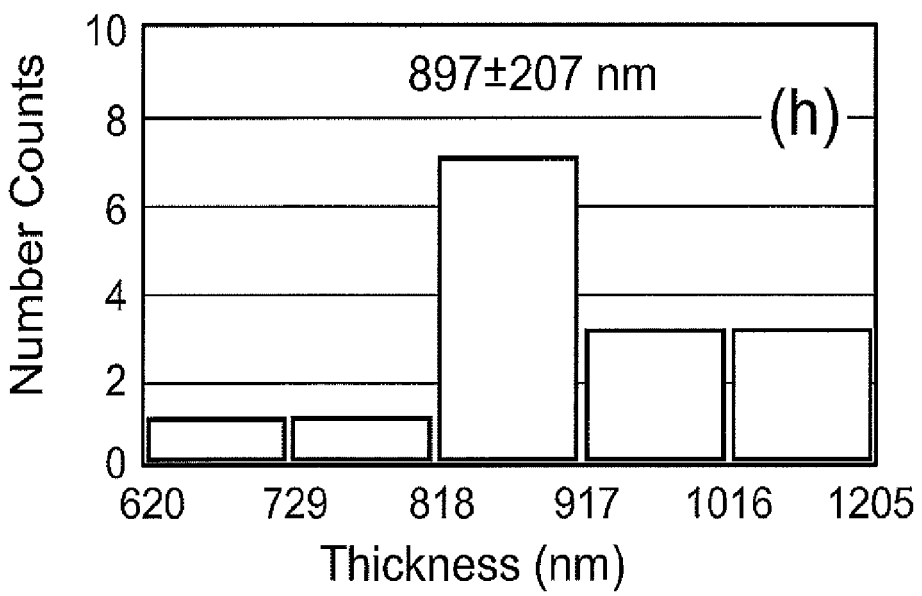
Figure 40I:
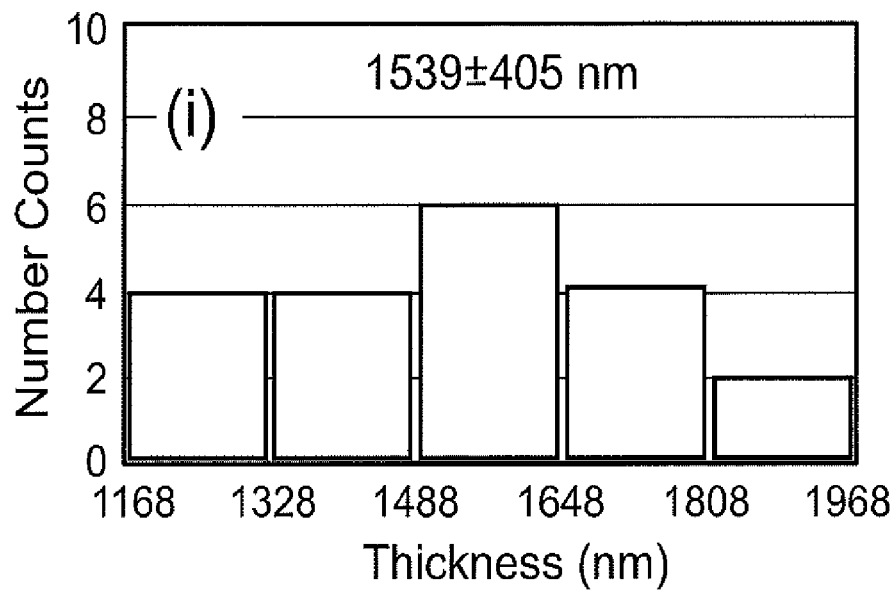
Figure 40J:
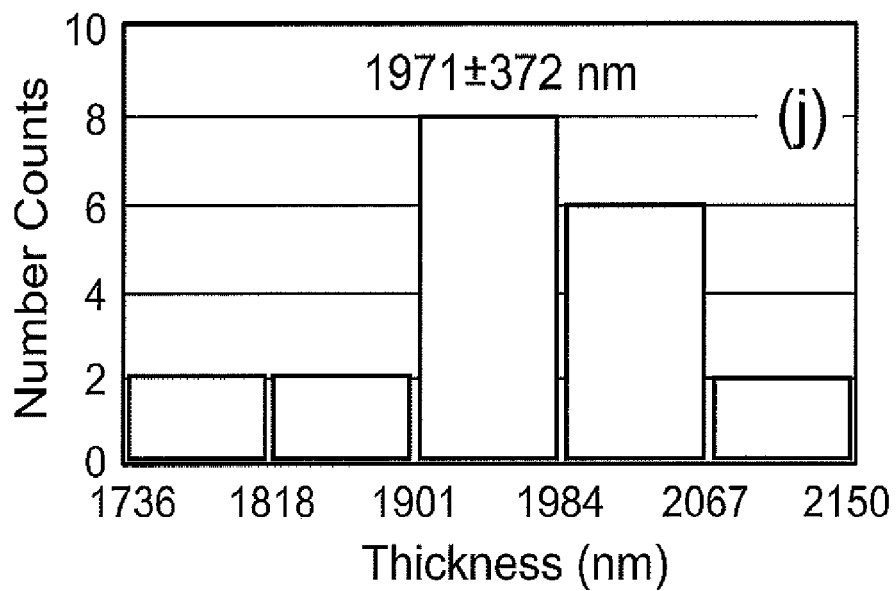

FIGS. 40A and 40B depict SEM images of uncoated SA-ECNFs and FIGS. 40C-40F depict $MnO_2$ deposition on SA-ECNFs at different deposition current and time until the film growth stops: 20 μA for 12 hours (FIG. 40C), 40 μA for 4 hours (FIG. 40D), 60 μA for 3 hours (FIG. 40E), and 80 μA for 2.5 hours (FIG. 40F). Insets in the figures are enlarged images to show the $MnO_2$ coating on SA-ECNFs films. The SEM images show compact, uniform $MnO_2$ films which wrap around the carbon fiber core for the 40 μA, 60 μA, and 80 μA depositions, but not for the 20 μA deposition. The $MnO_2$ film for the 20 μA deposition was not uniform after 12 hrs of deposition.

FIGS. 40G-40J show histograms of $MnO_2$ saturation thickness ($h_{total}$) distribution analysis of electrodeposition at 20 μA-12 h (FIG. 40G), 40 μA-4 h (FIG. 40H), 60 μA-3 h (FIGS. 40I), and 80 μA-2.5 h (FIG. 40J) electrodes.

Figure 41A:
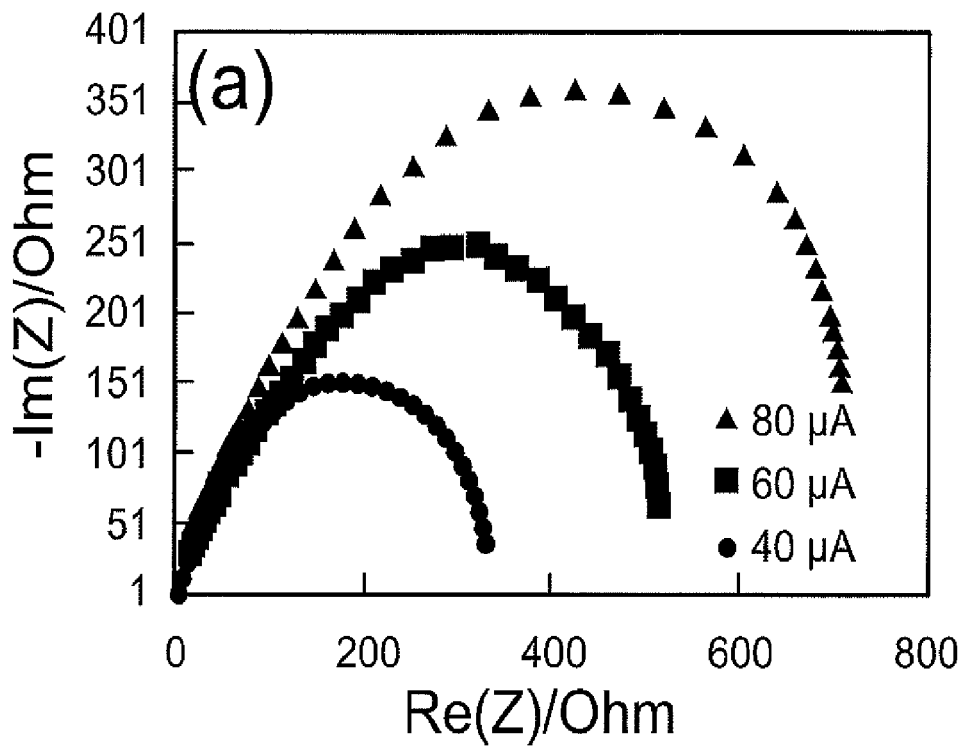
FIG. 41A is a Nyquist plot of the resistance of nanocomposite materials according to some embodiments.

FIG. 41A shows resistance of $MnO_2$/SA-ECNFs electrodes with 40 μA (charge transfer resistance of about 330 Ohms), 60 μA (charge transfer resistance of about 511 Ohms) and 80 μA (charge transfer resistance of about 709 Ohms) electrodeposition deduced from the electrochemical impedance spectroscopy (EIS) Nyquist plots from 100 kHz to 0.01 Hz. As shown, the $MnO_2$/SA-ECNFs electrodes display an increase in charge transfer resistance with an increase in electrodeposition current.

Figure 41B:
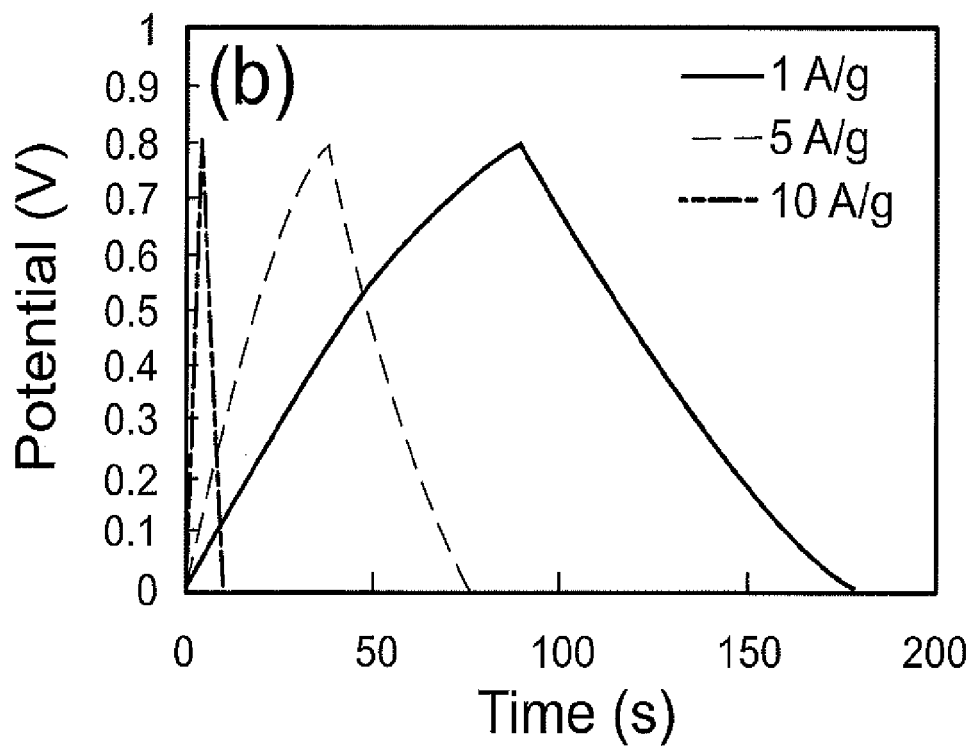
FIGS. 41B-41D show galvanic charge-discharge profiles at different current densities of nanocomposite materials according to some embodiments.
Figure 41C:
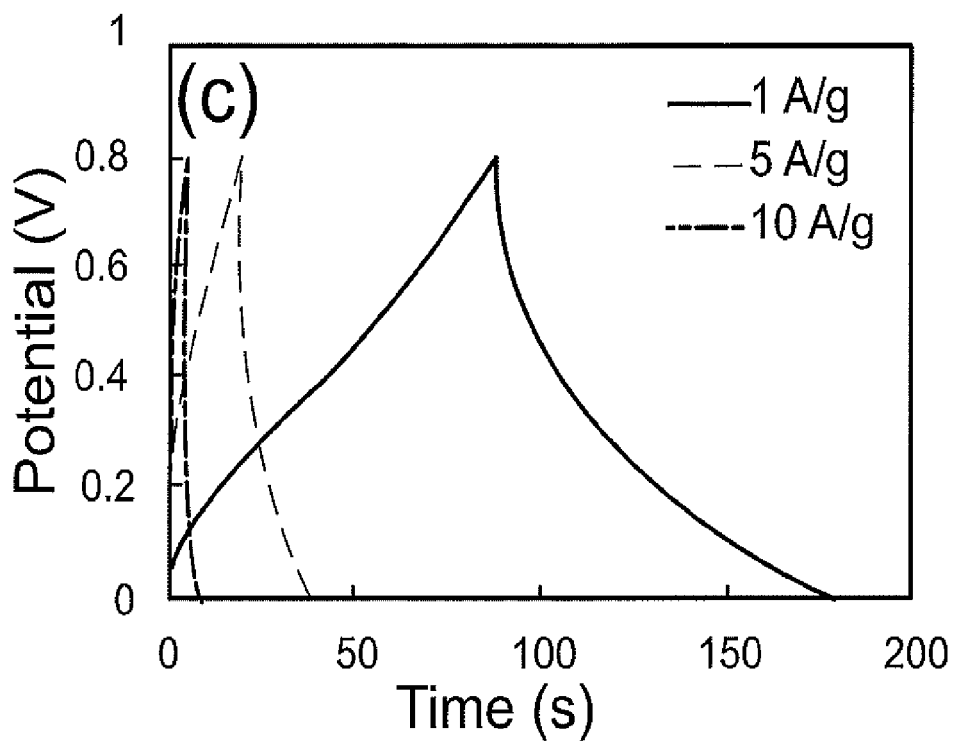
Figure 41D:
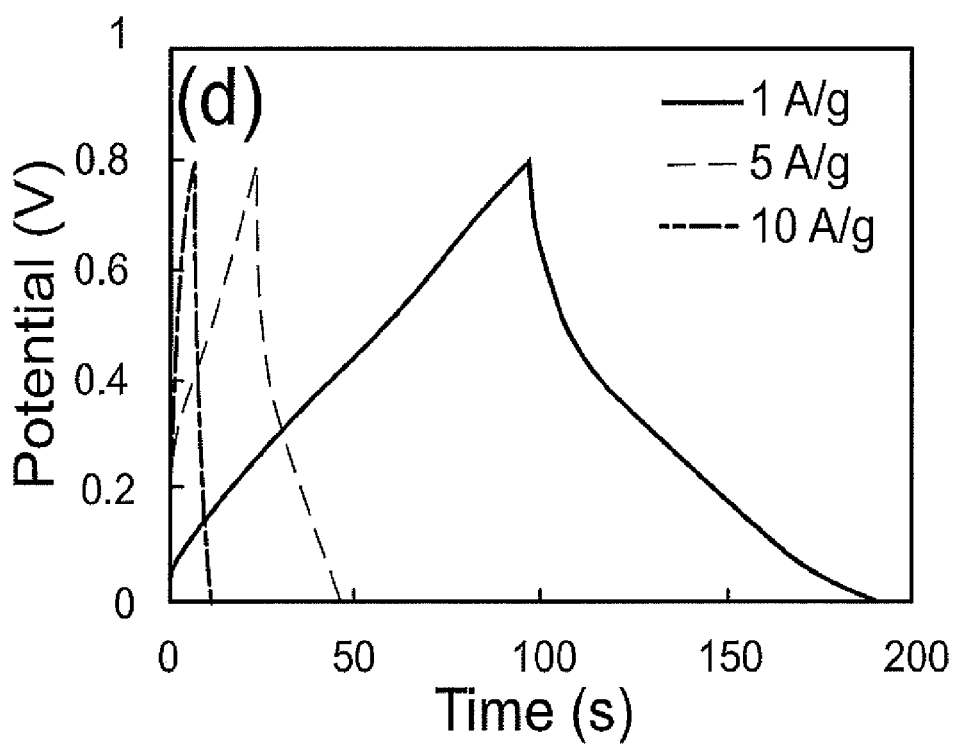

FIGS. 41B-41D show galvanic charge-discharge profiles at different current densities (1 A/g, 5 A/g and 10 A/g) of $MnO_2$/SA-ECNFs electrodes with 40 μA (FIG. 41B), 60 μA (FIG. 41C), and 80 μA (FIG. 41D) electrodeposition. A galvanic charge-discharge profile was unable to be obtained for electrodes with 20 μA electrodeposition, because electrical shorting occurs for this system due to insufficient thickness and/or nonuniformity of $MnO_2$ film.

Figure 41E:
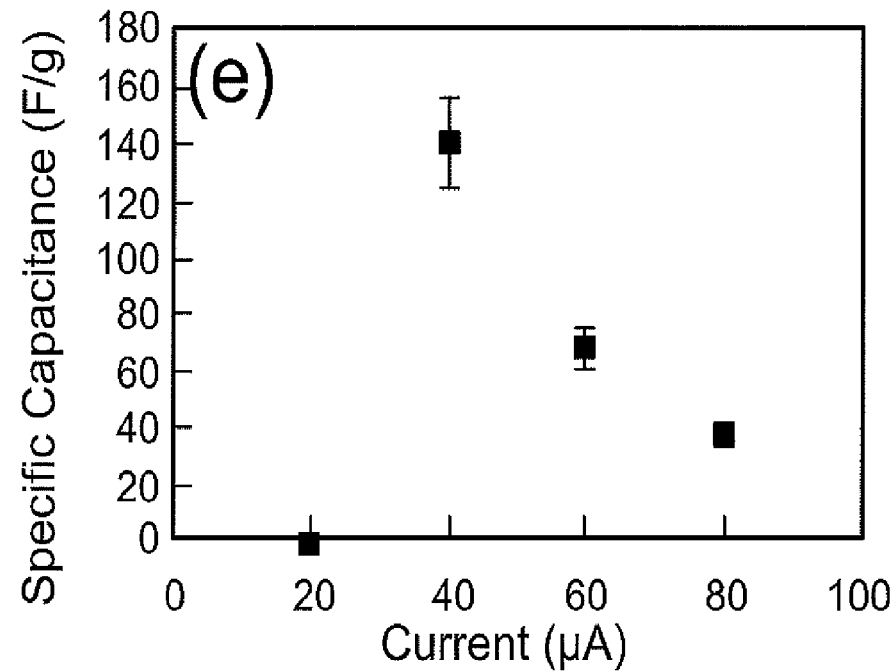
FIG. 41E is a plot of specific capacitance of nanocomposite materials according to some embodiments.
Figure 41F:
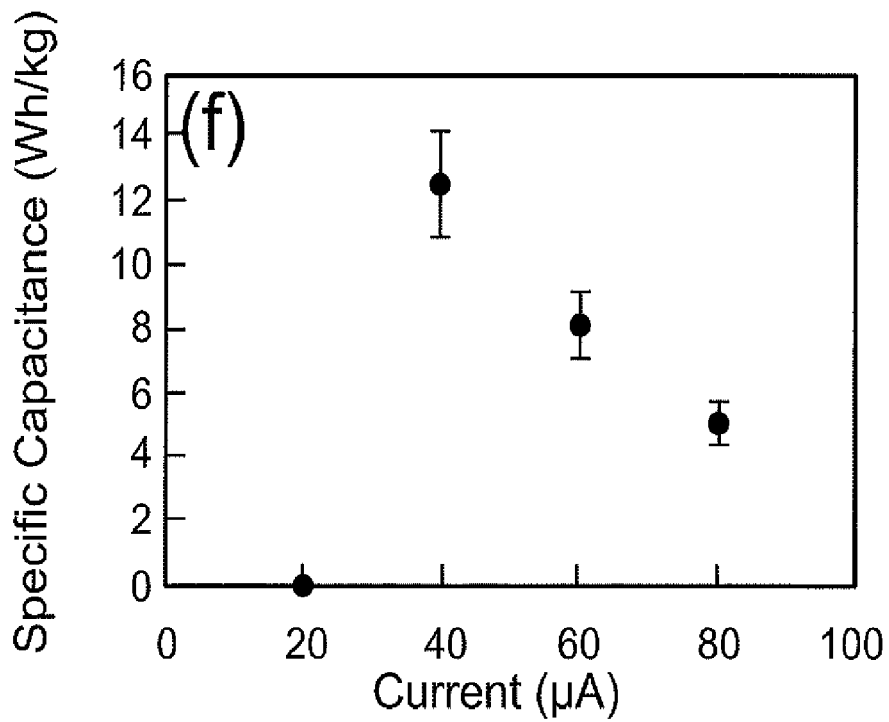
FIG. 41F is a plot of energy densities of electrodes formed from nanocomposite materials according to some embodiments.
Figure 42A:
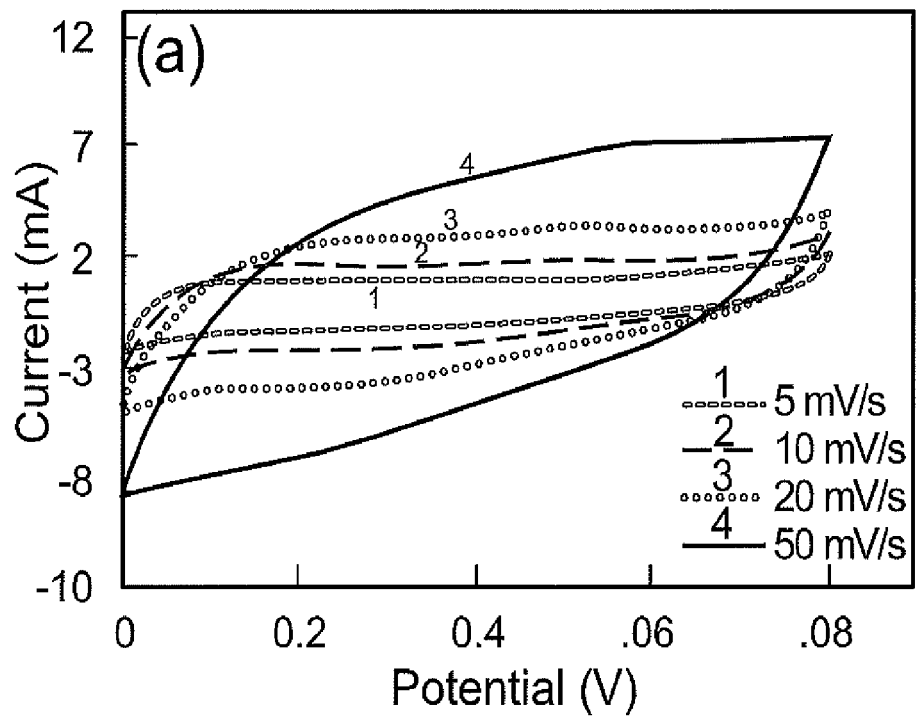
FIGS. 42A-42D are plots of cyclic voltammetry tests of nanocomposite materials according to some embodiments
Figure 42B:
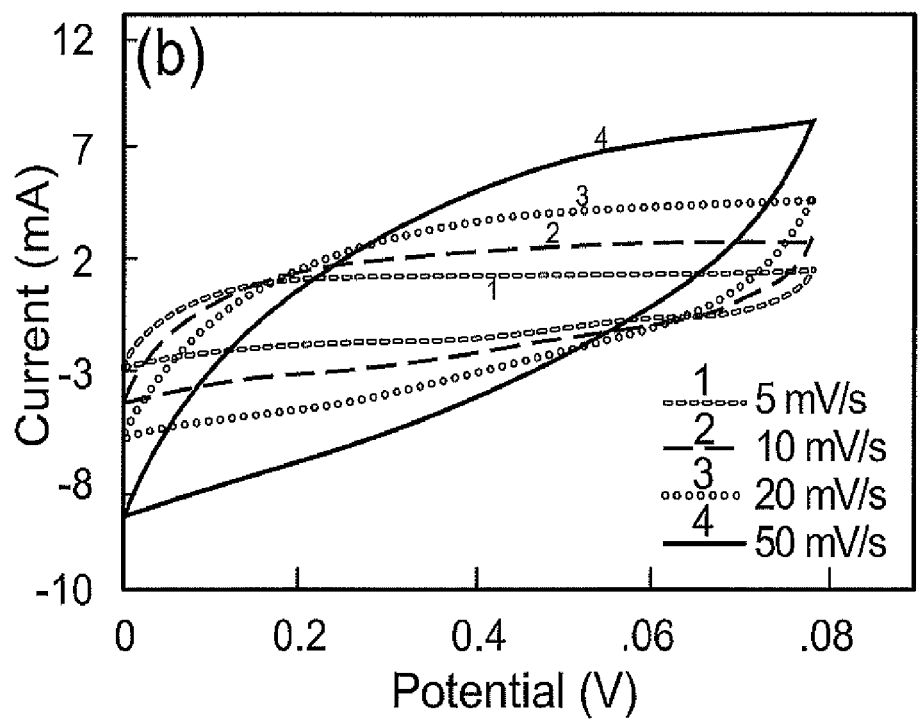
Figure 42C:
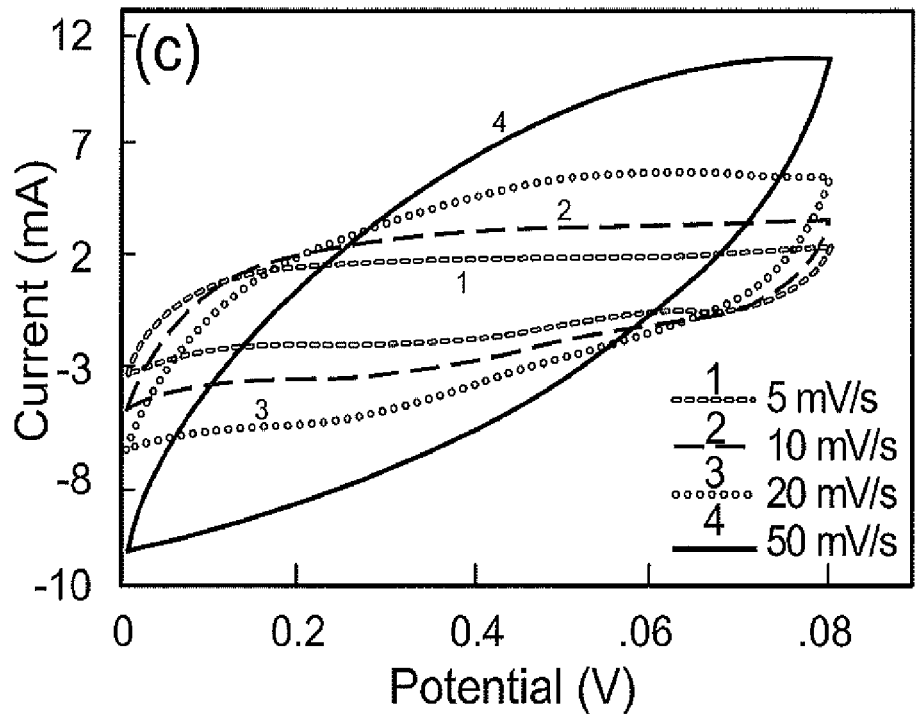
Figure 42D:
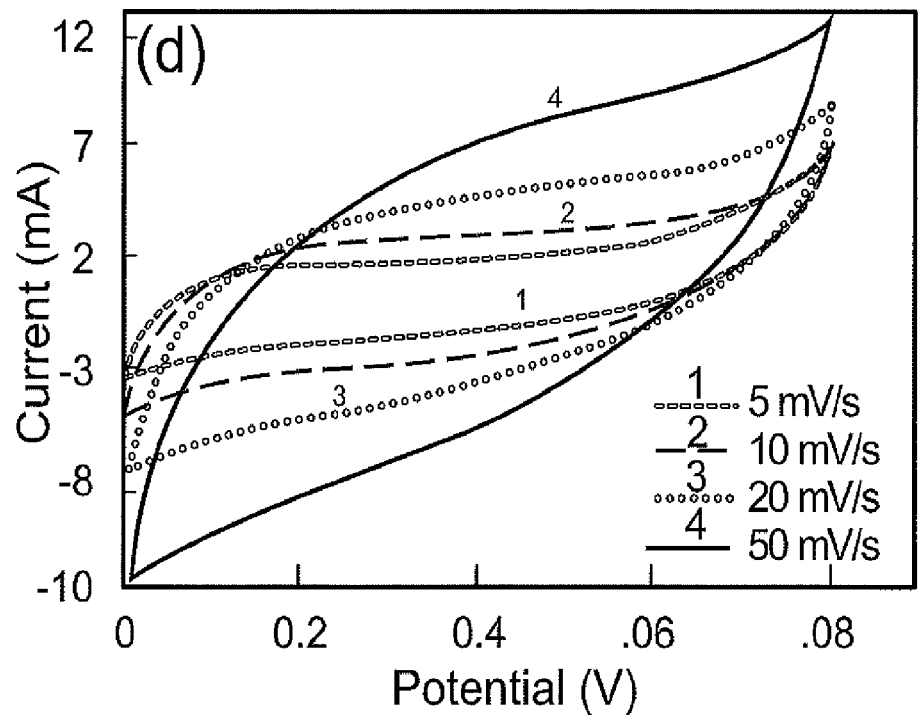

FIG. 41E demonstrates the capacitance of the $MnO_2$/SA-ECNFs electrodes with 40 μA, 60 μA and 80 μA deposition is 141 F/g, 91 F/g, 56 F/g, respectively, and FIG. 41F presents the energy density of 12.5 Wh/kg, 8.1 Wh/kg, and 5 Wh/kg, respectively.

FIGS. 42A-42D shows a comparison of the cyclic voltammograms of the $MnO_2$/SA-ECNFs electrodes of scan rates at 5 mV/s to 50 mV/s under different deposition current and time. Specifically, the cyclic voltammetry tests were conducted with 20 μA (FIG. 42A), 40 μA (FIG. 42B), 60 μA (FIG. 42C), and 80 μA (FIG. 42D) $MnO_2$/SA-ECNFs films under 12 h, 4 h, 3 h and 2.5 h deposition, respectively. The cyclic voltammetry tests of FIGS. 42A-42D were conducted using a three-electrode setup where a gold electrode taped with $MnO_2$/SA-ECNFs served as the working electrode, platinum wire worked as the counter electrode, and Ag/AgCl the reference electrode. As seen, deposition under higher current exhibits a larger integrated curve area, indicating potentially higher absolute areal capacitance (80 μA>60 μA>40 μA>20 μA). While considering the different mass loading and thickness of the $MnO_2$ layers, the $MnO_2$/SA-ECNFs under 20 μA deposition current has the highest specific capacitance from CV with respect to mass of the whole electrode. The capacitance calculated from CVs with 20 μA, 40 μA, 60 μA, and 80 μA depositions is 652 F/g, 396 F/g, 142 F/g and 89 F/g, respectively.

Figure 43:
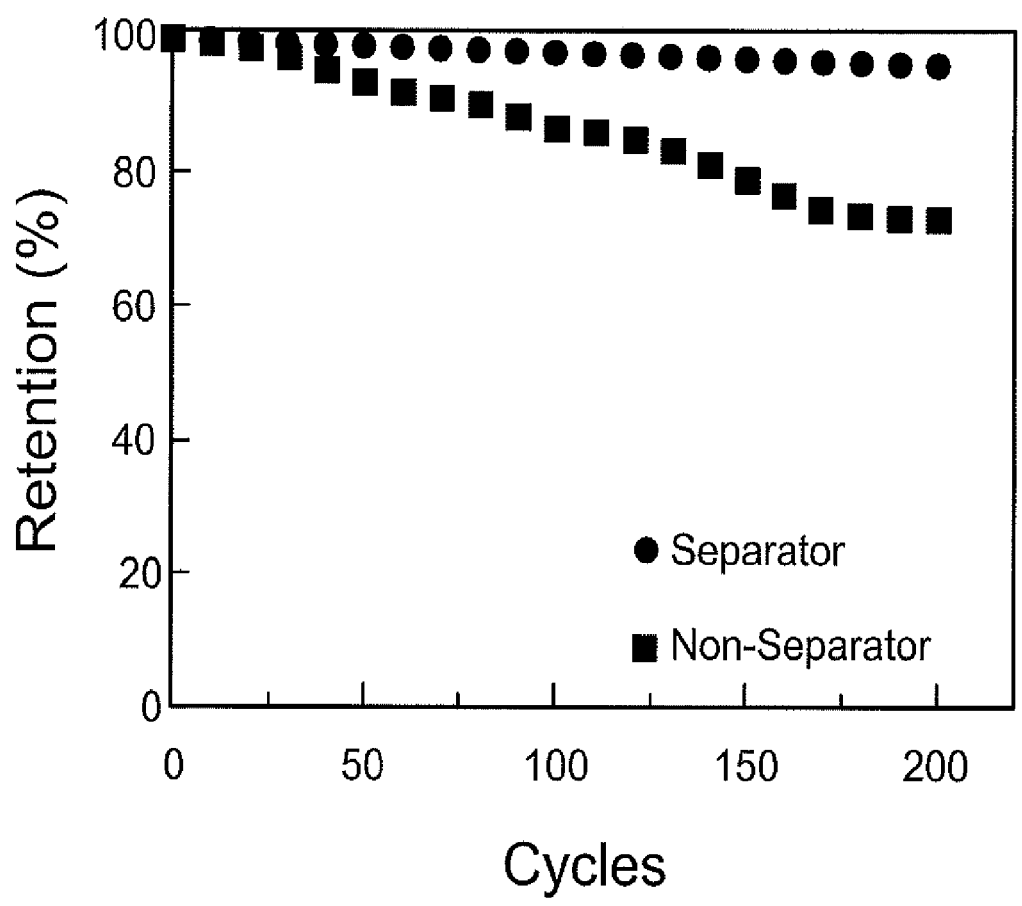
FIG. 43 shows retention of $MnO_2$/SA-ECNFs with and without a conventional cellulose separator according to some embodiments.

While not intending to be bound by theory, the contribution of pseudo-capacitance is believed to depend on the reversible redox reactions between Mn(IV)/Mn(III) species and $K^+$ intercalation/de-intercalation at the $MnO_2$/electrolyte interfaces. After a competing retention test at a current density of 1 A/g with and without the use of cellulose separator, the non-separator configuration of $MnO_2$/SA-ECNFs at 40 μA under 4 h deposition shows an acceptable loss of energy density after 200 cycles, as shown in FIG. 43. This research confirms that metal oxide/carbonaceous nanomaterial-based pseudocapacitance energy storage can be performed without the use of a bulky separator by simply increasing the thickness of the metal oxide as replacement of a separator.

EXAMPLE 7

Supplemental Data

FIGS. 31-38B are plots and/or diagrams of supplemental data collected and obtained from studying nanocomposite electrodes as described in the previous examples.

Table 6 includes the results of discharge time, power densities and energy densities of the $MnO_2$/ECNFs electrodes under different magnetic field from 0 to 1.34 mT.

TABLE 6

Results from galvanostatic charge/discharge measurements

| Magnetic | Discharge Time (s) | | | Power Density (W/kg) | | | Energy Density (Wh/kg) | | |
| --- | --- | --- | --- | --- | --- | --- | --- | --- | --- |
| Field (mT) | 0.5 A/g | 1 A/g | 2 A/g | 0.5 A/g | 1 A/g | 2 A/g | 0.5 A/g | 1 A/g | 2 A/g |
| 0 | 182.3 | 60.2 | 21.7 | 679 | 1358 | 2717 | 34.4 | 22.7 | 16.4 |
| 0.45 | 203.3 | 63.0 | 22.1 | 679 | 1358 | 2717 | 38.4 | 23.8 | 16.7 |
| 0.89 | 238.1 | 65.1 | 22.6 | 679 | 1358 | 2717 | 44.9 | 24.6 | 17.1 |
| 1.34 | 288.3 | 68.4 | 23.0 | 679 | 1358 | 2717 | 54.4 | 25.8 | 17.4 |

Figure 31:
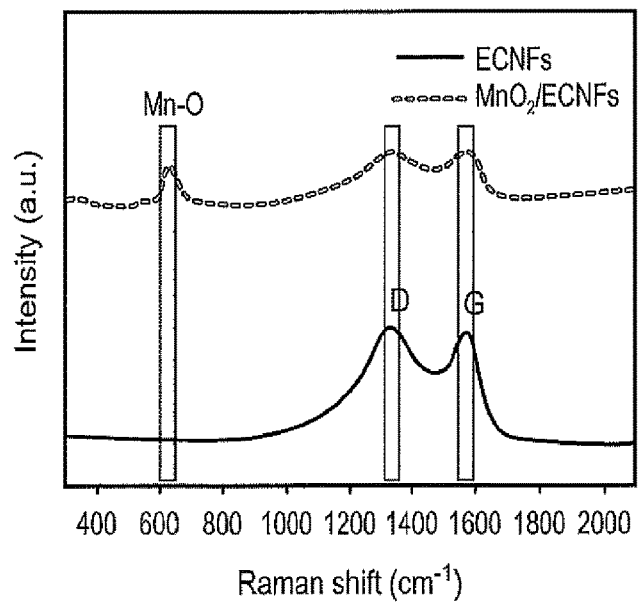
FIG. 31 is Raman spectra data for a nanocomposite material for an energy storage device according to some embodiments.

FIG. 31 is the Raman spectra of ECNFs and $MnO_2$/ECNFs. Raman shifts of 1328 $cm^{-1}$ and 1572 $cm^{-1}$ show D-band and G-band for ECNFs, respectively. While, for $MnO_2$/ECNFs, the Mn—O presents at the Raman shift of 627 $cm^{-1}$.

Figure 32A:
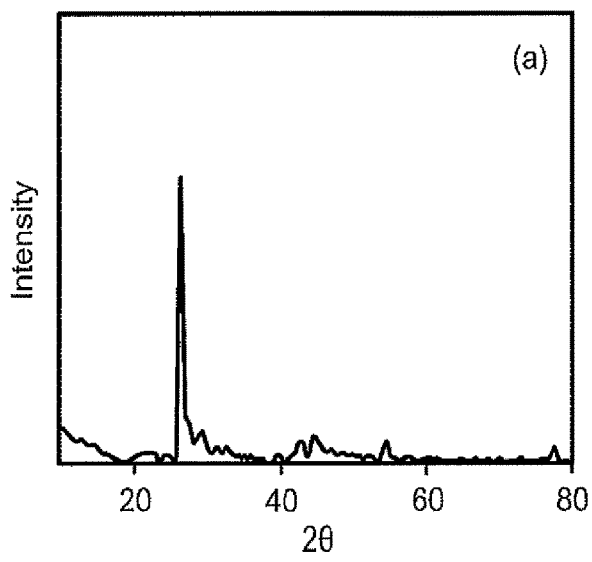
FIGS. 32A-32B illustrate XRD spectra data for a nanocomposite material for an energy storage device according to some embodiments.
Figure 32B:
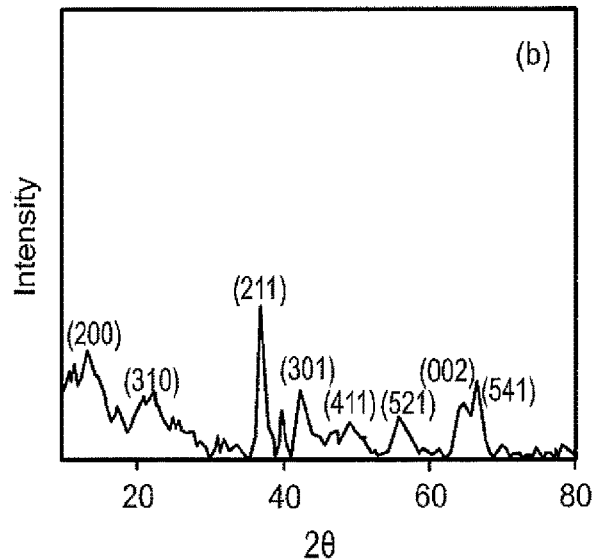

FIGS. 32A-B are the XRD spectra of ECNFs (FIG. 32A) and $MnO_2$ (FIG. 32B). The well-resolved peak at 37.1° in the XRD pattern is attributed to $MnO_2$.

Figure 33:
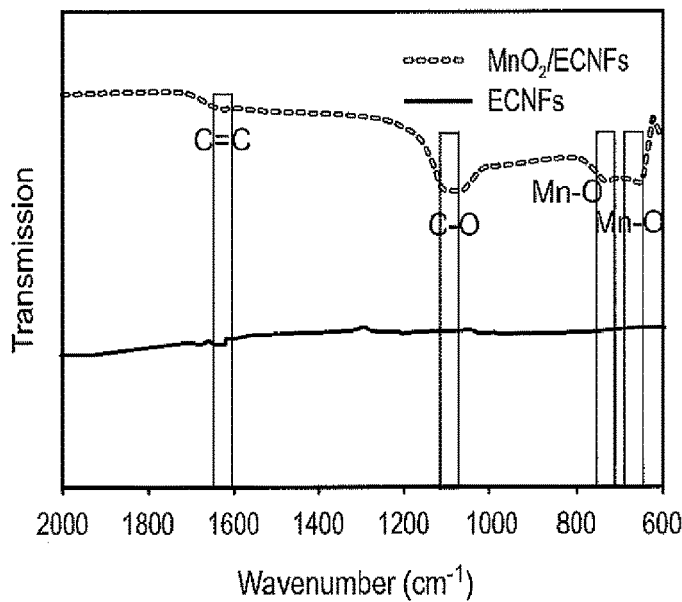
FIG. 33 is FTIR spectra data for a nanocomposite material for an energy storage device according to some embodiments.

FIG. 33 is the FTIR spectra of ECNFs and $MnO_2$/ECNFs. At wavenumber of 1623 $cm^{-1}$, ECNFs shows C=C. While, for $MnO_2$/ECNFs, the Mn—O presents at the wavenumber of 648 $cm^{-1}$ and 731 $cm^{-1}$ and C—O presents at the Raman shift of 1104 $cm^{-1}$.

Figure 34A:
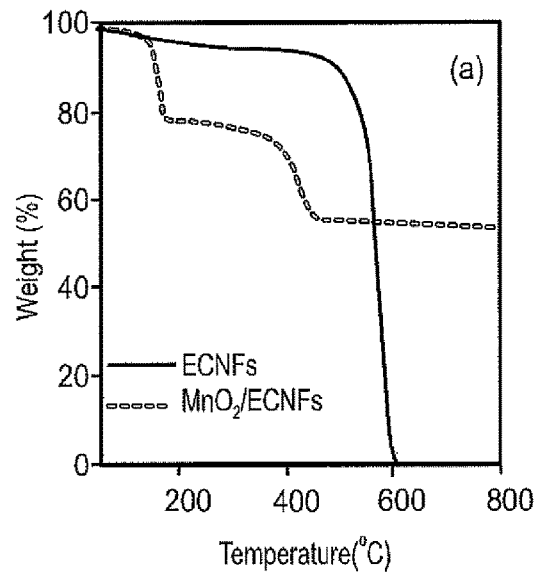
FIGS. 34A-34B illustrate thermal characteristic data for a nanocomposite material for an energy storage device according to some embodiments.
Figure 34B:
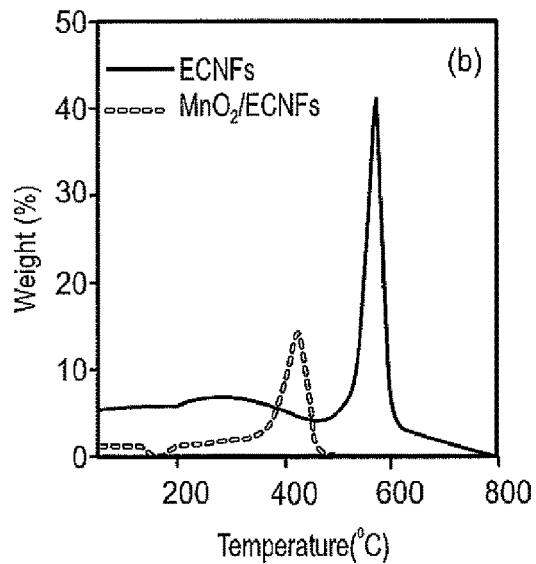

FIGS. 34A-B are TGA and DSC of ECNFs and $MnO_2$/ECNFs to 800° C. in air. Due to the residue solvent evaporation, the ECNFs shows a weight loss before 431° C., and then ECNFs decomposes until 605° C. Unlike ECNFs, the $MnO_2$/ECNFs still achieve about 53% after 605° C. So the $MnO_2$/ECNFs comprise 53% $MnO_2$ and 47% ECNFs.

Figure 35:
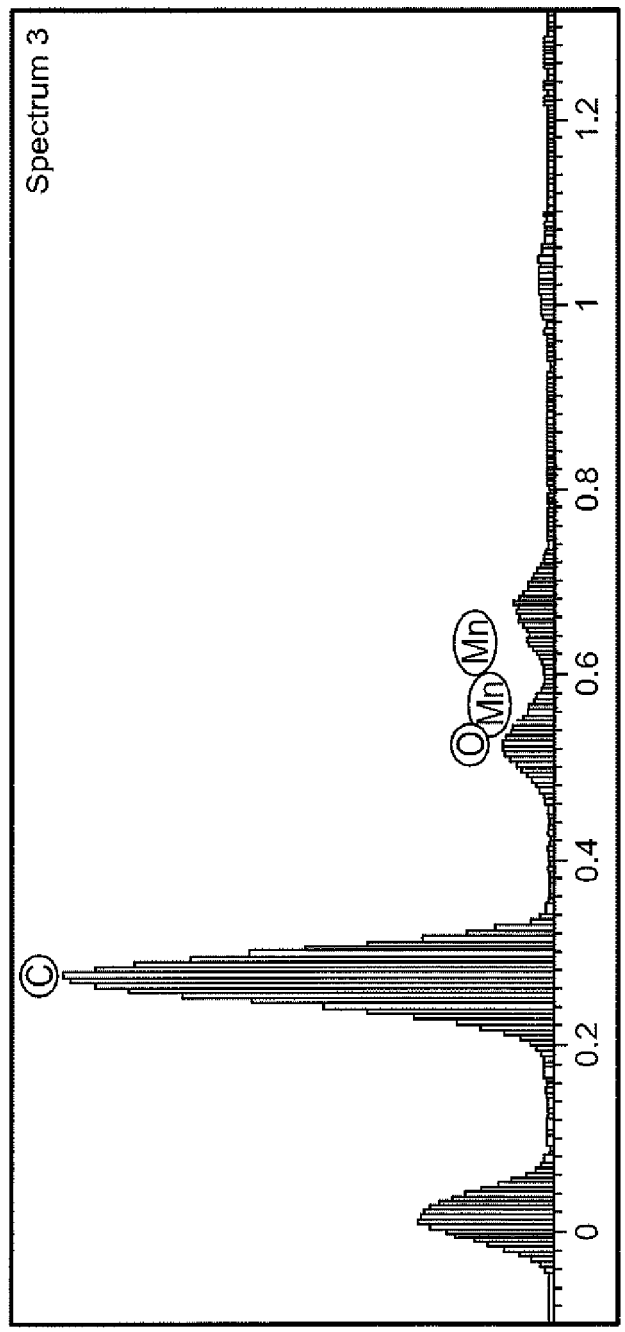
FIG. 35 is EDX data for a nanocomposite material for an energy storage device according to some embodiments.

FIG. 35 is EDX of $MnO_2$/ECNFs. The weight % of C, O and Mn is 56.84%, 15.19%, 27.97% respectively, and the weight ratio of Mn:O is about 2:1. By averaging the EDX results of different spectrum zones, the average weight % of C, O and Mn is about 51.18%, 17.14%, and 31.68% respectively.

Figure 36A:
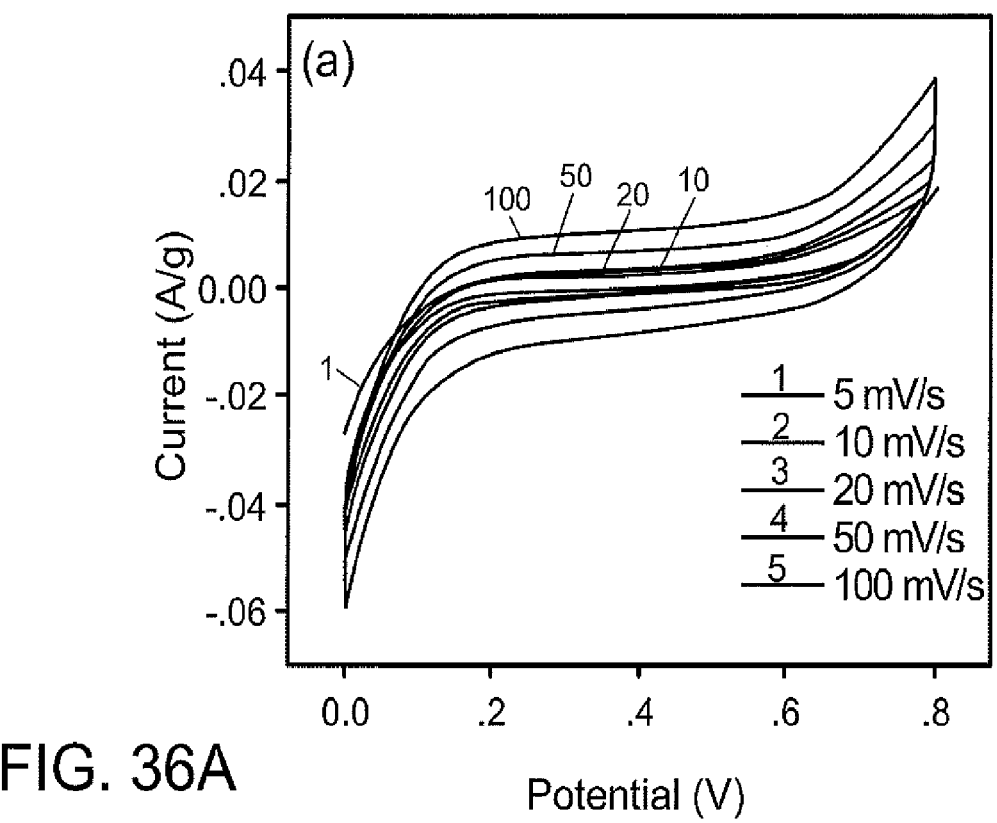
FIGS. 36A-36B are CV loops for CNFs only electrodes as control and comparison present or absent magnetic field according to some embodiments.
Figure 36B:
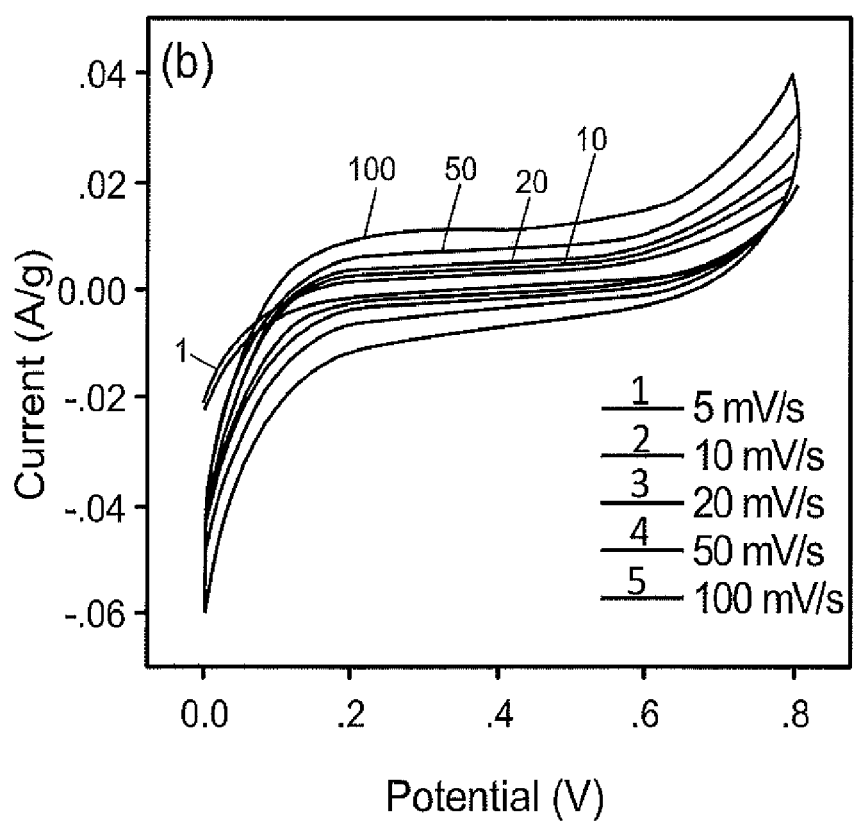

FIGS. 36A-B are CV loops. FIG. 36A is the CV loops of the ECNFs electrodes tested in the absence of magnetic field (0 mT) at different scan rates. FIG. 36B is the CV loops of the ECNFs electrodes tested in the presence of magnetic field (1.34 mT) at different scan rates.

Figure 37:
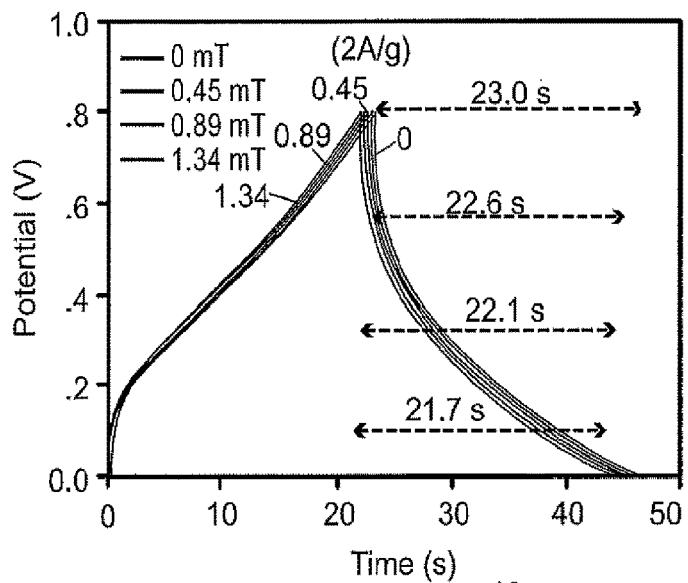
FIG. 37 illustrates charge/discharge curves for electrodes of an energy storage device with or without an external magnetic field according to some embodiments.

FIG. 37 are galvanostatic charge/discharge curves of the $MnO_2$/ECNFs tested in the presence of different magnetic fields under the current density of 2 A/g.

Figure 38A:
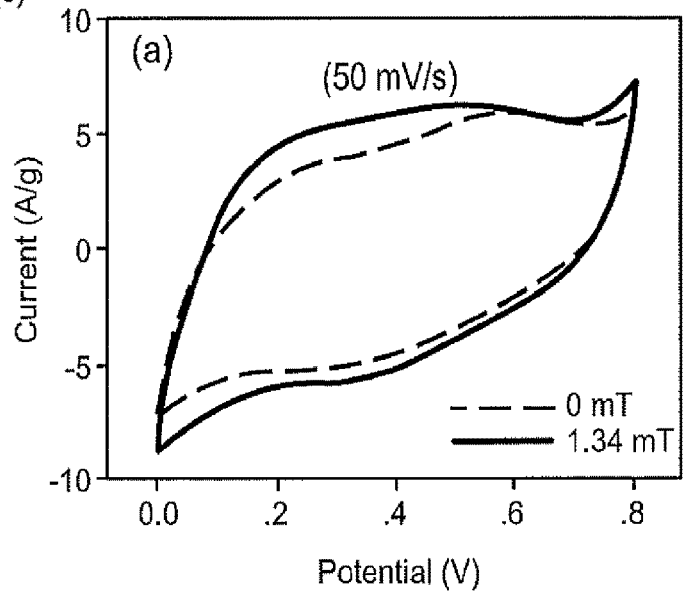
FIGS. 38A-38B are CV loops for electrodes of an energy storage device with or without an external magnetic field according to some embodiments.
Figure 38B:
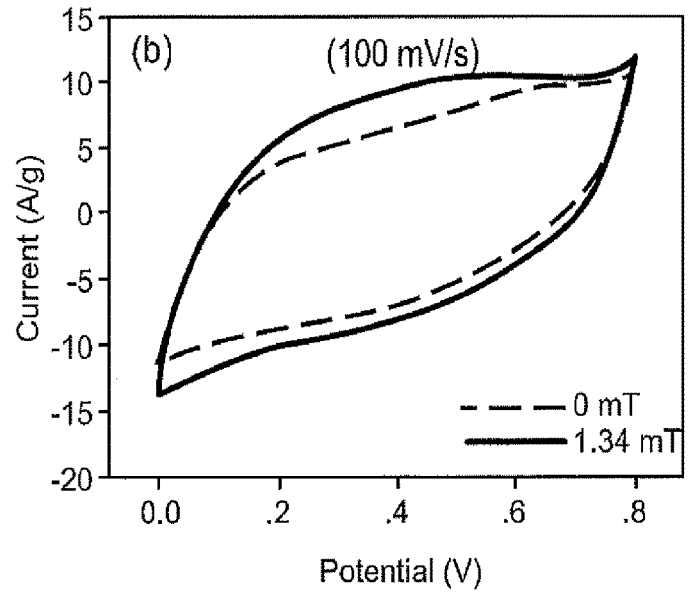

FIGS. 38A-B are CV loops of the $MnO_2$/ECNFs electrodes tested in the presence (1.34 mT)/ absence (0 mT) of magnetic field at different scan rates of 50 mV/s (FIG. 38A) and 100 mV/s (FIG. 38B).

Figures 39A, 39B:
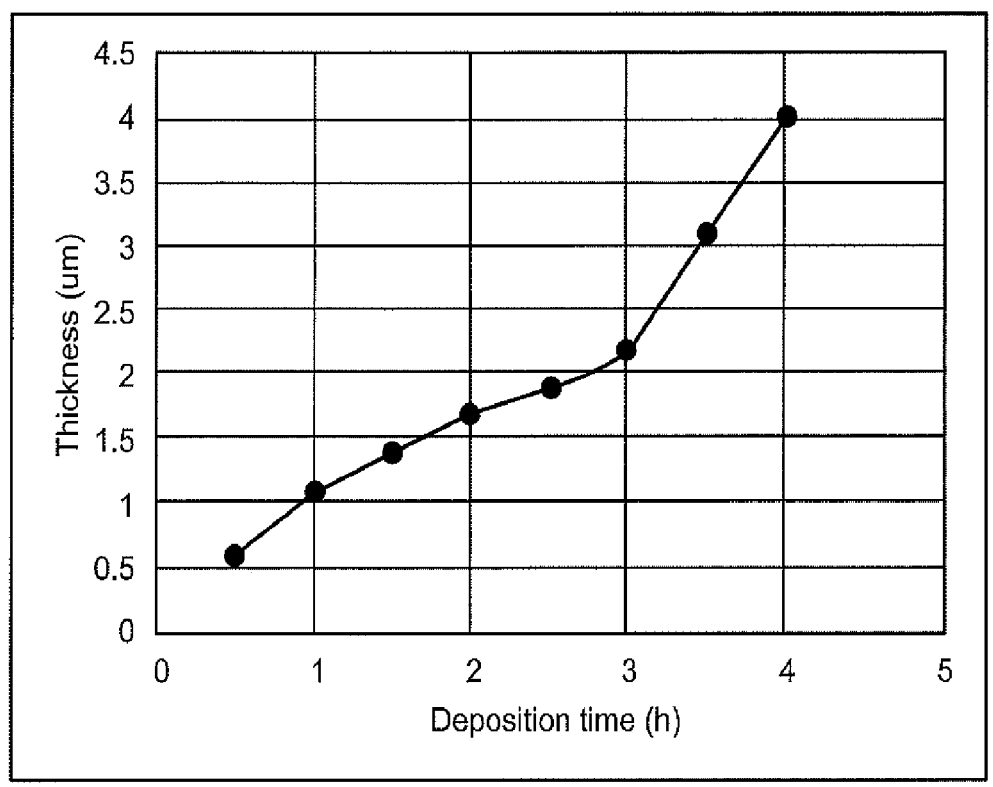
FIGS. 39A-39B are exemplary data for coating thickness versus deposition time for separator-free energy storage devices according to some embodiments.

FIGS. 39A-39B are CV exemplary data for coating thickness versus deposition time for separator-free energy storage devices according to some embodiments. The layer of $MnO_2$ can have a uniform or substantially uniform thickness ranging from 1-5 µm or any subrange therebetween (e.g., 1-2 µm; 1.5-1.8 µm, 1-3 µm, etc.).

Technical benefits associated with self-sustainable separator-free supercapacitor devices described herein include: no separator needed; high energy and power density; solid state electrolyte incorporating ILs for improved charge transfer; long life cycles (>10,000 full charge/discharge); and low cost for providing a cost competitive product.

Various implementations of devices and methods have been described in fulfillment of the various objectives of the present disclosure. It should be recognized that these implementations are merely illustrative of the principles of the present disclosure. Numerous modifications and adaptations thereof will be readily apparent to those skilled in the art without departing from the scope of the present disclosure. For example, individual steps of methods described herein can be carried out in any manner and/or in any order not inconsistent with the objectives of the present disclosure, and various configurations or adaptations of apparatus described herein may be used.

The invention claimed is:

1. A separator-free energy storage device comprising:
a first electrode; and
a second electrode, the first and/or second electrodes being formed from a plurality of randomly interconnected carbon nanostructures at least partially coated with a layer of material comprising a transition metal oxide.

2. The device of claim 1, wherein the plurality of randomly interconnected carbon nanostructures comprises a plurality of randomly interconnected carbon nanotubes, carbon nanofibers, graphene, carbon nanospheres, or carbon nanodots.

3. The device of claim 1, wherein the transition metal oxide comprises $Al_2O_3$, $Bi_2O_3$, $Bi_2O_5$, $MoO_2$, $RuO_2$, $Sb_2O_3$, NbO, $NbO_2$, SnO, $SnO_2$, CrO, $CrO_2$, $Cr_2O_3$, $ZrO_2$, $B_2O_3$, $V_2O_5$, $TiO_2$, NiO, $Ni_2O_3$, $MnO_2$, $Mn_2O_3$, CoO, $Co_2O_3$, FeO, $Fe_2O_3$, $ZrO_2$, $Ta_2O_5$, $HfO_2$, or $Y_2O_3$.

4. The device of claim 3, wherein the transition metal oxide is doped with an ionic species comprising $Li^+$, $Na^+$, $K^+$ any combination thereof.

5. The device of claim 1, wherein the first and second electrodes are separated by a distance of about 0.5-500 microns (µm).

6. The device of claim 5, wherein the first and second electrodes are separated by a distance of about 1.0-1.5 µm.

7. The device of claim 1, further comprising an electrolyte disposed between the first and second electrodes.

8. The device of claim 7, wherein the electrolyte is a solid phase material or a liquid phase material.

9. The device of claim 8, wherein the electrolyte is an ionic liquid comprising an anionic compound and a cationic compound.

10. The device of claim 1, wherein the layer of material is about 1-10 microns (µm) thick.

11. The device of claim 1, wherein each of the plurality of randomly interconnected carbon nanostructures has a diameter of about 1-800 nanometers (nm).

12. The device of claim 1, wherein the first and second electrodes each have a thickness of about 1-1000 microns (µm).

13. A method of making separator-free energy storage device, the method comprising:
providing a plurality of randomly interconnected carbon nanostructures;
depositing a layer of material on each of the plurality of randomly interconnected carbon nanostructures to form a nanocomposite film, the layer of material comprising a transition metal oxide;
forming the nanocomposite film into a first electrode; and
disposing the first electrode opposite a second electrode in an electrochemical cell.

14. The method of claim 13, wherein providing a plurality of randomly interconnected carbon nanostructures comprises electrospinning a plurality of randomly interconnected carbon nanofibers.

15. The method of claim 13, wherein depositing the layer of material on each of the plurality of randomly interconnected carbon nanostructures comprises electrodepositing $MnO_2$ on each of the plurality of randomly interconnected carbon nanostructures.

16. The method of claim 13, further comprising providing an electrolyte between the first and second electrodes.

17. The method of claim 13, further comprising electrically charging and discharging the first and second electrodes in the presence of an external magnetic field.

18. A method of storing energy using a separator-free energy storage device, the method comprising:
providing a supercapacitor comprising at least one electrode formed from a plurality of randomly interconnected carbon nanostructures coated with a layer of material comprising a transition metal oxide; and
electrically charging and discharging the supercapacitor in the presence of a magnetic field.

19. The method of claim 18, further comprising electrically charging and discharging the supercapacitor for more than 10,000 hours.

20. The method of claim 18, wherein the supercapacitor has a capacitance of 100-2000 F/g.

21. The method of claim 18, wherein the at least one electrode has an area of between about 0.1 $cm^2$ and 9 $cm^2$.

* * * * *